United States Patent
Hanaoka et al.

(10) Patent No.: US 9,881,535 B2
(45) Date of Patent: *Jan. 30, 2018

(54) IMAGE DISPLAY DEVICE AND METHOD

(75) Inventors: Toshiharu Hanaoka, Chiba (JP);
Kenichiroh Yamamoto, Chiba (JP);
Hiroyuki Furukawa, Sakura (JP);
Masafumi Ueno, Urayasu (JP);
Yasuhiro Yoshida, Chiba (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 1746 days.

This patent is subject to a terminal disclaimer.

(21) Appl. No.: 12/066,218

(22) PCT Filed: Sep. 20, 2006

(86) PCT No.: PCT/JP2006/318575
§ 371 (c)(1),
(2), (4) Date: Mar. 7, 2008

(87) PCT Pub. No.: WO2007/040045
PCT Pub. Date: Apr. 12, 2007

(65) Prior Publication Data
US 2009/0059068 A1    Mar. 5, 2009

(30) Foreign Application Priority Data

Sep. 30, 2005  (JP) ................................ 2005-288144
Oct. 28, 2005  (JP) ................................ 2005-214694

(51) Int. Cl.
*H04N 7/01*       (2006.01)
*G09G 3/20*       (2006.01)
(Continued)

(52) U.S. Cl.
CPC .............. *G09G 3/20* (2013.01); *H04N 5/145* (2013.01); *H04N 5/44504* (2013.01);
(Continued)

(58) Field of Classification Search
CPC .... H04N 7/0127; H04N 5/45; H04N 5/44504; H04N 21/4307
(Continued)

(56) References Cited

U.S. PATENT DOCUMENTS 5,097,257 A    3/1992  Clough et al.
5,978,041 A   11/1999  Masuda et al.
(Continued)

FOREIGN PATENT DOCUMENTS

EP    0 883 298 A2    12/1998
EP    1 404 130 A1     3/2004
(Continued)

*Primary Examiner* — Nathan Flynn
*Assistant Examiner* — Alfonso Castro
(74) *Attorney, Agent, or Firm* — Birch, Stewart, Kolasch & Birch, LLP

(57) ABSTRACT

In an image display device having a frame rate converting (FRC) portion, it is possible to prevent image degradation of a combined image display portion such as an OSD and PinP attributed to the FRC process. The image display device includes: an FRC portion 10 for converting the number of frames of an input image signal by interpolating an image signal subjected to a motion compensation process between the frames of the input image signal; an OSD processing portion 14 for superposing an OSD signal on the input image signal, and a controlling portion 15. The FRC portion 10 has a motion vector detecting portion 11e for detecting a motion vector between the frames of the input image signal, an interpolation vector evaluating portion 11f for allocating interpolation vector between frames based on the motion vector information, and an interpolation frame generating portion 12d for generating an interpolation frame from the interpolation vector. When the OSD signal is superposed on the input image signal, the controlling portion 15 disables the motion compensation process of the FRC portion 10 by
(Continued)

making the motion vector detected by the motion vector detecting portion 11*e* 0 vector.

26 Claims, 44 Drawing Sheets

(51) Int. Cl.
| | |
|---|---|
| *H04N 5/14* | (2006.01) |
| *H04N 5/445* | (2011.01) |
| *H04N 5/45* | (2011.01) |
| *H04N 21/431* | (2011.01) |
| *H04N 21/44* | (2011.01) |
| *H04N 21/4402* | (2011.01) |
| *H04N 21/443* | (2011.01) |

(52) U.S. Cl.
CPC ............... *H04N 5/45* (2013.01); *H04N 7/013* (2013.01); *H04N 21/4316* (2013.01); *H04N 21/44008* (2013.01); *H04N 21/440281* (2013.01); *G09G 2320/106* (2013.01); *G09G 2340/0435* (2013.01); *G09G 2340/125* (2013.01); *H04N 7/014* (2013.01); *H04N 21/4435* (2013.01)

(58) Field of Classification Search
USPC ............... 348/441, 443, 458, 459, 584, 590, 348/564–565, 699–701, 452, 448
See application file for complete search history.

(56) References Cited

U.S. PATENT DOCUMENTS

| | | | |
|---|---|---|---|
| 6,144,412 A | 11/2000 | Hirano et al. | |
| 6,313,863 B1 | 11/2001 | Chida | |
| 6,625,333 B1 | 9/2003 | Wang et al. | |
| 6,844,878 B2* | 1/2005 | Hentschel et al. | 345/421 |
| 7,327,790 B1* | 2/2008 | Bretl et al. | 375/240.26 |
| 7,688,889 B2* | 3/2010 | Krause | 375/240.01 |
| 2002/0196369 A1* | 12/2002 | Rieder et al. | 348/584 |
| 2003/0086498 A1 | 5/2003 | Lee et al. | |
| 2004/0085480 A1* | 5/2004 | Salzer et al. | 348/584 |
| 2004/0120757 A1 | 6/2004 | Ellbogen | |
| 2005/0025342 A1* | 2/2005 | Lee et al. | 382/107 |
| 2005/0151778 A1* | 7/2005 | Nishi et al. | 347/29 |
| 2005/0151878 A1* | 7/2005 | Kasahara et al. | 348/448 |
| 2005/0174365 A1* | 8/2005 | Malmstrom | 345/698 |
| 2005/0243216 A1* | 11/2005 | Salzer et al. | 348/701 |

FOREIGN PATENT DOCUMENTS

| | | |
|---|---|---|
| GB | 2 268 659 | 1/1994 |
| JP | 3295437 B2 | 10/1992 |
| JP | 10-126748 A | 5/1998 |
| JP | 2004-120757 A | 4/2004 |
| WO | WO-2007/052452 A1 | 5/2007 |

\* cited by examiner

IMAGE DISPLAY DEVICE AND METHOD

TECHNICAL FIELD

The present invention relates to an image display device and method including a function of converting a frame rate or field rate and, more particularly, to an image display device and an image displaying method of the device that prevent the image quality deterioration, in the case of combining and displaying a first image signal and a second image signal, in a display part of the first and second image signals due to a motion-compensated rate conversion process.

BACKGROUND OF THE INVENTION

As compared to conventional cathode-ray tubes (CRTs) primarily used for realizing moving images, LCDs (Liquid Crystal Displays) have a drawback, so-called motion blur, which is the blurring of outline of a movement portion perceived by a viewer when displaying an image with movement. It is suggested that this motion blur arises from the LCD display mode itself (see, e.g., patent document 1 and non-patent document 1).

Since fluorescent material is scanned by an electron beam to cause emission of light for display in CRTs, the light emission of pixels is basically impulse-like although slight afterglow of the fluorescent material exists. This is called an impulse-type display mode. On the other hand, in the case of LCDs, an electric charge is accumulated by applying an electric field to liquid crystal and is retained at a relatively high rate until the next time the electric field is applied. Especially, in the case of the TFT mode, since a TFT switch is provided for each dot configuring a pixel and each pixel normally has an auxiliary capacity, the ability to retain the accumulated electric charge is extremely high. Therefore, the light emission is continued until the pixels are rewritten by the application of the electric field based on image information of the next frame or field (hereinafter, represented by the frame). This is called a hold-type display mode.

Since the impulse response of the image displaying light has a temporal spread in the above hold-type display mode, temporal frequency characteristics are deteriorated along with spatial frequency characteristics, resulting in the motion blur. That is, since the human eye can smoothly follow a moving object, if the light emission time is long as in the case of the hold type, movement of image seems jerky and unnatural due to a time integration effect.

To improve the motion blur in the above hold-type display mode, a frame rate (number of frames) is converted by interpolating an image between frames in a known technology. This technology is called FRC (Frame Rate Converter) and is put to practical use in liquid crystal display devices, etc.

Conventionally known methods of converting the frame rate include various techniques such as simply repeating read-out of the same frame for a plurality of times and frame interpolation using linear interpolation between frames (see, e.g., non-patent document 2). However, in the case of the frame interpolation process using the linear interpolation between frames, unnaturalness of motion (jerkiness, judder) is generated due to the frame rate conversion, and the motion blur disturbance due to the above hold-type display mode cannot sufficiently be improved, resulting in inadequate image quality.

To eliminate effects of the jerkiness, etc., and improve quality of moving images, a motion-compensated frame interpolation (motion compensation) process using motion vectors has been proposed. In this motion compensation process, since a moving image itself is captured and compensated, highly natural moving images can be acquired without deteriorating the resolution and generating the jerkiness. Since interpolation image signals are generated with motion compensation, the motion blur disturbance due to the above hold-type display mode can sufficiently be improved.

Above patent document 1 discloses a technology of motion-adaptively generating interpolation frames to increase a frame frequency of a display image for improving deterioration of spatial frequency characteristics causing the motion blur. In this case, at least one interpolation image signal interpolated between frames of a display image is motion-adaptively created from the previous and subsequent frames, and the created interpolation image signals are interpolated between the frames and are sequentially displayed.

FIG. 44 is a block diagram of an outline configuration of an FRC drive display circuit in a conventional liquid crystal display device and, in FIG. 44, the FRC drive display circuit includes an FRC portion 100 that converts the number of frames of the input image signal by interpolating the image signals subjected to the motion compensation process between frames of the input video signal, an active-matrix liquid crystal display panel 103 having a liquid crystal layer and an electrode for applying the scan signal and the data signal to the liquid crystal layer, and an electrode driving portion 104 for driving a scan electrode and a data electrode of the liquid crystal display panel 103 based on the image signal subjected to the frame rate conversion by the FRC portion 100.

The FRC portion 100 includes a motion vector detecting portion 101 that detects motion vector information from the input image signal and an interpolation frame generating portion 102 that generates interpolation frames based on the motion vector information acquired by the motion vector detecting portion 101.

In the above configuration, for example, the motion vector detecting portion 101 may obtain the motion vector information with the use of a block matching method, a gradient method, etc., or if the motion vector information is included in the input image signal in some form, this information may be utilized. For example, the image data compression-encoded with the use of the MPEG format includes motion vector information of a moving image calculated at the time of encoding, and this motion vector information may be acquired.

FIG. 45 is a view for explaining a frame rate conversion process by the conventional FRC drive display circuit shown in FIG. 44. The FRC portion 100 generates interpolation frames (gray-colored images in FIG. 45) between frames with the motion compensation using the motion vector information output from the motion vector detecting portion 101 and sequentially outputs the generated interpolation frame signals along with the input frame signals to perform a process of converting the frame rate of the input image signal from 60 frames per second (60 Hz) to 120 frames per second (120 Hz).

FIG. 46 is a view for explaining an interpolation frame generation process of the motion vector detecting portion 101 and the interpolation frame generating portion 102. The motion vector detecting portion 101 uses the gradient method to detect a motion vector 105 from, for example, a frame #1 and a frame #2 shown in FIG. 45. That is, the motion vector detecting portion 101 obtains the motion vector 105 by measuring a direction and an amount of movement in 1/60 second between the frame #1 and the frame #2. The interpolation frame generating portion 102 then uses the obtained motion vector 105 to allocate an interpolation vector 106 between the frame #1 and the frame #2. An interpolation frame 107 is generated by moving an object (in this case, an automobile) from a position of the frame #1 to a position after 1/120 second based on the interpolation vector 106.

By performing the motion-compensated frame interpolation process with the use of the motion vector information to increase a display frame frequency in this way, the display state of the LCD (the hold-type display mode) can be made closer to the display state of the CRT (the impulse-type display mode) and the image quality deterioration can be improved which is due to the motion blur generated when displaying a moving image.

In the motion-compensated frame interpolation process, it is essential to detect the motion vectors for the motion compensation. For example, the block matching method, the gradient method, etc., are proposed as representative techniques for the motion vector detection. In the gradient method, the motion vector is detected for each pixel or small block between two consecutive frames and this is used to interpolate each pixel or small block of the interpolation frame between two frames. That is, an image at an arbitrary position between two frames is interpolated at an accurately compensated position to convert the number of frames.

Patent Document 1: Specification of Japanese Patent No. 3295437

Non-Patent Document 1: Ishiguro Hidekazu and Kurita Taiichiro, "Consideration on Motion Picture Quality of the Hold Type Display with an octuple-rate CRT", IEICE Technical Report, Institute of Electronics, Information and Communication Engineers, ETD96-4 (1996-06), p. 19-26

Non-Patent Document 2: Yamauchi Tatsuro, "TV Standards Conversion", Journal of the Institute of Television Engineers of Japan, Vol. 45, No. 12, pp. 1534-1543 (1991)

DISCLOSURE OF THE INVENTION

Problems to be Solved by the Invention

In a liquid crystal display device including the above FRC circuit, when combining and displaying a first image signal and a second image signal different from the first image signal, if an image composite circuit is provided on the subsequent stage of the FRC circuit, the image composite circuit must perform faster clock operation in accordance with a frame rate increased by the FRC. In this case, a chip set is needed for supporting the faster clock operation, and this is not practical from the standpoint of cost, etc.

Therefore, the image composite circuit must be provided on the previous stage of the FRC circuit, and in this case, image quality of a display (peripheral) part may be deteriorated in the first image signal or the second image signal due to the effect of the motion compensation by the FRC process. This image quality deterioration is considered to be mainly caused by detection errors, motion compensation errors, etc., of motion vectors occurring because of mixing of a plurality of images (including still images) having different motion characteristics.

The FRC circuit may perform a process with the input image signal input in RGB converted into a different format such as YPbPr to reduce a memory capacity. If the image composite circuit is provided on the previous stage of the FRC circuit in such a case, the composite image signal formed in RGB is converted by the FRC circuit into a different format such as YPbPr. As a result, it is problematic that the display part of the composite image signal is displayed in a blurred state due to this conversion process.

The present invention was conceived in view of the above situations and it is therefore the object of the present invention to prevent the image quality deterioration in a display part of a composite image signal due to an FRC process in an image display device including a motion-compensated frame rate converting (FRC) portion.

Means for Solving the Problems

In order to solve the above problems, a first technical means of the present invention is an image display device comprising a rate converting means that interpolates an image signal subjected to a motion compensation process between frames or fields of an input image signal to convert and output the number of frames or fields of the input image signal to a display panel, wherein when a first image signal and a second image signal different from the first image signal are combined and displayed, the motion compensation process in the rate converting means is disabled.

A second technical means is the image display device as defined in the first technical means, wherein the rate converting means includes a motion vector detecting portion that detects motion vector information between consecutive frames or fields included in the input image signal, an interpolation vector allocating portion that allocates an interpolation vector between the frames or the fields based on the detected motion vector information, an interpolation image generating portion that generates an interpolation image signal from the allocated interpolation vector, and an image interpolating portion that interpolates the generated interpolation image signal between the frames or the fields.

A third technical means is the image display device as defined in the second technical means, wherein when the first image signal and the second image signal are combined and displayed, the motion vector detected by the motion vector detecting portion is set to zero-vector to disable the motion compensation process.

A fourth technical means is the image display device as defined in the second technical means, wherein when the first image signal and the second image signal are combined and displayed, the interpolation vector allocated by the interpolation vector allocating portion is set to zero-vector to disable the motion compensation process.

A fifth technical means is an image display device comprising a rate converting means that interpolates an image signal subjected to a motion compensation process between frames or fields of an input image signal to convert and output the number of frames or fields of the input image signal to a display panel, wherein when a first image signal and a second image signal different from the first image signal are combined and displayed, the input image signal is output to the display panel without converting the number of frames or fields of the input image signal.

A sixth technical means is the image display device as defined in the fifth technical means, wherein drive frequency of the display panel displaying the image signals can be changed, and wherein when the first image signal and the second image signal are combined and displayed, the drive frequency of the display panel is changed in accordance with frame frequency or field frequency of the input image signal.

A seventh technical means is an image display device comprising a rate converting means that interpolates an image signal subjected to a motion compensation process between frames or fields of an input image signal to convert and output the number of frames or fields of the input image signal to a display panel, further comprising another rate converting means that inserts an image signal not subjected to the motion compensation process between frames or fields of the input image signal to convert the number of frames or fields of the input image signal, wherein when a first image signal and a second image signal different from the first image signal are combined and displayed, an image signal with the number of frames or fields converted by the another rate converting means is output to the display panel for all pixel regions including the first signal and the second image signal.

An eighth technical means is the image display device as defined in the seventh technical means, wherein the another rate converting means inserts between frames or fields of the input image signal an image signal of the frames or fields to convert the number of frames or fields of the input image signal.

A ninth technical means is the image display device as defined in the seventh technical means, wherein the another rate converting means interpolates an image signal subjected to a linear interpolation process between frames or fields of the input image signal to convert the number of frames or fields of the input image signal.

A tenth technical means is the image display device as defined in the seventh technical means, wherein the another rate converting means inserts a predetermined monochromatic image signal between frames or fields of the input image signal to convert the number of frames or fields of the input image signal.

An eleventh technical means is an image display device comprising a rate converting means that interpolates an image signal subjected to a motion compensation process between frames or fields of an input image signal to convert and output the number of frames or fields of the input image signal to a display panel, wherein when a first image signal and a second image signal different from the first image signal are combined and displayed, the compensation intensity of the motion compensation process in the rate converting means is varied.

A twelfth technical means is the image display device as defined in the eleventh technical means, wherein the rate converting means includes an interpolation image generating portion that performs weighted addition of the image signal subjected to the motion compensation process and an image signal subjected to a linear interpolation process at a predetermined rate to generate an interpolation image signal, and wherein when the first image signal and the second image signal are combined and displayed, the weighted addition rate is varied.

A thirteenth technical means is the image display device as defined in the twelfth technical means, wherein when the first image signal and the second image signal are combined and displayed, the interpolation image generating portion defines the image signal subjected to the linear interpolation process as the interpolation image signal, and wherein when the first image signal and the second image signal are not combined and displayed, the interpolation image generating portion defines the image signal subjected to the motion compensation process as the interpolation image signal.

A fourteenth technical means is the image display device as defined in any one of the first to thirteenth technical means, wherein the second image signal is a character signal combined within the first image signal.

A fifteenth technical means is the image display device as defined in the fourteenth technical means, wherein the character signal is an on-screen display signal generated within the image display device.

A sixteenth technical means is the image display device as defined in any one of the first to thirteenth technical means, wherein the second image signal is a sub-screen image signal combined within the first image signal.

A seventeenth technical means is the image display device as defined in the sixteenth technical means, wherein the sub-screen image signal is a picture-in-picture display signal generated in the image display device.

An eighteenth technical means is the image display device as defined in any one of the first to thirteenth technical means, wherein the second image signal is a background image signal combined on the outside of the first image signal.

A nineteenth technical means is the image display device as defined in the eighteenth technical means, wherein the background image signal is a data information display signal.

A twentieth technical means is the image display device as defined in the eighteenth technical means, wherein the background image signal is a program information display signal.

A twenty-first technical means is the image display device as defined in any one of the first to thirteenth technical means, wherein the second image signal is an another-screen image signal combined on the outside of the first image signal.

A twenty-second technical means is the image display device as defined in the twenty-first technical means, wherein the another-screen image signal is a picture-out-picture display signal generated in the image display device.

A twenty-third technical means is an image display device comprising a rate converting means that interpolates an image signal subjected to a motion compensation process between frames or fields of an input image signal to convert and output the number of frames or fields of the input image signal to a display panel, wherein when a first image signal and a second image signal different from the first image signal are combined and displayed, the motion compensation process in the rate converting means is disabled for a pixel combined with the second image signal or a region including the pixel.

A twenty-fourth technical means is the image display device as defined in the twenty-third technical means, wherein the rate converting means includes a motion vector detecting portion that detects motion vector information between consecutive frames or fields included in the input image signal, an interpolation vector allocating portion that allocates an interpolation vector between the frames or the fields based on the detected motion vector information, an interpolation image generating portion that generates an interpolation image signal from the allocated interpolation vector, and an image interpolating portion that interpolates the generated interpolation image signal between the frames or the fields.

A twenty-fifth technical means is the image display device as defined in the twenty-fourth technical means, wherein when the first image signal and the second image signal are combined and displayed, an interpolation vector of an interpolation block combined with the second image signal is set to zero-vector to disable the motion compensation process for pixels in the interpolation block.

A twenty-sixth technical means is the image display device as defined in the twenty-fifth technical means, wherein flag information is added to the interpolation block combined with the second image signal so that output for the interpolation vector of the interpolation block having the flag information added is a zero.

A twenty-seventh technical means is an image display device comprising a rate converting means that interpolates an image signal subjected to a motion compensation process between frames or fields of an input image signal to convert and output the number of frames or fields of the input image signal to a display panel, further comprising another rate converting means that inserts an image signal not subjected to the motion compensation process between frames or fields of the input image signal to convert the number of frames or fields of the input image signal, wherein when a first image signal and a second image signal different from the first image signal are combined and displayed, an image signal with the number of frames or fields converted by the another rate converting means being output to the display panel for a pixel combined with the second image signal or a region including the pixel.

A twenty-eighth technical means is the image display device as defined in the twenty-seventh technical means, wherein the another rate converting means interpolates an image signal subjected to a linear interpolation process between frames or fields of the input image signal to convert the number of frames or fields of the input image signal.

A twenty-ninth technical means is the image display device as defined in the twenty-seventh technical means, wherein the another rate converting means inserts between frames or fields of the input image signal an image signal of the frames or fields to convert the number of frames or fields of the input image signal.

A twenty-seventh technical means is an image display device comprising a rate converting means that interpolates an image signal subjected to a motion compensation process between frames or fields of an input image signal to convert and output the number of frames or fields of the input image signal to a display panel, wherein when a first image signal and a second image signal different from the first image signal are combined and displayed, compensation intensity of the motion compensation process in the rate converting means is varied for a pixel combined with the second image signal or a region including the pixel.

A twenty-eighth technical means is the image display device as defined in the twenty-seventh technical means, wherein the rate converting means includes an interpolation image generating portion that performs weighted addition of the image signal subjected to the motion compensation process and an image signal subjected to a linear interpolation process at a predetermined rate to generate an interpolation image signal, and wherein when the first image signal and the second image signal are combined and displayed, the weighted addition rate is varied for a pixel combined with the second image signal or a region including the pixel.

A twenty-ninth technical means is the image display device as defined in the twenty-eighth technical means, wherein when the first image signal and the second image signal are combined and displayed, the interpolation image generating portion defines the image signal subjected to the linear interpolation process as the interpolation image signal for a pixel combined with the second image signal or a region including the pixel, and wherein the interpolation image generating portion defines the image signal subjected to the motion compensation process as the interpolation image signal for a pixel not combined with the second image signal or a region including the pixel.

A thirtieth technical means is the image display device as defined in any one of the twenty-third to twenty-ninth technical means, wherein the second image signal is a character signal combined within the first image signal.

A thirty-first technical means is the image display device as defined in the thirtieth technical means, wherein the character signal is an on-screen display signal generated within the image display device.

A thirty-second technical means is the image display device as defined in any one of the twenty-third to twenty-ninth technical means, wherein the second image signal is a sub-screen image signal combined within the first image signal.

A thirty-third technical means is the image display device as defined in the thirty-second technical means, wherein the sub-screen image signal is a picture-in-picture display signal generated in the image display device.

A thirty-fourth technical means is the image display device as defined in any one of the twenty-third to twenty-ninth technical means, wherein the second image signal is a background image signal combined on the outside of the first image signal.

A thirty-fifth technical means is the image display device as defined in the thirty-fourth technical means, wherein the background image signal is a data information display signal.

A thirty-sixth technical means is the image display device as defined in the thirty-fourth technical means, wherein the background image signal is a program information display signal.

A thirty-seventh technical means is the image display device as defined in any one of the twenty-third to twenty-ninth technical means, wherein the second image signal is an another-screen image signal combined on the outside of the first image signal.

A thirty-eighth technical means is the image display device as defined in the thirty-seventh technical means, wherein the another-screen image signal is a picture-out-picture display signal generated by the image display device.

A thirty-ninth technical means is an image displaying method having the step of interpolating an image signal subjected to a motion compensation process between frames or fields of an input image signal to convert the number of frames or fields of the input image signal, the method comprising the steps of: determining whether a first image signal and a second image signal different from the first image signal are combined; and disabling the motion compensation process when it is determined that the first image signal and the second image signal are combined.

A fortieth technical means is an image displaying method having the step of interpolating an image signal subjected to a motion compensation process between frames or fields of an input image signal to convert the number of frames or fields of the input image signal, the method comprising the steps of: determining whether a first image signal and a second image signal different from the first image signal are combined; and changing a drive frequency of a display panel in accordance with a frame frequency or a field frequency of the input image signal when it is determined that the first image signal and the second image signal are combined.

A forty-first technical means is an image displaying method having the step of interpolating an image signal subjected to a motion compensation process between frames or fields of an input image signal to convert the number of frames or fields of the input image signal, the method comprising the steps of: determining whether a first image signal and a second image signal different from the first image signal are combined; and inserting between frames or fields of the input image signal an image signal of the frames or fields to convert the number of frames or fields of the input image signal for all pixel regions including the first image signal and the second image signal when it is determined that the first image signal and the second image signal are combined.

A forty-second technical means is an image displaying method having the step of interpolating an image signal subjected to a motion compensation process between frames or fields of an input image signal to convert the number of frames or fields of the input image signal, the method comprising the steps of: determining whether a first image signal and a second image signal different from the first image signal are combined; and interpolating an image signal subjected to a linear interpolation process between frames or fields of the input image signal to convert the number of frames or fields of the input image signal for all pixel regions including the first image signal and the second image signal when it is determined that the first image signal and the second image signal are combined.

A forty-third technical means is an image displaying method having the step of interpolating an image signal subjected to a motion compensation process between frames or fields of an input image signal to convert the number of frames or fields of the input image signal, the method comprising the steps of: determining whether a first image signal and a second image signal different from the first image signal are combined; and inserting a predetermined monochromatic image signal between frames or fields of the input image signal to convert the number of frames or fields of the input image signal when it is determined that the first image signal and the second image signal are combined.

A forty-fourth technical means is an image displaying method having the step of interpolating an image signal subjected to a motion compensation process between frames or fields of an input image signal to convert the number of frames or fields of the input image signal, the method comprising the steps of: determining whether a first image signal and a second image signal different from the first image signal are combined; and varying compensation intensity of the motion compensation process when it is determined that the first image signal and the second image signal are combined.

A forty-fifth technical means is an image displaying method having the step of interpolating an image signal subjected to a motion compensation process between frames or fields of an input image signal to convert the number of frames or fields of the input image signal, the method comprising the steps of: determining whether a first image signal and a second image signal different from the first image signal are combined; and disabling the motion compensation process for a pixel combined with the second image signal or a region including the pixel when it is determined that the first image signal and the second image signal are combined.

A forty-ninth technical means is an image displaying method having the step of interpolating an image signal subjected to a motion compensation process between frames or fields of an input image signal to convert the number of frames or fields of the input image signal, the method comprising the steps of: determining whether a first image signal and a second image signal different from the first image signal are combined; and inserting between frames or fields of the input image signal an image signal of the frames or fields for a pixel combined with the second image signal or a region including the pixel when it is determined that the first image signal and the second image signal are combined.

A fiftieth technical means is an image displaying method having the step of interpolating an image signal subjected to a motion compensation process between frames or fields of an input image signal to convert the number of frames or fields of the input image signal, the method comprising the steps of: determining whether a first image signal and a second image signal different from the first image signal are combined; and interpolating an image signal subjected to a linear interpolation process between frames or fields of the input image signal for a pixel combined with the second image signal or a region including the pixel when it is determined that the first image signal and the second image signal are combined.

A forty-sixth technical means is an image displaying method having the step of interpolating an image signal subjected to a motion compensation process between frames or fields of an input image signal to convert the number of frames or fields of the input image signal, the method comprising the steps of determining whether a first image signal and a second image signal different from the first image signal are combined; and varying compensation intensity of the motion compensation process for a pixel combined with the second image signal or a region including the pixel when it is determined that the first image signal and the second image signal are combined.

Effect of the Invention

According to the present invention, if a first image signal and a second image signal different from the first image signal are combined and displayed, the image quality deterioration can effectively be prevented in the display part of the second image signal by not performing an interpolation process with motion compensation.

If a first image signal and a second image signal different from the first image signal are combined and displayed, the image quality deterioration can effectively be prevented in the display part of the second image signal by not performing the interpolation process with motion compensation for a pixel combined with the second image signal or a region including the pixel.

Figure 1:
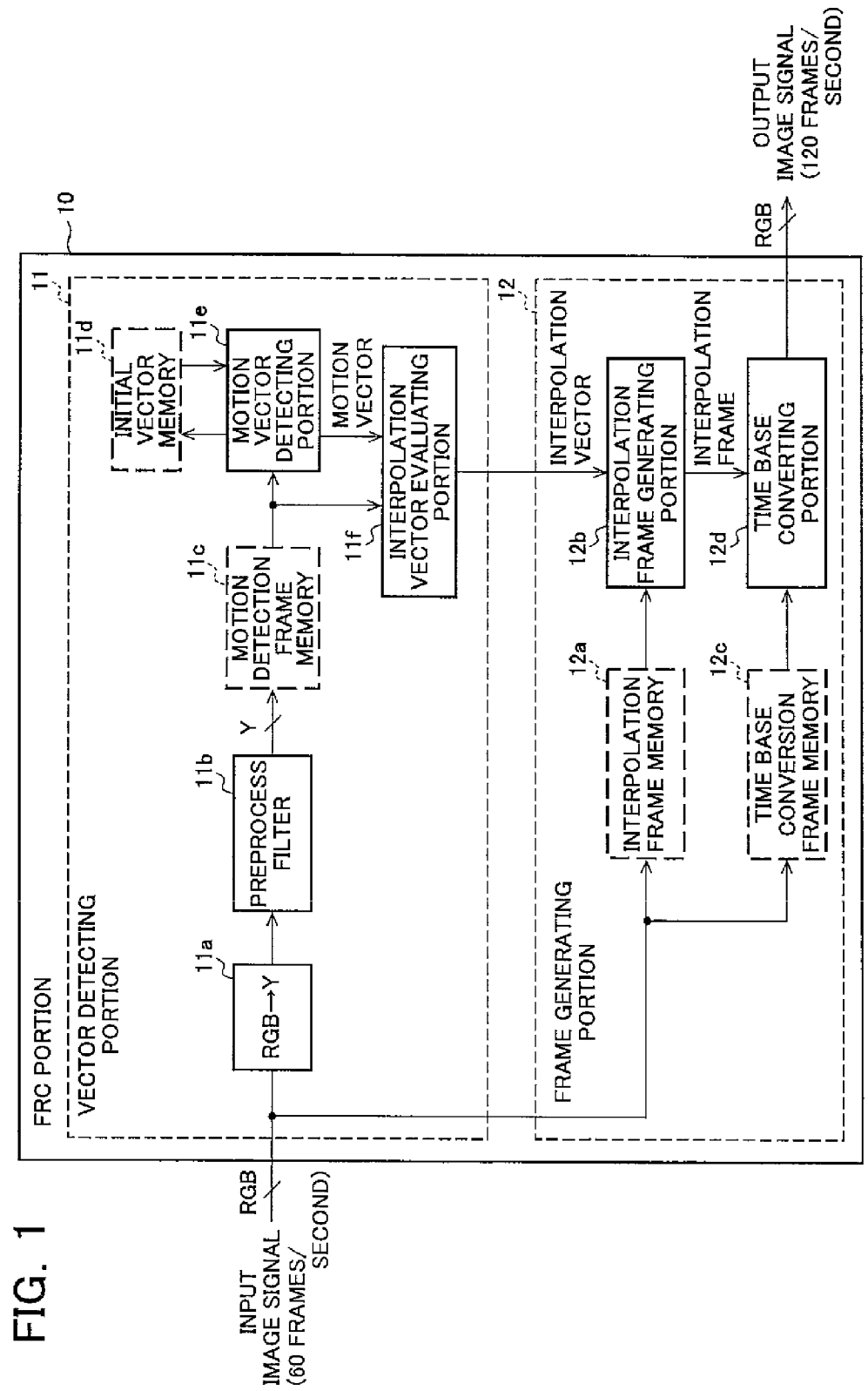
FIG. 1 is a block diagram of an exemplary configuration of a frame rate converting portion included in an image display device of the present invention.

EXPLANATIONS OF REFERENCE NUMERALS 10, 100 . . . frame rate converting (FRC) portion; 11 . . . vector detecting portion; 11a . . . luminance signal extracting portion; 11b . . . preprocess filter; 11c . . . motion detection frame memory; 11d . . . initial vector memory; 11e, 101 . . . motion vector detecting portion; 11f . . . interpolation vector evaluating portion; 12 . . . frame generating portion; 12a . . . interpolation frame memory; 12b, 102 . . . interpolation frame generating portion; 12c . . . time base conversion frame memory; 12d . . . time base converting portion; 12e, 12g . . . compensation intensity varying portion; 12f . . . interpolation vector memory; 13 . . . combining portion; 14 . . . OSD processing portion; 15 . . . controlling portion; 16, 41 . . . switching portion; 17 . . . zero vector; 18, 104 . . . electrode driving portion, 19, 103 . . . liquid crystal display panel; 20 . . . sub-screen processing portion; 21, 42 . . . path; 22, 44 . . . memory; 23, 43 . . . linear interpolation processing portion; 24 . . . black-level signal insert processing portion; 105 . . . motion vector; 106 . . . interpolation vector; and 107 . . . interpolation frame.

PREFERRED EMBODIMENTS OF THE INVENTION

Preferred embodiments of an image display device of the present invention will hereinafter be described with reference to the accompanying drawings. Although the present invention is applicable to either field signals and interpolation field signals or frame signals and interpolation frame signals, the frame signals and the interpolation frame signals will be described as a representative example since both (field and frame) are in a similar relationship to each other.

FIG. 1 is a block diagram of a configuration example of a motion compensated frame rate converting portion included in the image display device of the present invention; in FIG. 1, 10 denotes a frame rate converting portion (hereinafter, FRC portion); and the FRC portion 10 corresponds to a rate converting means of the present invention and is made up of a vector detecting portion 11 that detects a motion vector between two consecutive frames included in an input image signal and a frame generating portion 12 that generates an interpolation frame (interpolation image) based on the detected motion vector. Although the iterative gradient method is used for the motion vector detection in the description of the vector detecting portion 11, the method is not limited to the iterative gradient method and may be the block matching method.

Since a feature of the iterative gradient method is that a motion vector can be detected for each block, several types of movement amounts can be detected, and a motion vector can be detected even from a moving object having a small region. The circuit configuration thereof can be realized in a smaller scale than other modes (such as the block matching method). In the iterative gradient method, an already detected motion vector of a neighboring block is defined as an initial deflection vector, which is used as a starting point to repeat calculations of the gradient method for a detected block. With this method, a substantially accurate movement amount can be acquired by repeating the gradient method about two times.

In FIG. 1, the vector detecting portion 11 includes a luminance signal extracting portion 11a that extracts a luminance signal (Y signal) from an input image signal (RGB signal), a preprocess filter 11b that restrains a high bandwidth by applying LPF to the extracted Y signal, a motion detection frame memory 11c, an initial vector memory 11d that accumulates initial vector candidates, a motion vector detecting portion 11e that detects motion vectors between frames with the use of the iterative gradient method, and an interpolation vector evaluating portion 11f that allocates an interpolation vector between the frames based on the detected motion vectors.

The FRC portion 10 corresponds to the rate converting means of the present invention; the motion vector detecting portion 11e corresponds to a motion vector detecting portion of the present invention; and the interpolation vector evaluating portion 11f corresponds to an interpolation vector allocating portion of the present invention.

Since a differential component of a pixel is used for the calculations of the above iterative gradient method, the method is easily affected by noises and calculation errors are increased if large gradient variations exist in a detected block, and therefore, the LPF is applied by the preprocess filter 11b to restrain the high bandwidth. In the initial vector memory 11d, motion vectors (initial vector candidates) already detected in a frame immediately before the previous frame are accumulated as initial vector candidates.

The motion vector detecting portion 11e selects a motion vector closest to the motion vector of the detected block for an initial vector from the initial vector candidates accumulated in the initial vector memory 11d. That is, the initial vector is selected by the block matching method from the already detected motion vectors (initial vector candidates) in neighboring blocks of the detected block. The motion vector detecting portion 11e uses the selected initial vector as a starting point to detect a motion vector between a previous frame and a current frame through the calculations of the gradient method.

The interpolation vector evaluating portion 11f evaluates the motion vectors detected by the motion vector detecting portion 11e, allocates an optimum interpolation vector to an interpolation block between frames based on the evaluation result, and outputs the vector to the frame generating portion 12.

The frame generating portion 12 includes an interpolation frame memory 12a that accumulates two input frames (previous frame and current frame), an interpolation frame generating portion 12b that generates an interpolation frame based on the two input frames from the interpolation frame memory 12a and the interpolation vector from the interpolation vector evaluating portion 11f, a time base conversion frame memory 12c for accumulating the input frames (previous frame and current frame), and a time base converting portion 12d that inserts the interpolation frame from the interpolation frame generating portion 12b into the input frames from the time base conversion frame memory 12c to generate an output image signal (RGB signal).

The interpolation frame generating portion 12b corresponds to an interpolation image generating portion of the present invention and the time base converting portion 12d corresponds to an image interpolating portion of the present invention.

Figure 2:
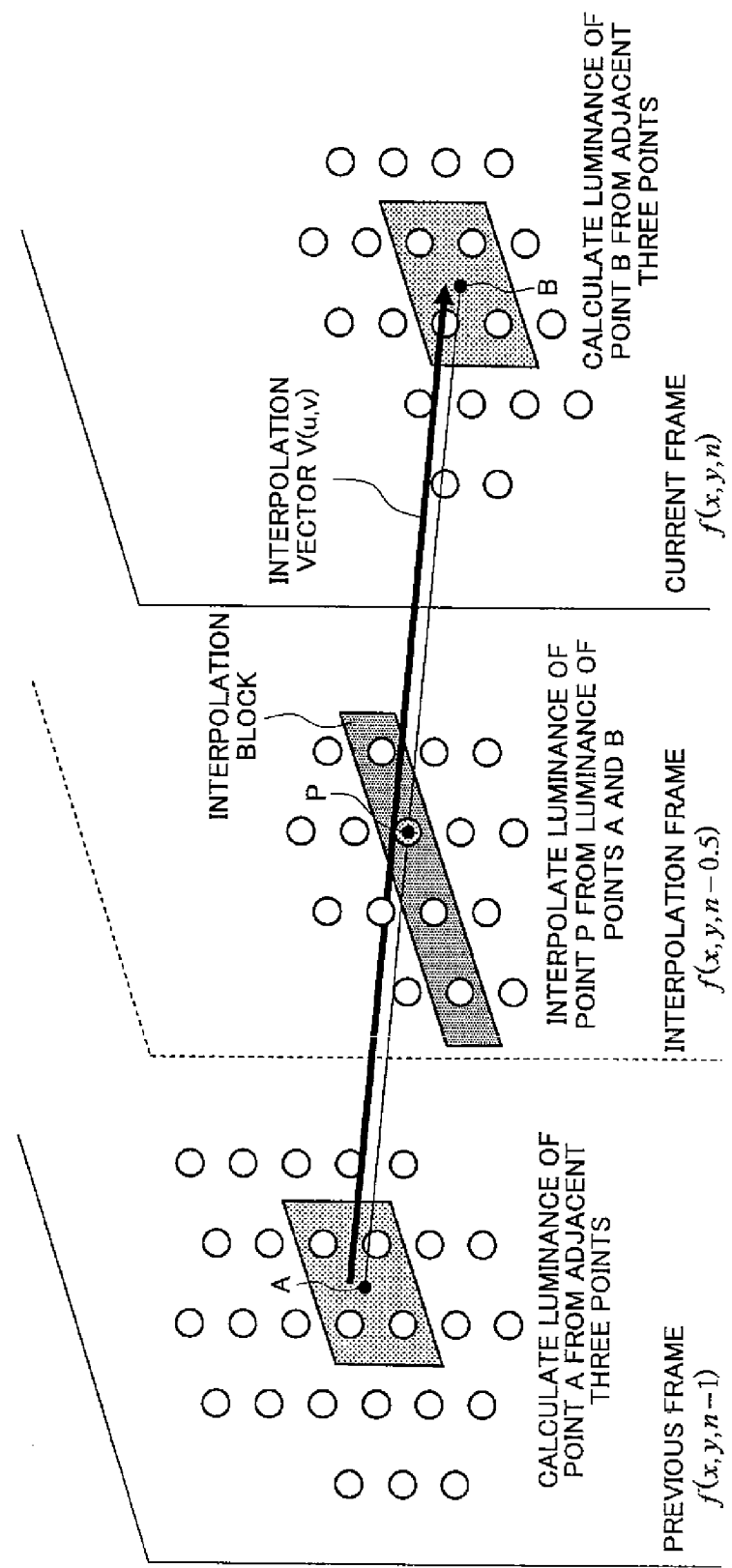
FIG. 2 is a view for explaining an example of an interpolation frame generating process of a frame generating portion.

FIG. 2 is a view for explaining an example of the interpolation frame generating process of the frame generating portion 12. The interpolation frame generating portion 12b stretches an interpolation vector V allocated to the interpolation block into the previous frame and the current frame and uses pixels located adjacent to the intersecting points with the frames to interpolate the pixels in the interpolation block. For example, in the previous frame, the luminance of a point A is calculated from three adjacent points. In the current frame, the luminance of a point B is calculated from three adjacent points. In the interpolation frame, the luminance of a point P is interpolated using the luminance of the points A and B. The luminance of the point P may be an average of the luminance of the point A and the luminance of the point B, for example.

The interpolation frame generated as above is sent to the time base converting portion 12d. The time base converting portion 12d sandwiches the interpolation frame between the previous frame and the current frame to perform a process of converting a frame rate. In this way, the FRC portion 10 can convert the input image signal (60 frames/sec) into a motion-compensated output image signal (120 frames/sec), which can be output to a display panel to reduce the motion blur and improve the moving image quality. Although the 60-frame/sec input image signal is converted into the 120-frame/sec output image signal in the frame rate conversion of this description, this is obviously applicable to the case of acquiring 90-frame/sec and 180-frame/sec output image signals, for example.

The image display device of the present invention includes the FRC portion 10 shown in FIG. 1 and the main object thereof is to disable the motion compensation process of the FRC portion 10 when combining and displaying a first image signal (e.g., a moving image signal) and a second image signal (e.g., a still character signal such as OSD) having motion characteristics different from the first image signal to prevent the image quality deterioration in a display part (e.g., a character display part) of the second image signal due to the FRC process. Although the present invention is applicable to general image display devices having the hold-type display characteristics such as liquid crystal displays, organic EL displays, and electrophoretic displays, a representative example described in the following embodiments will be the case of applying the present invention to a liquid crystal display device using a liquid crystal display panel for a display panel.

First Embodiment

In a first embodiment of the present invention, it is assumed that the first image signal is, for example, a television image signal acquired by receiving broadcast and that the second image signal is, for example, a character signal such as OSD (On Screen Display) generated within the device, and when both image signals are combined (overlapped) and displayed, the output of the motion vector detecting portion 11e is forced to be zero-vector to disable the motion compensation process of the FRC portion 10.

An image signal input to the FRC portion 10 is assumed to be an input image signal; if the first image signal is combined with the second image signal, the combined image signal is the input image signal; and if the first image signal is not combined with the second image signal, the first image signal is the input image signal. This applies to the following embodiments.

Figure 3:
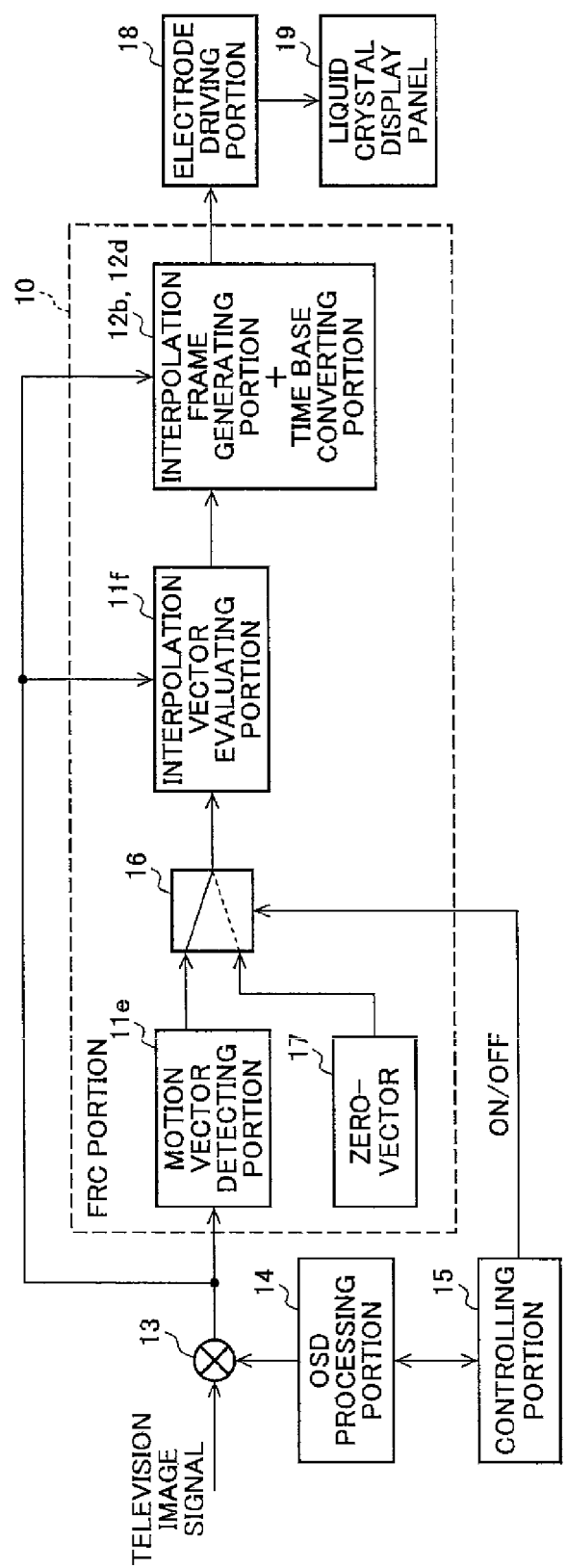
FIG. 3 is a block diagram of an exemplary main configuration of a liquid crystal display device according to a first embodiment of the present invention.

FIG. 3 is a block diagram of an exemplary main configuration of a liquid crystal display device according to the first embodiment of the present invention and the liquid crystal display device includes the FRC portion 10, a combining portion 13, an OSD processing portion 14, a controlling portion 15, a switching portion 16, an electrode driving portion 18, and a liquid crystal display panel 19. The switching portion 16 is disposed between the motion vector detecting portion 11e and the interpolation vector evaluating portion 11f within the FRC portion 10 and switches the motion vector from the motion vector detecting portion 11e to a zero-vector 17 in accordance with the instruction from the controlling portion 15.

The OSD processing portion 14 generates an on-screen display signal (OSD signal) for performing the on-screen display of predetermined characters, numeric characters, symbols, etc. Turning on/off of the OS display is controlled in accordance with instruction operations performed by a user with the use of a remote controller (remote controlling device) etc. The combining portion 13 combines (overlaps) the OSD signal from the OSD processing portion 14 with the television image signal.

The liquid crystal display panel 19 is an active-matrix liquid crystal display that has a liquid crystal layer and electrodes for applying scan signals and data signals to the liquid crystal layer. The electrode driving portion 18 is a display driver for driving the scan electrodes and the data electrodes of the liquid crystal display panel 19 based on the image signal subjected to the frame rate conversion by the FRC portion 10. The controlling portion 15 includes a CPU for controlling the above portions and performs control such that the motion compensation process of the FRC portion 10 is disabled when the OSD signal is overlapped with the television image signal by the OSD processing portion 14 in accordance with the user's instruction, etc.

The signal overlapped with the television image signal may be a character signal in a stationary state such as characters, numeric characters, symbols, and images, is not limited to the OSD signal generated within the device, and may be a character (caption) signal transmitted/received through text broadcasting/teletext broadcasting. Alternatively, the signal may be a character information signal such as a program logo and telop preliminarily combined with the television image signal on the transmission side such as a broadcast station. In this case, it is detected whether the character information signal is combined, and the motion compensation process of the FRC portion 10 may be disabled if the character information signal is combined. However, if characters are in motion such as scrolling, it is preferable to execute the motion compensation process of the FRC portion 10.

The drive frequency of the liquid crystal display panel 19 is a frame frequency converted by the FRC portion 10. Therefore, if an image signal input with a frame frequency of 60 Hz is converted by the FRC portion 10 into a frame frequency of 120 Hz, the drive frequency of the liquid crystal display panel 19 is 120 Hz. However, if the frame frequency conversion of the FRC process is not performed and the input image signal is directly displayed and output, the drive frequency of the liquid crystal display panel 19 is the frame frequency of the input image signal.

If the OSD processing portion 14 overlaps the OSD signal with the television image signal, the controlling portion 15 switches the switching portion 16 to the zero-vector 17 to forcibly replace the motion vector detected by the motion vector detecting portion 11e with the zero-vector. If the OSD processing portion 14 does not overlap the OSD signal with the television image signal, the switching portion 16 is switched to the motion vector detecting portion 11e to input the motion vector detected by the motion vector detecting portion 11e to the interpolation vector evaluating portion 11f.

Therefore, the moving image quality can be improved by the motion-compensated FRC process at the time of the normal moving image display and, since the motion vector is set to be zero-vector to disable the motion compensation process if the image signal overlapped with the OSD signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed.

Second Embodiment

In a second embodiment of the present invention, it is assumed that the first image signal is, for example, a television image signal (a main-screen image signal) acquired by receiving broadcast and that the second image signal is, for example, a sub-screen image signal such as PinP (Picture in Picture) generated within the device, and when both image signals are combined (overlapped) and displayed, the output of the motion vector detecting portion 11e is forced to be zero-vector to disable the motion compensation process of the FRC portion 10.

Figure 4:
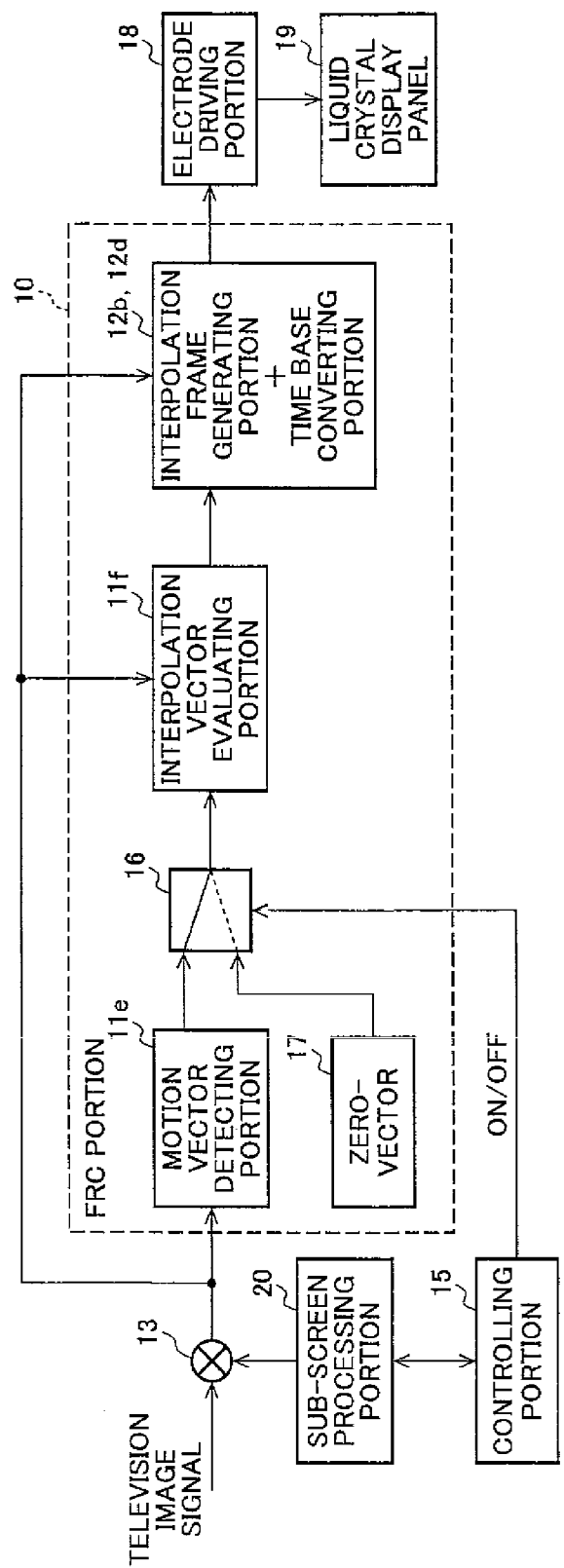
FIG. 4 is a block diagram of an exemplary main configuration of a liquid crystal display device according to a second embodiment of the present invention.

FIG. 4 is a block diagram of an exemplary main configuration of a liquid crystal display device according to the second embodiment of the present invention and the liquid crystal display device includes the FRC portion 10, the combining portion 13, a sub-screen processing portion 20, the controlling portion 15, the switching portion 16, the electrode driving portion 18, and the liquid crystal display panel 19. The switching portion 16 is disposed between the motion vector detecting portion 11e and the interpolation vector evaluating portion 11f within the FRC portion 10 and switches the motion vector from the motion vector detecting portion 11e to the zero-vector 17 in accordance with the instruction from the controlling portion 15.

The sub-screen processing portion 20 generates a PinP display signal for displaying a reduced-size television image (moving image) or a capture image (still image) on a sub-screen. Turning on/off of the sub-screen (PinP) display is controlled in accordance with instruction operations performed by a user with the use of the remote controller, etc. The combining portion 13 combines (overlaps) the PinP display signal from the sub-screen processing portion 20 with the television image signal.

The liquid crystal display panel 19 is an active-matrix liquid crystal display that has a liquid crystal layer and electrodes for applying scan signals and data signals to the liquid crystal layer. The electrode driving portion 18 is a display driver for driving the scan electrodes and the data electrodes of the liquid crystal display panel 19 based on the image signal subjected to the frame rate conversion by the FRC portion 10. The controlling portion 15 includes a CPU for controlling the above portions and performs control such that the motion compensation process of the FRC portion 10 is disabled when the PinP display signal is overlapped with the television image signal by the sub-screen processing portion 20 in accordance with the user's instruction, etc.

The sub-screen image signal overlapped with the television image signal (main-screen image signal) may be a character signal such as characters, numeric characters, symbols, and images or an image signal such as a still image and a moving image, is not limited to the sub-screen image signal generated within the device, and may be input from the outside. Alternatively, the signal may be a sub-screen image signal preliminarily combined on the transmission side such as a broadcast station. In this case, it is detected whether the sub-screen image signal is combined, and the motion compensation process of the FRC portion 10 may be disabled if the sub-screen image signal is combined.

The drive frequency of the liquid crystal display panel 19 is a frame frequency converted by the FRC portion 10. Therefore, if an image signal input with a frame frequency of 60 Hz is converted by the FRC portion 10 into a frame frequency of 120 Hz, the drive frequency of the liquid crystal display panel 19 is 120 Hz. However, if the frame frequency conversion of the FRC process is not performed and the input image signal is directly displayed and output, the drive frequency of the liquid crystal display panel 19 is the frame frequency of the input image signal.

If the sub-screen processing portion 20 overlaps the PinP display signal with the television image signal, the controlling portion 15 switches the switching portion 16 to the zero-vector 17 to forcibly replace the motion vector detected by the motion vector detecting portion 11e with the zero-vector. If the sub-screen processing portion 20 does not overlap the PinP display signal with the television image signal, the switching portion 16 is switched to the motion vector detecting portion 11e to input the motion vector detected by the motion vector detecting portion 11e to the interpolation vector evaluating portion 11f.

Therefore, the moving image quality can be improved by the motion-compensated FRC process at the time of the normal moving image display and, since the motion vector is set to be zero-vector to disable the motion compensation process if the image signal overlapped with the PinP display signal is input, the image quality can effectively be prevented from deteriorating in the sub-screen part due to the motion-compensated FRC process by eliminating the detection errors, the motion compensation errors, etc., of the motion vector occurring because the moving images with different motion characteristics are mixed.

Third Embodiment

In a third embodiment of the present invention, it is assumed that the first image signal is, for example, the television image signal acquired by receiving broadcast and that the second image signal is, for example, the character signal such as OSD, and when both image signals are combined (overlapped) and displayed, the interpolation vector from the interpolation vector evaluating portion 11f is set to zero-vector to disable the motion compensation process of the FRC portion 10 so that no interpolation occurs between pixels located at different positions.

Figure 5:
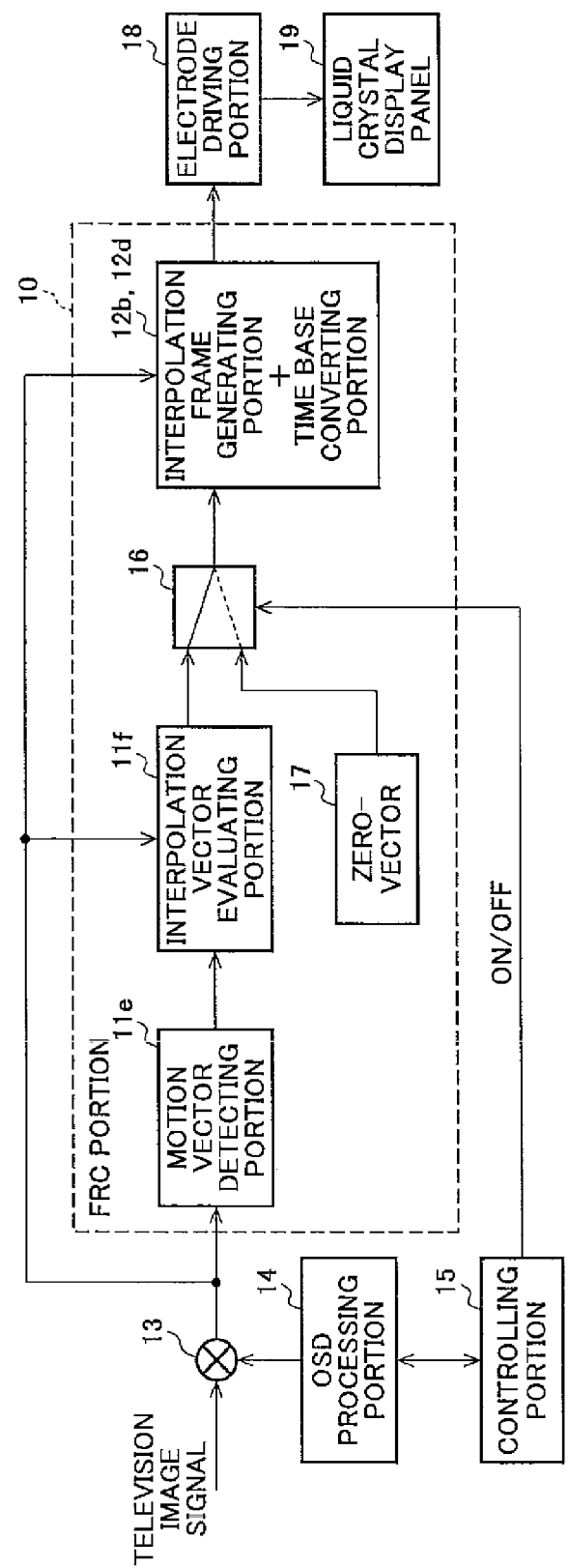
FIG. 5 is a block diagram of an exemplary main configuration of a liquid crystal display device according to a third embodiment of the present invention.

FIG. 5 is a block diagram of an exemplary main configuration of a liquid crystal display device according to the third embodiment of the present invention and the liquid crystal display device includes the FRC portion 10, the combining portion 13, the OSD processing portion 14, the controlling portion 15, the switching portion 16, the electrode driving portion 18, and the liquid crystal display panel 19. The switching portion 16 is disposed between the interpolation vector evaluating portion 11 and the interpolation frame generating portion 12b within the FRC portion 10 and switches the interpolation vector from the interpolation vector evaluating portion 11f to the zero-vector 17 in accordance with the instruction from the controlling portion 15. Turning on/off of the OSD display is controlled in accordance with instruction operations performed by a user with the use of the remote controller, etc.

If the OSD processing portion 14 overlaps the OSD signal with the television image signal, the controlling portion 15 switches the switching portion 16 to the zero-vector 17 to set the interpolation vector allocated by the interpolation vector evaluating portion 11f to zero-vector. If the OSD processing portion 14 does not overlap the OSD signal with the television image signal, the switching portion 16 is switched to the interpolation vector evaluating portion 11f to input the interpolation vector allocated by the interpolation vector evaluating portion 11f to the interpolation frame generating portion 12b.

Since the interpolation vector is forcibly set to zero-vector to disable the motion compensation process if the image signal overlapped with the OS signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed, as is the case with the first embodiment.

Fourth Embodiment

In a fourth embodiment of the present invention, it is assumed that the first image signal is, for example, the television image signal acquired by receiving broadcast and that the second image signal is, for example, the sub-screen image signal such as PinP, and when both image signals are combined (overlapped) and displayed, the interpolation vector from the interpolation vector evaluating portion 11f is set to zero-vector to disable the motion compensation process of the FRC portion 10 so that no interpolation occurs between pixels located at different positions.

Figure 6:
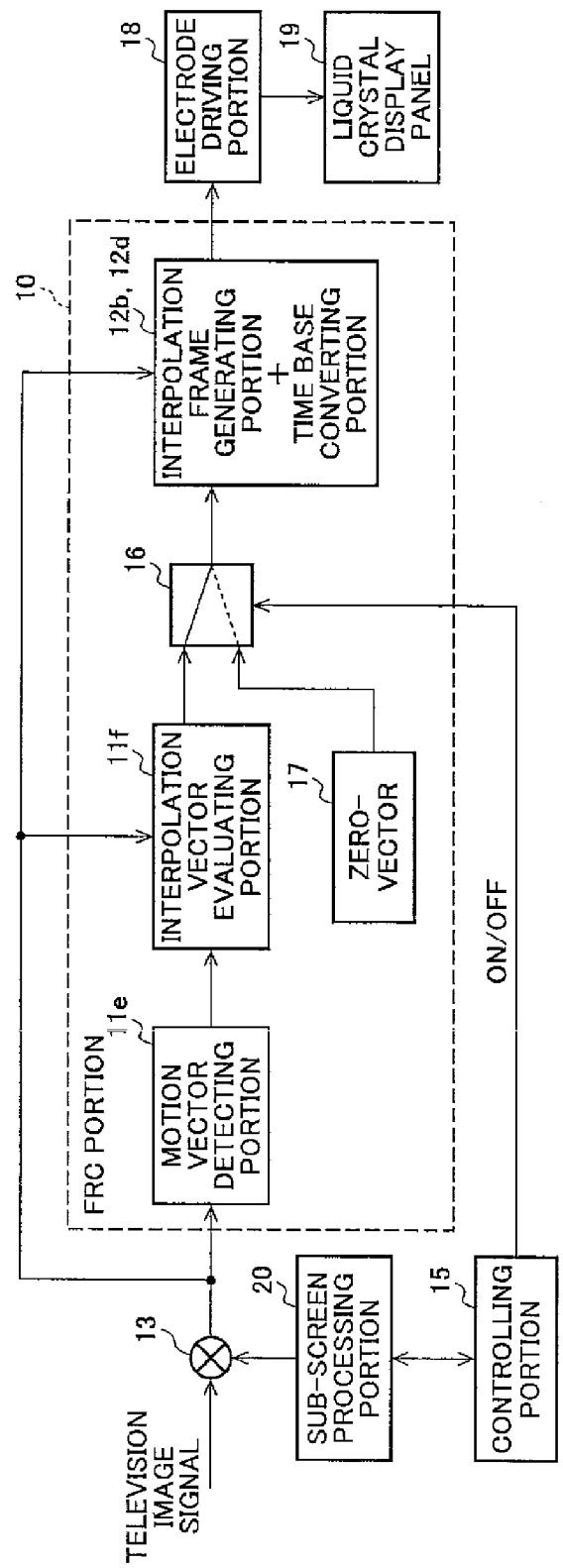
FIG. 6 is a block diagram of an exemplary main configuration of a liquid crystal display device according to a fourth embodiment of the present invention.

FIG. 6 is a block diagram of an exemplary main configuration of a liquid crystal display device according to the fourth embodiment of the present invention and the liquid crystal display device includes the FRC portion 10, the combining portion 13, the sub-screen processing portion 20, the controlling portion 15, the switching portion 16, the electrode driving portion 18, and the liquid crystal display panel 19. The switching portion 16 is disposed between the interpolation vector evaluating portion 11f and the interpolation frame generating portion 12b within the FRC portion 10 and switches the interpolation vector from the interpolation vector evaluating portion 11f to the zero-vector 17 in accordance with the instruction from the controlling portion 15. Turning on/off of the sub-screen (PinP) display is controlled in accordance with instruction operations performed by a user with the use of the remote controller, etc.

If the sub-screen processing portion 20 overlaps the PinP display signal with the television image signal, the controlling portion 15 switches the switching portion 16 to the zero-vector 17 to set the interpolation vector allocated by the interpolation vector evaluating portion 11f to zero-vector. If the sub-screen processing portion 20 does not overlap the PinP display signal with the television image signal, the switching portion 16 is switched to the interpolation vector evaluating portion 11f to input the interpolation vector allocated by the interpolation vector evaluating portion 11f to the interpolation frame generating portion 12b.

Since the interpolation vector is forcibly set to zero-vector to disable the motion compensation process if the image signal overlapped with the PinP display signal is input, the image quality can effectively be prevented from deteriorating in the sub-screen part due to the motion-compensated FRC process by eliminating the detection errors, the motion compensation errors, etc., of the notion vector occurring because the moving images with different motion characteristics are mixed, as is the case with the second embodiment.

Fifth Embodiment

In a fifth embodiment of the present invention, a path is provided to bypass the FRC portion 10; it is assumed that the first image signal is, for example, the television image signal acquired by receiving broadcast and that the second image signal is, for example, the character signal such as OSD; and when both image signals are combined (overlapped) and displayed, the input image signal overlapped with the character signal is input to the path to change the drive frequency of the liquid crystal display panel 19 in conformity with the frame frequency of the input image signal. That is, if the image signal overlapped with the character signal is input, the switching is performed such that the input image signal overlapped with the character signal is directly displayed and output on the liquid crystal display panel 19 without performing the frame rate conversion.

Figure 7:
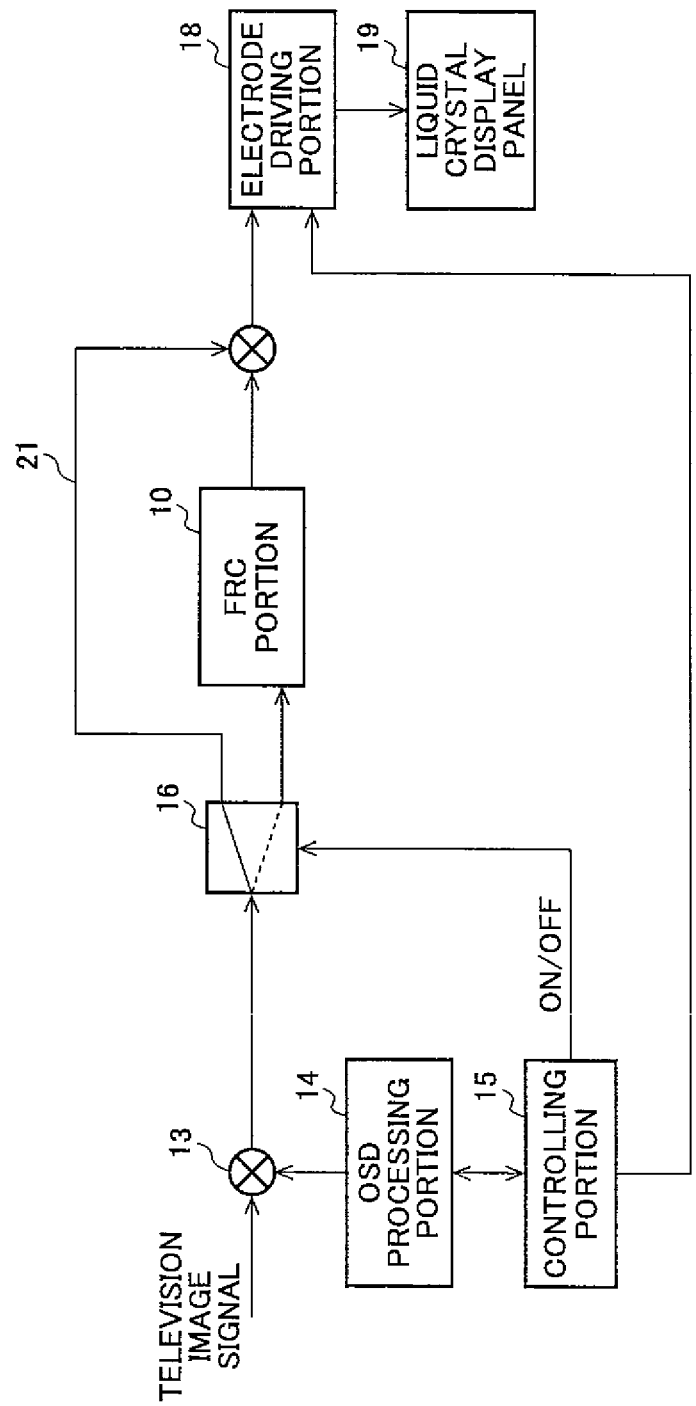
FIG. 7 is a block diagram of an exemplary main configuration of a liquid crystal display device according to a fifth embodiment of the present invention.

FIG. 7 is a block diagram of an exemplary main configuration of a liquid crystal display device according to the fifth embodiment of the present invention and the liquid crystal display device includes the FRC portion 10, the combining portion 13, the OSD processing portion 14, the controlling portion 15, the switching portion 16, the electrode driving portion 18, the liquid crystal display panel 19, and a path 21 for bypassing the FRC portion 10. The switching portion 16 is disposed on the previous stage of the FRC portion 10 and switches whether the input image signal is input to the FRC portion 10 or input to the path 21 in accordance with the instruction from the controlling portion 15. Turning on/off of the OSD display is controlled in accordance with instruction operations performed by a user with the use of the remote controller, etc.

If the OSD processing portion 14 overlaps the OSD signal with the television image signal, the controlling portion 15 switches the switching portion 16 to the path 21 to bypass the FRC portion 10. If the OSD processing portion 14 does not overlap the OSD signal with the television image signal, the switching portion 16 is switched to the FRC portion 10 to perform the FRC process (motion-compensated frame interpolation process) for the input image signal. The switching portion 16 may be disposed on the subsequent stage of the FRC portion 10 such that the output signal of the FRC portion 10 and the output signal of the path 21 are switched and output to the liquid crystal display panel 19.

In this embodiment, the controlling portion 15 can change the drive frequency of the liquid crystal display panel 19, and if the image signal overlapped with the OSD signal is input, the input image signal is input to the path 21 to change the drive frequency of the liquid crystal display panel 19 in conformity with the frame frequency of the input image signal.

Figure 8:
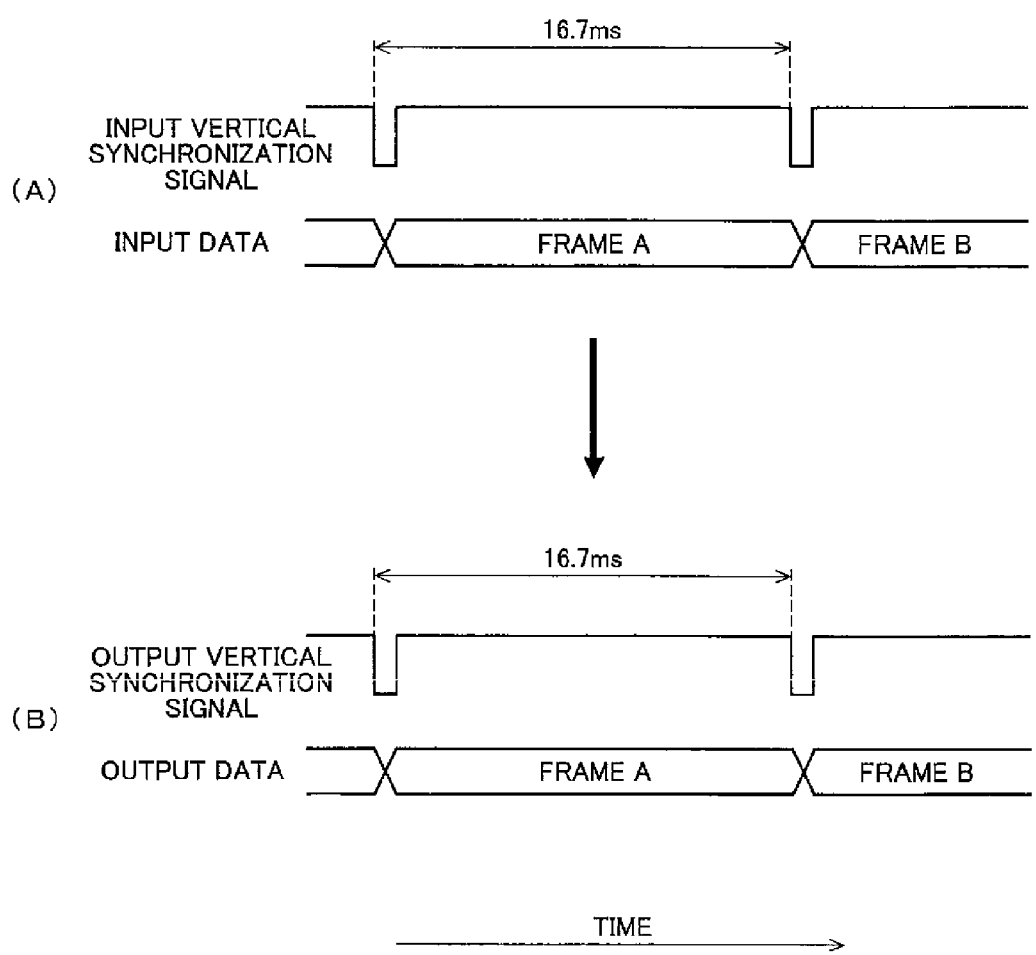
FIG. 8 is a view of a relationship between input data and output data according to the fifth embodiment of the present invention.

FIG. 8 is a view of a relationship between input data and output data according to the fifth embodiment of the present invention. FIG. 8(A) shows the input data to the path 21 and FIG. 8(B) shows the output data from the path 21. As shown in FIG. 8(A), if the input image signal (input data) is input to the path 21 with a frame frequency of 60 Hz, the display time per frame is about 16.7 ms. The controlling portion 15 controls the electrode driving portion 18, which is the display driver, to change the drive frequency of the liquid crystal display panel 19 from 120 Hz to 60 Hz and causes the input data to be output from the path 21 at 60 Hz without performing the frame rate conversion as shown in FIG. 8(B).

Since the liquid crystal display panel 19 displays the frame output from the path 21 without the frame rate conversion at the drive frequency of 60 Hz, the display time per frame is still about 16.7 ms.

Therefore, the moving image quality can be improved by the motion-compensated FRC process at the time of the normal moving image display and, since the frame rate conversion itself is prohibited by bypassing the FRC process if the image signal overlapped with the OSD signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed.

Sixth Embodiment

In a sixth embodiment of the present invention, a path is provided to bypass the FRC portion 10; it is assumed that the first image signal is, for example, the television image signal acquired by receiving broadcast and that the second image signal is, for example, the sunscreen image signal such as PinP; and when both image signals are combined (overlapped) and displayed, the input image signal overlapped with the sub-screen image signal is input to the path to change the drive frequency of the liquid crystal display panel 19 in conformity with the frame frequency of the input image signal. That is, if the image signal overlapped with the sub-screen image signal is input, the switching is performed such that the input image signal overlapped with the sub-screen image signal is directly displayed and output on the liquid crystal display panel 19 without performing the frame rate conversion.

Figure 9:
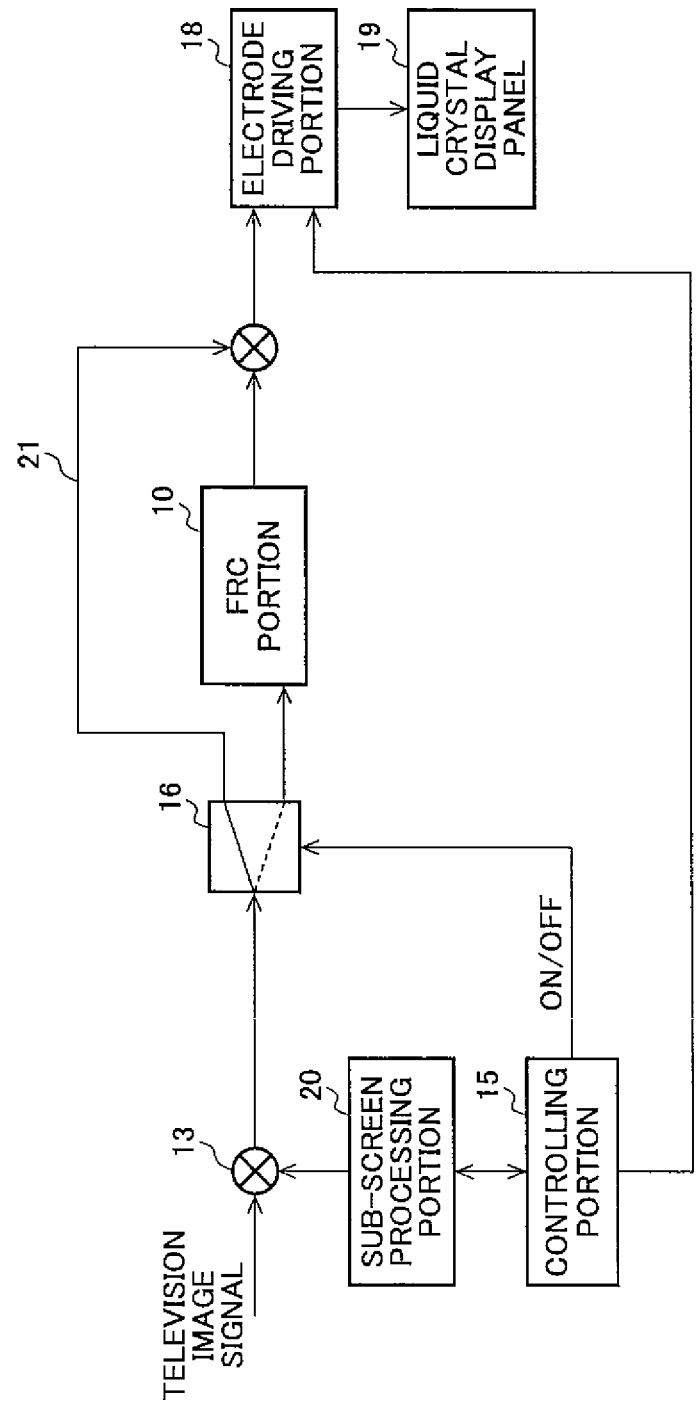
FIG. 9 is a block diagram of an exemplary main configuration of a liquid crystal display device according to a sixth embodiment of the present invention.

FIG. 9 is a block diagram of an exemplary main configuration of a liquid crystal display device according to the sixth embodiment of the present invention and the liquid crystal display device includes the FRC portion 10, the combining portion 13, the sub-screen processing portion 20, the controlling portion 15, the switching portion 16, the electrode driving portion 18, the liquid crystal display panel 19, and the path 21 for bypassing the FRC portion 10. The switching portion 16 is disposed on the previous stage of the FRC portion 10 and switches whether the input image signal is input to the FRC portion 10 or input to the path 21 in accordance with the instruction from the controlling portion 15. Turning on/off of the sub-screen (PinP) display is controlled in accordance with instruction operations performed by a user with the use of the remote controller, etc.

If the sub-screen processing portion 20 overlaps the PinP display signal with the television image signal, the controlling portion 15 switches the switching portion 16 to the path 21 to bypass the FRC portion 10. If the sub-screen processing portion 20 does not overlap the PinP display signal with the television image signal, the switching portion 16 is switched to the FRC portion 10 to perform the FRC process (motion-compensated frame interpolation process) for the input image signal. The switching portion 16 may be disposed on the subsequent stage of the FRC portion 10 such that the output signal of the FRC portion 10 and the output signal of the path 21 are switched and output to the liquid crystal display panel 19.

In this embodiment, the controlling portion 15 can change the drive frequency of the liquid crystal display panel 19, and if the image signal overlapped with the PinP display signal is input, the input image signal is input to the path 21 to change the drive frequency of the liquid crystal display panel 19 in conformity with the frame frequency of the input image signal.

Since the liquid crystal display panel 19 displays the frame output from the path 21 without the frame rate conversion at the drive frequency of 60 Hz, the display time per frame is still about 16.7 ms.

Therefore, the moving image quality can be improved by the motion-compensated FRC process at the time of the normal moving image display and, since the frame rate conversion itself is prohibited by bypassing the FRC process if the image signal overlapped with the PinP display signal is input, the image quality can effectively be prevented from deteriorating in the sub-screen display part due to the motion-compensated FRC process by eliminating the detection errors, the motion compensation errors, etc., of the motion vector occurring because the moving images with different motion characteristics are mixed.

Seventh Embodiment

In a seventh embodiment of the present invention, a path is provided to bypass the FRC portion 10; it is assumed that the first image signal is, for example, the television image signal acquired by receiving broadcast and that the second image signal is, for example, the character signal such as OSD; and when both image signals are combined (overlapped) and displayed, the input image signal overlapped with the character signal is input to the bypass path to accumulate the input image signal in a memory on the path and the frame rate is converted by rapidly and repeatedly reading the image signal of the same frame from the memory more than once. That is, if the image signal overlapped with the character signal is input, the switching is performed such that the input image signal is rapidly and sequentially output to convert the frame rate and is displayed and output on the liquid crystal display panel 19 without performing the motion-compensated frame rate conversion.

Figure 10:
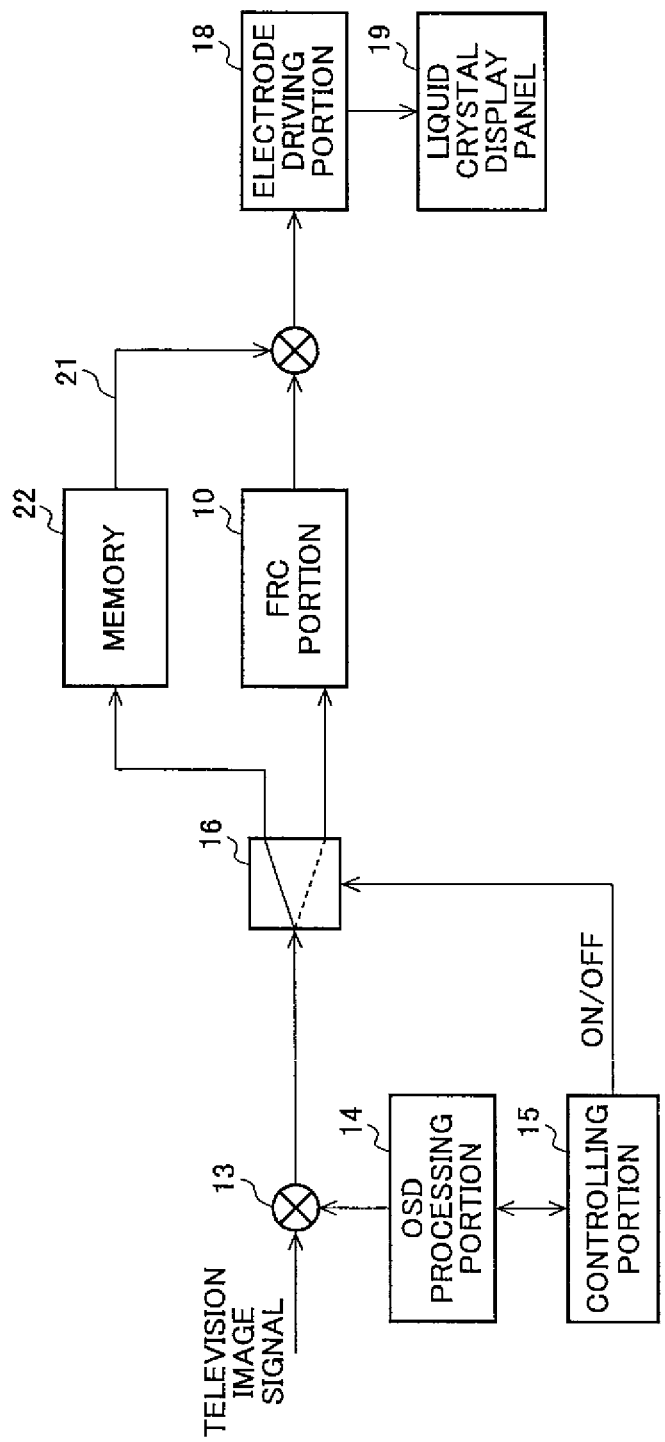
FIG. 10 is a block diagram of an exemplary main configuration of a liquid crystal display device according to a seventh embodiment of the present invention.

FIG. 10 is a block diagram of an exemplary main configuration of a liquid crystal display device according to the seventh embodiment of the present invention and the liquid crystal display device includes the FRC portion 10, the combining portion 13, the OSD processing portion 14, the controlling portion 15, the switching portion 16, the electrode driving portion 18, the liquid crystal display panel 19, the path 21 for bypassing the FRC portion 10, and a memory 22 on the path 21. The switching portion 16 is disposed on the previous stage of the FRC portion 10 and switches whether the input image signal is input to the FRC portion 10 or input to the path 21 in accordance with the instruction from the controlling portion 15. Turning on/off of the OSD display is controlled in accordance with instruction operations performed by a user with the use of the remote controller, etc.

If the OSD processing portion 14 overlaps the OSD signal with the television image signal, the controlling portion 15 switches the switching portion 16 to the path 21 to bypass the process of the FRC portion 10 and to accumulate the input image signal in the memory 22. The frame insert process is subsequently performed by repeatedly reading the same frame from the memory 22 more than once. If the OS signal is not overlapped with the television image signal, the switching portion 16 is switched to the FRC portion 10 to perform the FRC process (motion-compensated frame interpolation process) for the input image signal. The switching portion 16 may be disposed on the subsequent stage of the FRC portion 10 such that the output signal of the FRC portion 10 and the output signal of the memory 22 are switched and output to the liquid crystal display panel 19.

In this embodiment, the drive frequency of the liquid crystal display panel 19 is not changed and is maintained at 120 Hz. If the image signal overlapped with the OSD signal is input, the controlling portion 15 and the memory 22 make up a means of inserting between the frames of the input image signal an image signal of the previous or subsequent frame to convert the number of frames of the input image signal. That is, the frame rate (the number of frames) of the display image signal input to the electrode driving portion 18 is always the same.

Figure 11:
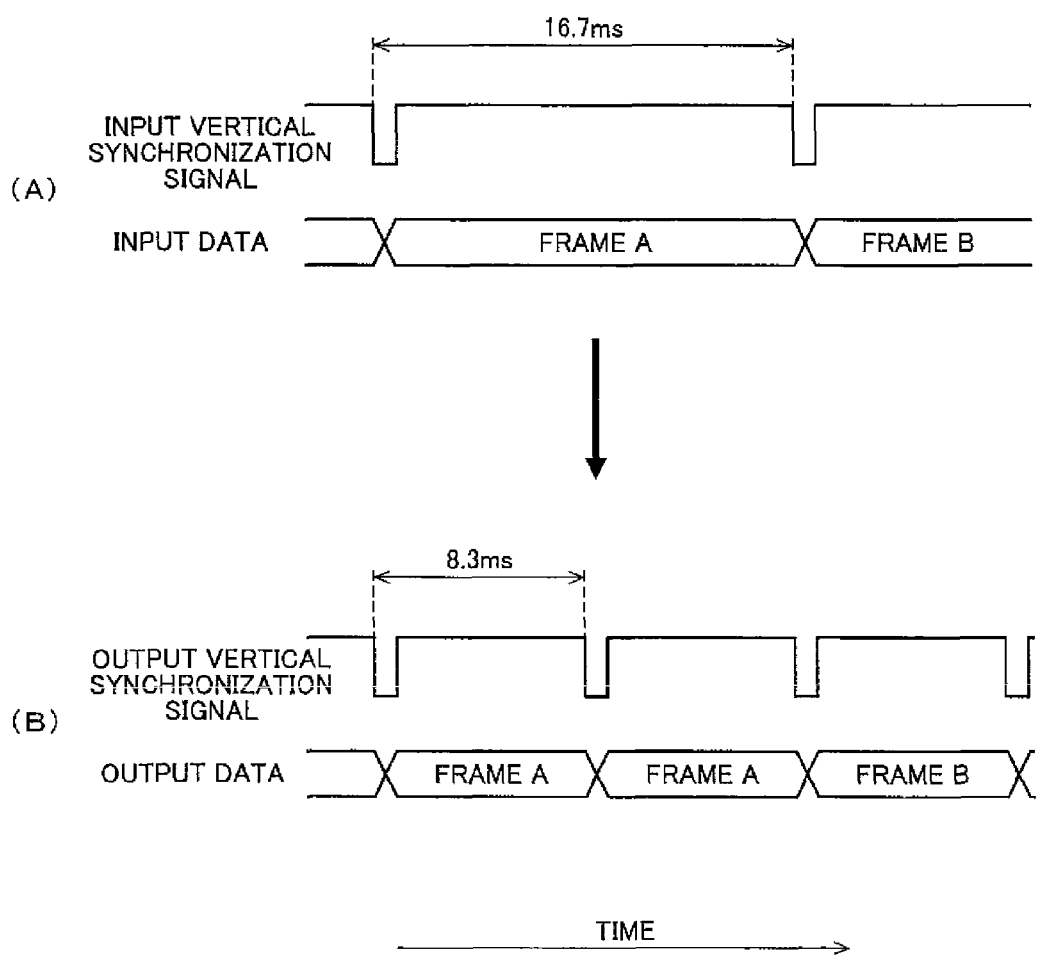
FIG. 11 is a view of a relationship between input data and output data according to the seventh embodiment of the present invention.

FIG. 11 is a view of a relationship between input data and output data according to the seventh embodiment of the present invention. FIG. 11(A) shows the input data to the path 21 and FIG. 11(B) shows the output data from the path 21. As shown in FIG. 11(A), if the input image signal (input data) is input to the path 21 with a frame frequency of 60 Hz, the display time per frame is about 16.7 ms. The input data are temporarily accumulated in the memory 22, and an image signal of the frame (in FIG. 11, frame A) is output which is repeatedly read from the memory 22 at double speed as shown in FIG. 11(B).

The liquid crystal display panel 19 displays the output data inserted with the image signal of the same frame at the drive frequency of 120 Hz. Since the number of frames is converted by repeatedly reading the same frame twice, the display time per frame is about 8.3 ms in this case.

Since the interpolation process through motion compensation is not performed for the input image signal when the image signal overlapped with the OSD signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed. Since frame rate is converted by repeatedly reading the same frame in this case, the drive frequency of the liquid crystal display panel 19 does not need to be changed.

Eighth Embodiment

In an eighth embodiment of the present invention, a path is provided to bypass the FRC portion 10; it is assumed that the first image signal is, for example, the television image signal acquired by receiving broadcast and that the second image signal is, for example, the sub-screen image signal such as PinP; and when both image signals are combined (overlapped) and displayed, the input image signal overlapped with the sub-screen image signal is input to the bypass path to accumulate the input image signal in a memory on the path and the frame rate is converted by rapidly and repeatedly reading the image signal of the same frame from the memory more than once. That is, if the image signal overlapped with the sub-screen image signal is input, the switching is performed such that the input image signal is rapidly and sequentially output to convert the frame rate and is displayed and output on the liquid crystal display panel 19 without performing the motion-compensated frame rate conversion.

Figure 12:
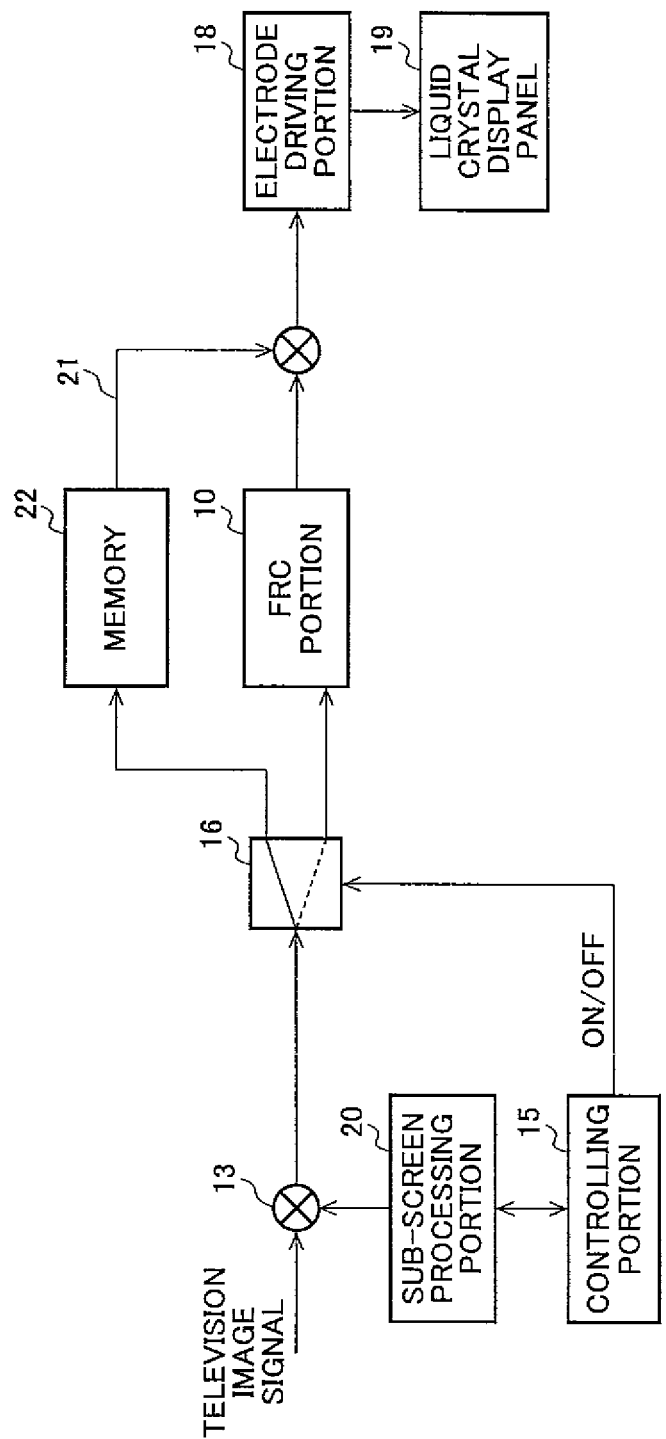
FIG. 12 is a block diagram of an exemplary main configuration of a liquid crystal display device according to an eighth embodiment of the present invention.

FIG. 12 is a block diagram of an exemplary main configuration of a liquid crystal display device according to the eighth embodiment of the present invention and the liquid crystal display device includes the FRC portion 10, the combining portion 13, the sub-screen processing portion 20, the controlling portion 15, the switching portion 16, the electrode driving portion 18, the liquid crystal display panel 19, the path 21 for bypassing the FRC portion 10, and the memory 22 on the path 21. The switching portion 16 is disposed on the previous stage of the FRC portion 10 and switches whether the input image signal is input to the FRC portion 10 or input to the path 21 in accordance with the instruction from the controlling portion 15. Turning on/off of the sub-screen (PinP) display is controlled in accordance with instruction operations performed by a user with the use of the remote controller, etc.

If the sub-screen processing portion 20 overlaps the PinP display signal with the television image signal, the controlling portion 15 switches the switching portion 16 to the path 21 to bypass the process of the FRC portion 10 and to accumulate the input image signal in the memory 22. The frame insert process is subsequently performed by repeatedly reading the same frame from the memory 22 more than once. If the PinP display signal is not overlapped with the television image signal, the switching portion 16 is switched to the FRC portion 10 to perform the FRC process (motion-compensated frame interpolation process) for the input image signal. The switching portion 16 may be disposed on the subsequent stage of the FRC portion 10 such that the output signal of the FRC portion 10 and the output signal of the memory 22 are switched and output to the liquid crystal display panel 19.

In this embodiment, the drive frequency of the liquid crystal display panel 19 is not changed and is maintained at 120 Hz. If the image signal overlapped with the PinP display signal is input, the controlling portion 15 and the memory 22 make up a means of inserting between the frames of the input image signal an image signal of the previous or subsequent frame to convert the number of frames of the input image signal. That is, the frame rate (the number of frames) of the display image signal input to the electrode driving portion 18 is always the same.

Since the interpolation process through motion compensation is not performed for the input image signal when the image signal overlapped with the PinP display signal is input, the image quality can effectively be prevented from deteriorating in the sub-screen display part due to the motion-compensated FRC process by eliminating the detection errors, the motion compensation errors, etc., of the motion vector occurring because the moving images with different motion characteristics are mixed. Since frame rate is converted by repeatedly reading the same frame in this case, the drive frequency of the liquid crystal display panel 19 does not need to be changed.

Ninth Embodiment

In a ninth embodiment of the present invention, a path is provided to bypass the FRC portion 10; it is assumed that the first image signal is, for example, the television image signal acquired by receiving broadcast and that the second image signal is, for example, the character signal such as OSD; and when both image signals are combined (overlapped) and displayed, the input image signal overlapped with the character signal is input to the path and the input image signal is input to a linear interpolation processing portion on the path to interpolate an image signal subjected to the linear interpolation. That is, if the image signal overlapped with the character signal is input, the switching is performed such that the frame rate is converted by performing the linear interpolation process rather than the interpolation process through motion compensation.

Figure 13:
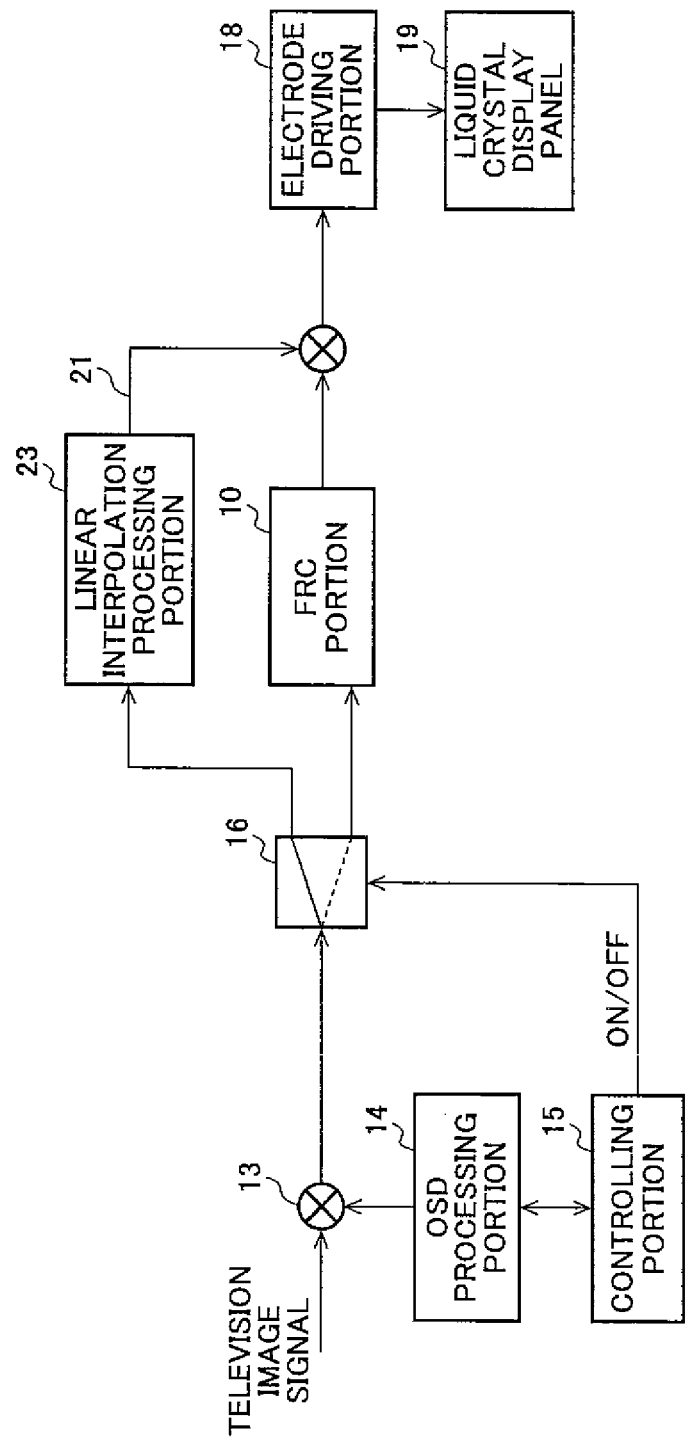
FIG. 13 is a block diagram of an exemplary main configuration of a liquid crystal display device according to a ninth embodiment of the present invention.

FIG. 13 is a block diagram of an exemplary main configuration of a liquid crystal display device according to the ninth embodiment of the present invention and the liquid crystal display device includes the FRC portion 10, the combining portion 13, the OSD processing portion 14, the controlling portion 15, the switching portion 16, the electrode driving portion 18, the liquid crystal display panel 19, the path 21 for bypassing the FRC portion 10, and a linear interpolation processing portion 23 on the path 21. The switching portion 16 is disposed on the previous stage of the FRC portion 10 and switches whether the input image signal is input to the FRC portion 10 or input to the path 21 in accordance with the instruction from the controlling portion 15. Turning on/off of the OSD display is controlled in accordance with instruction operations performed by a user with the use of the remote controller, etc.

If the OSD processing portion 14 overlaps the OSD signal with the television image signal, the controlling portion 15 switches the switching portion 16 to the path 21 to bypass the FRC portion 10 and the input image signal is input to the linear interpolation processing portion 23. The linear interpolation processing portion 23 inserts an interpolation frame subjected to the linear interpolation process between frames. If the OSD signal is not overlapped with the television image signal, the switching portion 16 is switched to the FRC portion 10 to perform the FRC process (motion-compensated frame interpolation process) for the input image signal.

The switching portion 16 may be disposed on the subsequent stage of the FRC portion 10 such that the output signal of the FRC portion 10 and the output signal of the linear interpolation processing portion 23 are switched and output to the liquid crystal display panel 19.

In this embodiment, the drive frequency of the liquid crystal display panel 19 is not changed and is maintained at 120 Hz. That is, the frame rate (the number of frames) of the display image signal input to the electrode driving portion 18 is always the same. If the image signal overlapped with the OSD signal is input, the linear interpolation processing portion 23 makes up a means of interpolating between the frames of the input image signal an image signal subjected to the linear interpolation process to convert the number of frames of the input image signal. In the linear interpolation process, as described in above non-patent document 2, an interpolation frame is acquired through linear interpolation using a frame interpolation rate α from the signal of the previous frame and the signal of the current frame.

Figure 14:
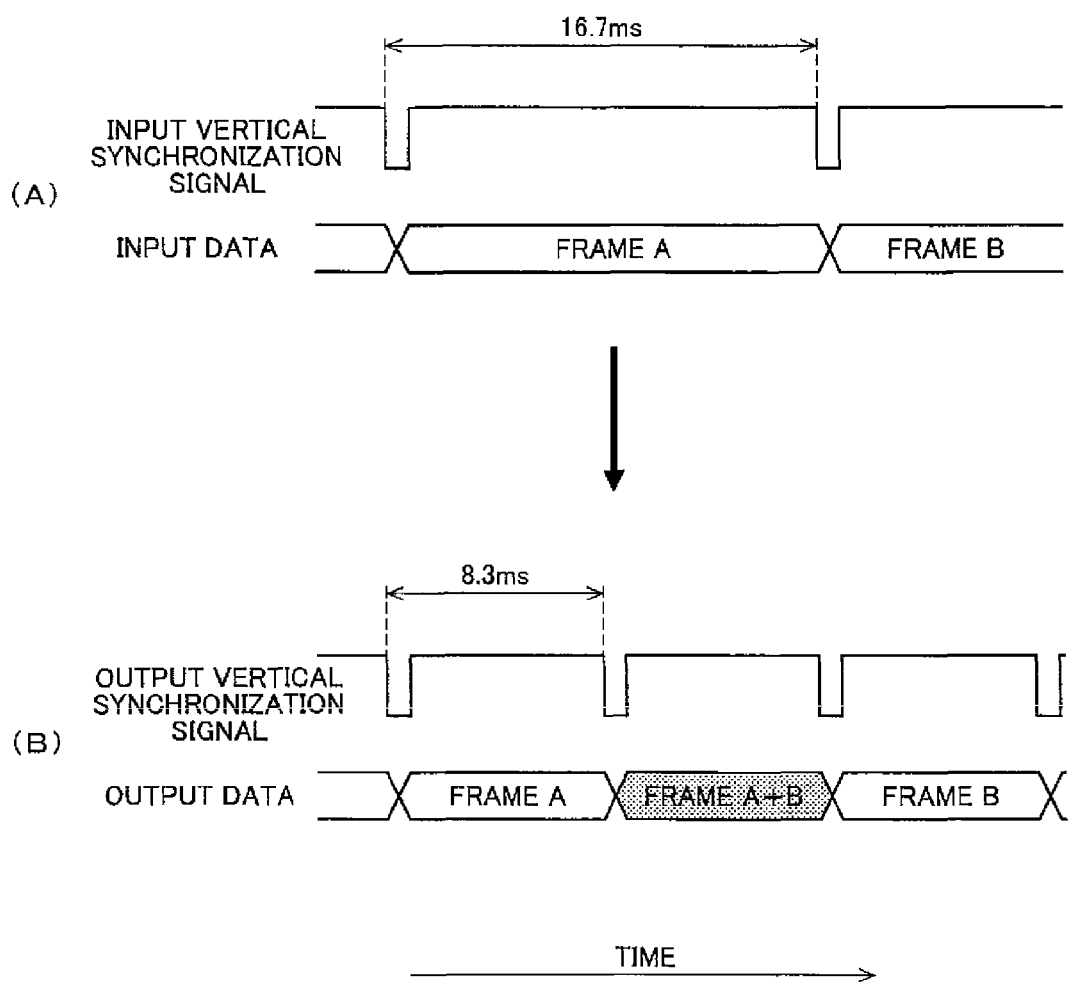
FIG. 14 is a view of a relationship between input data and output data according to the ninth embodiment of the present invention.

FIG. 14 is a view of a relationship between input data and output data according to the ninth embodiment of the present invention. FIG. 14(A) shows the input data to the path 21 and FIG. 14(B) shows the output data from the path 21. As shown in FIG. 14(A), if the input image signal (input data) is input to the path 21 with a frame frequency of 60 Hz, the display time per frame is about 16.7 ms. The input data are input to the linear interpolation processing portion 23, and the image signal subjected to the linear interpolation process (in FIG. 14(B), frame A+B) is interpolated and output between the frames (in this case, between frames A and B) as shown in FIG. 14(B).

The liquid crystal display panel 19 displays the output data interpolated with the image signal subjected to the linear interpolation process at the drive frequency of 120 Hz. Since the number of frames is converted by interpolating the image signal subjected to the linear interpolation process, the display time per frame is about 8.3 ms in this case.

Since the interpolation process through motion compensation is not performed for the input image signal when the image signal overlapped with the OSD signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed. Since the frame rate is converted by interpolating the image signal subjected to the linear interpolation process in this case, the drive frequency of the liquid crystal display panel 19 does not need to be changed.

Tenth Embodiment

In a tenth embodiment of the present invention, a path is provided to bypass the FRC portion 10; it is assumed that the first image signal is, for example, the television image signal acquired by receiving broadcast and that the second image signal is, for example, the sub-screen image signal such as PinP; and when both image signals are combined (overlapped) and displayed, the input image signal overlapped with the sub-screen image signal is input to the path and the input image signal is input to the linear interpolation processing portion on the path to interpolate an image signal subjected to the linear interpolation. That is, if the image signal overlapped with the sub-screen image signal is input, the switching is performed such that the frame rate is converted by performing the linear interpolation process rather than the interpolation process through motion compensation.

Figure 15:
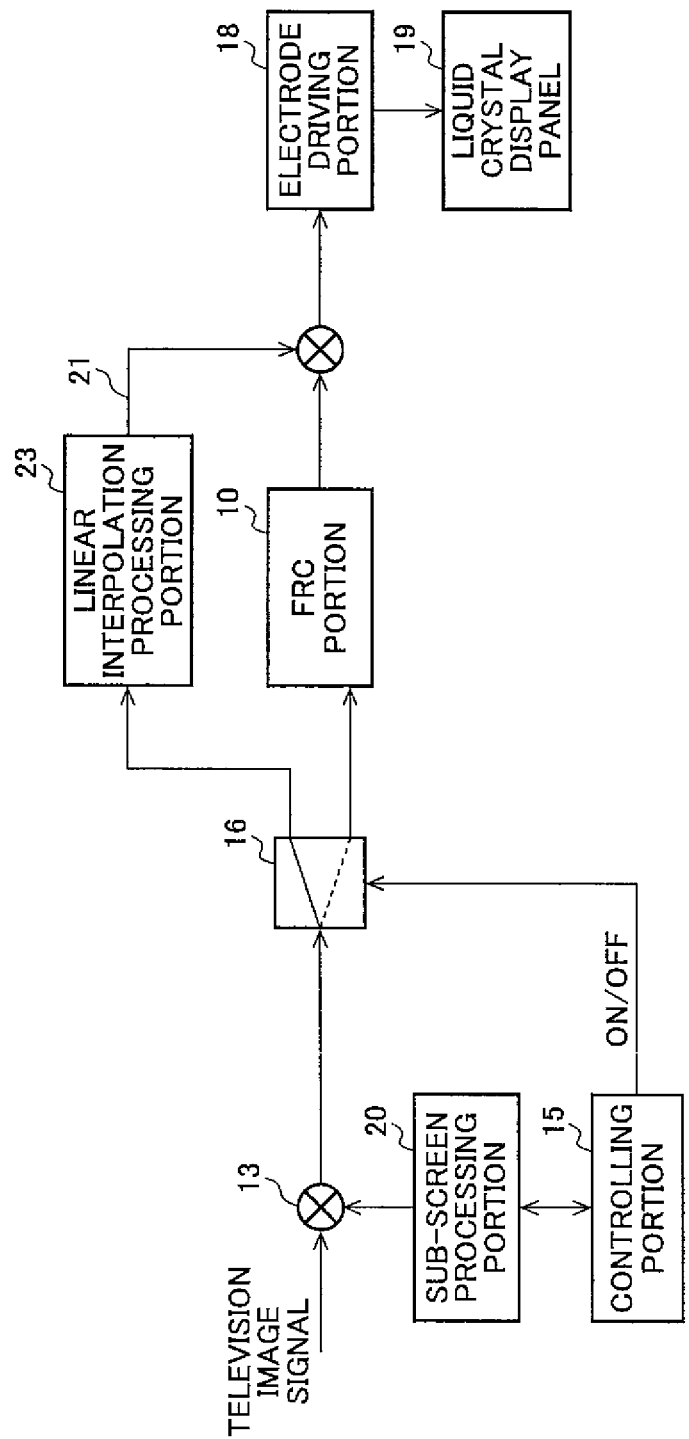
FIG. 15 is a block diagram of an exemplary main configuration of a liquid crystal display device according to a tenth embodiment of the present invention.

FIG. 15 is a block diagram of an exemplary main configuration of a liquid crystal display device according to the tenth embodiment of the present invention and the liquid crystal display device includes the FRC portion 10, the combining portion 13, the sub-screen processing portion 20, the controlling portion 15, the switching portion 16, the electrode driving portion 18, the liquid crystal display panel 19, the path 21 for bypassing the FRC portion 10, and the linear interpolation processing portion 23 on the path 21. The switching portion 16 is disposed on the previous stage of the FRC portion 10 and switches whether the input image signal is input to the FRC portion 10 or input to the path 21 in accordance with the instruction from the controlling portion 15. Turning on/off of the sub-screen (PinP) display is controlled in accordance with instruction operations performed by a user with the use of the remote controller, etc.

If the sub-screen processing portion 20 overlaps the PinP display signal with the television image signal, the controlling portion 15 switches the switching portion 16 to the path 21 to bypass the FRC portion 10 and the input image signal is input to the linear interpolation processing portion 23. The linear interpolation processing portion 23 inserts an interpolation frame subjected to the linear interpolation process between frames. If the PinP display signal is not overlapped with the television image signal, the switching portion 16 is switched to the FRC portion 10 to perform the FRC process (motion-compensated frame interpolation process) for the input image signal. The switching portion 16 may be disposed on the subsequent stage of the FRC portion 10 such that the output signal of the FRC portion 10 and the output signal of the linear interpolation processing portion 23 are switched and output to the liquid crystal display panel 19.

In this embodiment, the drive frequency of the liquid crystal display panel 19 is not changed and is maintained at 120 Hz. That is, the frame rate (the number of frames) of the display image signal input to the electrode driving portion 18 is always the same. If the image signal overlapped with the PinP display signal is input, the linear interpolation processing portion 23 makes up a means of interpolating between the frames of the input image signal an image signal subjected to the linear interpolation process to convert the number of frames of the input image signal. In the linear interpolation process, as described in above non-patent document 2, an interpolation frame is acquired through linear interpolation using a frame interpolation rate α from the signal of the previous frame and the signal of the current frame.

Since the interpolation process through motion compensation is not performed for the input image signal when the image signal overlapped with the PinP display signal is input, the image quality can effectively be prevented from deteriorating in the sub-screen part due to the motion-compensated FRC process by eliminating the detection errors, the motion compensation errors, etc., of the motion vector occurring because the moving images with different motion characteristics are mixed. Since the frame rate is converted by interpolating the image signal subjected to the linear interpolation process in this case, the drive frequency of the liquid crystal display panel 19 does not need to be changed.

Eleventh Embodiment

In an eleventh embodiment of the present invention, a path is provided to bypass the FRC portion 10; it is assumed that the first image signal is, for example, the television image signal acquired by receiving broadcast and that the second image signal is, for example, the character signal such as OSD; and when both image signals are combined (overlapped) and displayed, the input image signal overlapped with the character signal is input to the path and the input image signal is input to a black-level signal insert processing portion on the path to insert a predetermined monochromatic image signal such as a black-level signal. That is, if the image signal overlapped with the character signal is input, the switching is performed such that the frame rate is converted by performing the monochromatic image insert process rather than the interpolation process through motion compensation.

Figure 16:
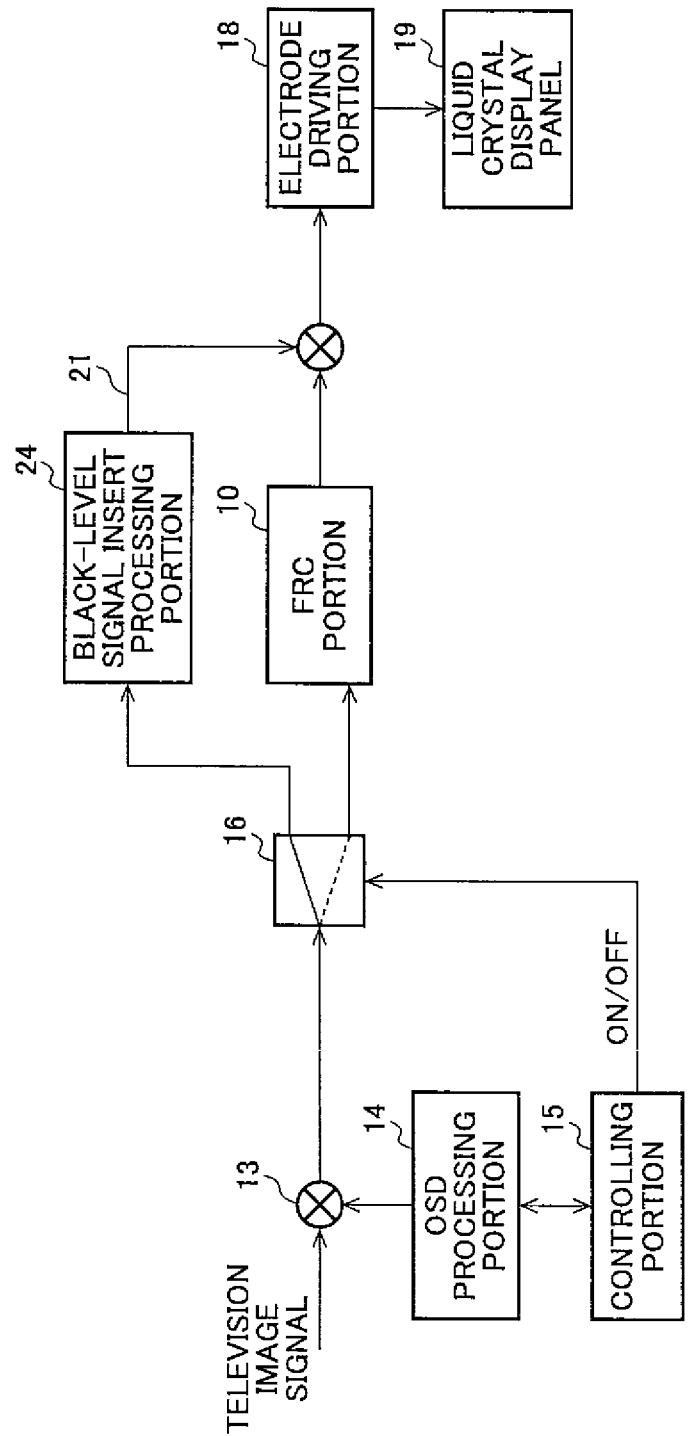
FIG. 16 is a block diagram of an exemplary main configuration of a liquid crystal display device according to an eleventh embodiment of the present invention.

FIG. 16 is a block diagram of an exemplary main configuration of a liquid crystal display device according to the eleventh embodiment of the present invention and the liquid crystal display device includes the FRC portion 10, the combining portion 13, the OSD processing portion 14, the controlling portion 15, the switching portion 16, the electrode driving portion is, the liquid crystal display panel 19, the path 21 for bypassing the FRC portion 10, and a black-level signal insert processing portion 24 on the path 21. The switching portion 16 is disposed on the previous stage of the FRC portion 10 and switches whether the input image signal is input to the FRC portion 10 or input to the path 21 in accordance with the instruction from the controlling portion 15. Turning on/off of the OSD display is controlled in accordance with instruction operations performed by a user with the use of the remote controller, etc.

If the OSD processing portion 14 overlaps the OSD signal with the television image signal, the controlling portion 15 switches the switching portion 16 to the path 21 to bypass the FRC portion 10 and the input image signal is input to the black-level signal insert processing portion 24. The black-level signal insert processing portion 24 performs, for example, the time scale compression (frame rate conversion) for the input image signal with the use of a memory to insert the predetermined monochromatic image signal such as a black-level signal between the input frames. If the OSD signal is not overlapped with the television image signal, the switching portion 16 is switched to the FRC portion 10 to perform the FRC process (motion-compensated frame interpolation process) for the input image signal. The switching portion 16 may be disposed on the subsequent stage of the FRC portion 10 such that the output signal of the FRC portion 10 and the output signal of the black-level signal insert processing portion 24 are switched and output to the liquid crystal display panel 19.

In this embodiment, the drive frequency of the liquid crystal display panel 19 is not changed and is maintained at 120 Hz. That is, the frame rate (the number of frames) of the display image signal input to the electrode driving portion 18 is always the same. If the image signal overlapped with the OSD signal is input, the black-level signal insert processing portion 24 makes up a means of inserting the predetermined monochromatic image signal such as a black-level signal between the frames of the input image signal to convert the number of frames of the input image signal. Another embodiment of the black-level signal insert process may be configured such that the electrode driving portion 18 applies a black write voltage to the liquid crystal display panel 19 for a predetermined period (in the case of this example, 1/120 second).

Figure 17:
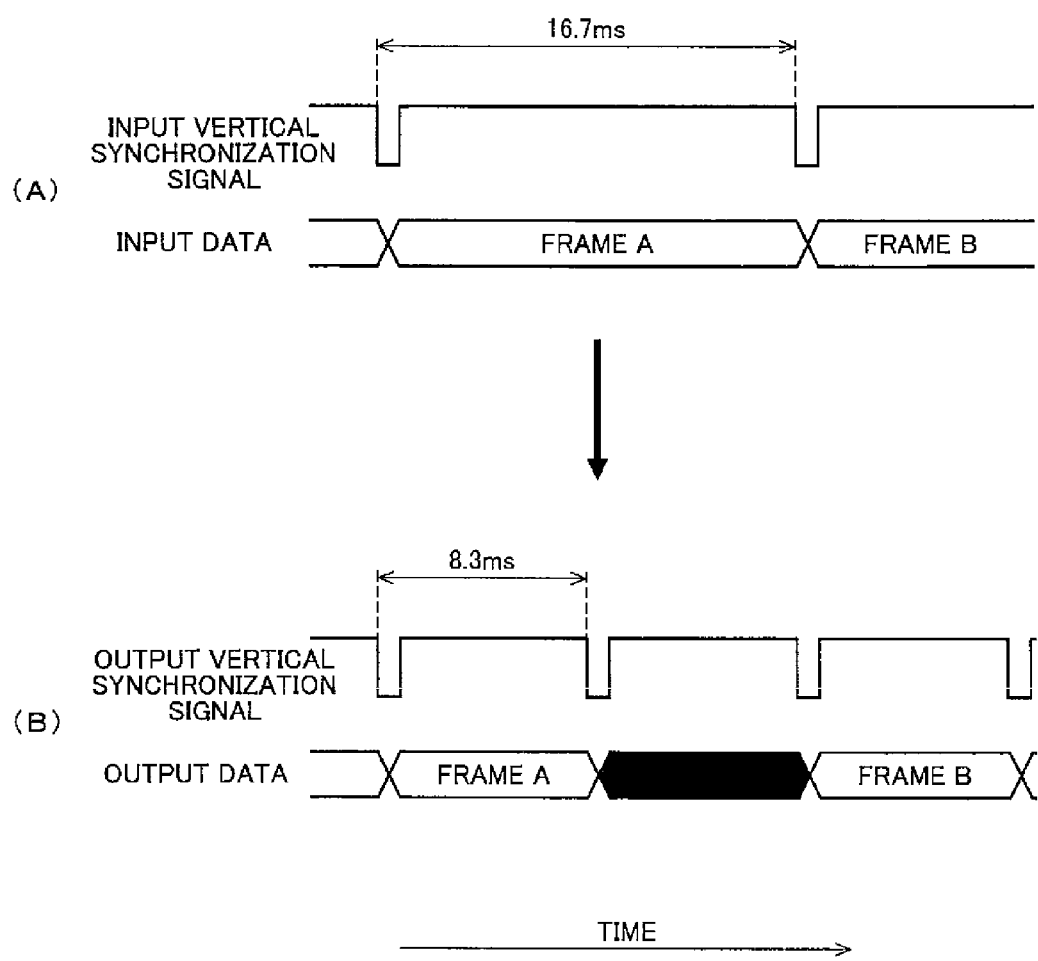
FIG. 17 is a view of a relationship between input data and output data according to the eleventh embodiment of the present invention.

FIG. 17 is a view of a relationship between input data and output data according to the eleventh embodiment of the present invention. FIG. 17(A) shows the input data to the path 21 and FIG. 17(B) shows the output data from the path 21. As shown in FIG. 17(A), if the input image signal (input data) is input to the path 21 with a frame frequency of 60 Hz, the display time per frame is about 16.7 ms. The input data are input to the black-level signal insert processing portion 24, and a black-level signal (in FIG. 17(B), black-colored frame) is inserted and output between the frames (in this case, between the frames A and B) as shown in FIG. 17(B).

Although the image quality deterioration due to the motion blur is improved and the image quality deterioration is not generated in the OSD part by inserting the black image signal between the frames of the input image signal in this way, the emission luminance must be increased in a backlight (not shown) disposed on the backside of the liquid crystal display panel 19 to compensate the reduction of the display luminance due to the shortening of the image display period.

The liquid crystal display panel 19 displays the output data inserted with the black-level signal at the drive frequency of 120 Hz. Since the number of frames is converted by inserting the black-level signal, the display time per frame is about 8.3 ms in this case.

Since the interpolation process through motion compensation is not performed for the input image signal when the image signal overlapped with the OSD signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed. Since the frame rate is converted by inserting the monochromatic image signal in this case, the drive frequency of the liquid crystal display panel 19 does not need to be changed. The moving image quality improving effect can also be maintained in this case.

Other than the above embodiment, if the image signal overlapped with the OS signal is input, the image quality may be prevented from deteriorating due to the motion-compensated FRC process while maintaining the moving image quality improving effect by dividing the original image of the input frame into a plurality of frame images at a predetermined luminance rate and performing the frame rate conversion.

Since the process of the FRC portion 10 is bypassed and the RGB signal is directly input to the electrode driving portion 18 in the above embodiment, the OSD portion can be prevented from being displayed in a blurred state due to a process of converting the OSD signal generated in RGB into YPbPr.

Twelfth Embodiment

In a twelfth embodiment of the present invention, a path is provided to bypass the FRC portion 10; it is assumed that the first image signal is, for example, the television image signal acquired by receiving broadcast and that the second image signal is, for example, the sub-screen image signal such as PinP; and when both image signals are combined (overlapped) and displayed, the input image signal overlapped with the sub-screen image signal is input to the path and the input image signal is input to a black-level signal insert processing portion on the path to insert a predetermined monochromatic image signal such as a black-level signal. That is, if the image signal overlapped with the sub-screen image signal is input, the switching is performed such that the frame rate is converted by performing the monochromatic image insert process rather than the interpolation process through motion compensation.

Figure 18:
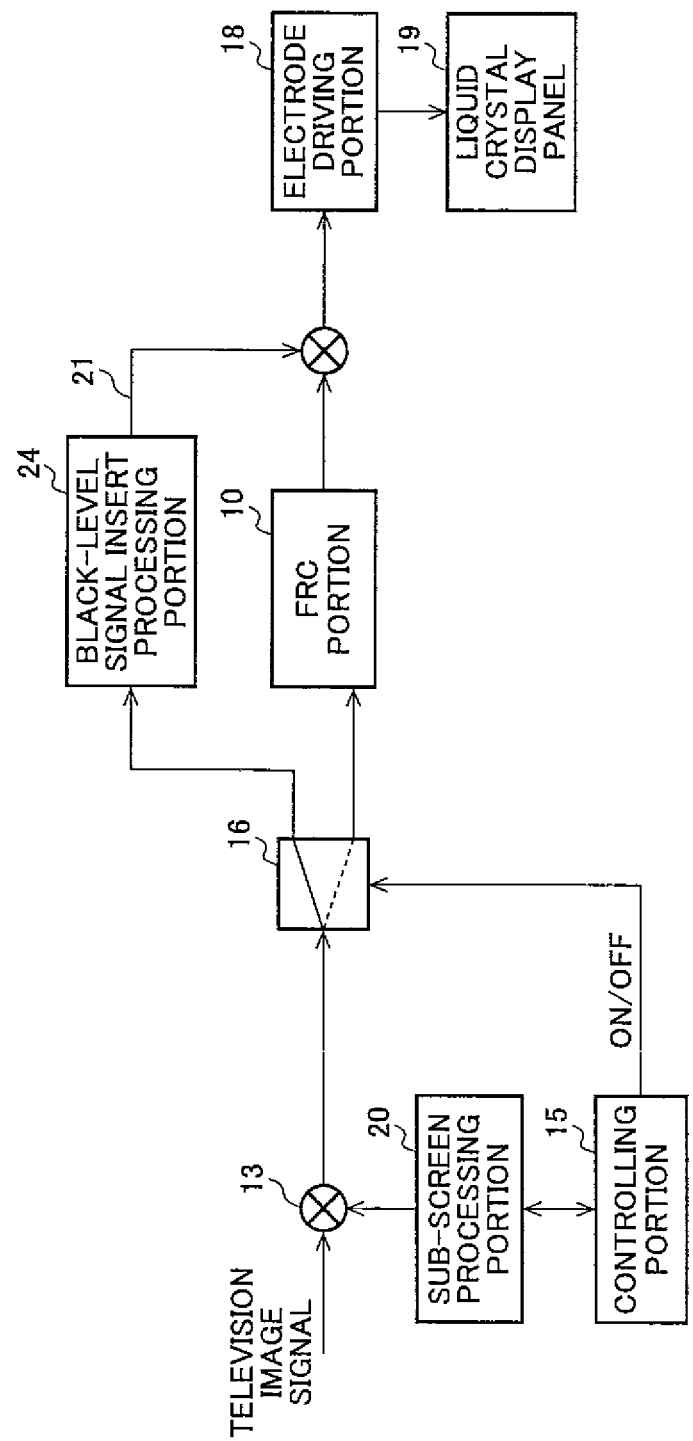
FIG. 18 is a block diagram of an exemplary main configuration of a liquid crystal display device according to a twelfth embodiment of the present invention.

FIG. 18 is a block diagram of an exemplary main configuration of a liquid crystal display device according to the twelfth embodiment of the present invention and the liquid crystal display device includes the FRC portion 10, the combining portion 13, the sub-screen processing portion 20, the controlling portion 15, the switching portion 16, the electrode driving portion 18, the liquid crystal display panel 19, the path 21 for bypassing the FRC portion 10, and the black-level signal insert processing portion 24 on the path 21. The switching portion 16 is disposed on the previous stage of the FRC portion 10 and switches whether the input image signal is input to the FRC portion 10 or input to the path 21 in accordance with the instruction from the controlling portion 15. Turning on/off of the sub-screen (PinP) display is controlled in accordance with instruction operations performed by a user with the use of the remote controller, etc.

If the sub-screen processing portion 20 overlaps the PinP display signal with the television image signal, the controlling portion 15 switches the switching portion 16 to the path 21 to bypass the FRC portion 10 and the input image signal is input to the black-level signal insert processing portion 24. The black-level signal insert processing portion 24 performs, for example, the time scale compression (frame rate conversion) for the input image signal with the use of a memory to insert the predetermined monochromatic image signal such as a black-level signal between the input frames. If the PinP display signal is not overlapped with the television image signal, the switching portion 16 is switched to the FRC portion 10 to perform the FRC process (motion-compensated frame interpolation process) for the input image signal. The switching portion 16 may be disposed on the subsequent stage of the FRC portion 10 such that the output signal of the FRC portion 10 and the output signal of the black-level signal insert processing portion 24 are switched and output to the liquid crystal display panel 19.

In this embodiment, the drive frequency of the liquid crystal display panel 19 is not changed and is maintained at 120 Hz. That is, the frame rate (the number of frames) of the display image signal input to the electrode driving portion 18 is always the same. If the image signal overlapped with the PinP display signal is input, the black-level signal insert processing portion 24 makes up a means of inserting the predetermined monochromatic image signal such as a black-level signal between the frames of the input image signal to convert the number of frames of the input image signal. Another embodiment of the black-level signal insert process may be configured such that the electrode driving portion 18 applies a black write voltage to the liquid crystal display panel 19 for a predetermined period (in the case of this example, 1/120 second).

Since the interpolation process through motion compensation is not performed for the input image signal when the image signal overlapped with the PinP signal is input, the image quality can effectively be prevented from deteriorating in the sub-screen part due to the motion-compensated FRC process by eliminating the detection errors, the motion compensation errors, etc., of the motion vector occurring because the moving images with different motion characteristics are mixed. Since the frame rate is converted by inserting the monochromatic image signal in this case, the drive frequency of the liquid crystal display panel 19 does not need to be changed. The moving image quality improving effect can also be maintained in this case.

Other than the above embodiment, if the image signal overlapped with the PinP display signal is input, the image quality may be prevented from deteriorating due to the motion-compensated FRC process while maintaining the moving image quality improving effect by dividing the original image of the input frame into a plurality of frame images at a predetermined luminance rate and performing the frame rate conversion.

Thirteenth Embodiment

In a thirteenth embodiment of the present invention, it is assumed that the first image signal is, for example, the television image signal acquired by receiving broadcast and that the second image signal is, for example, the character signal such as OSD, and when both image signals are combined (overlapped) and displayed, the compensation intensity of the motion compensation process can be varied in the interpolation frame generating portion. Specifically, the interpolation frame generating portion is included that performs weighted addition of the image signal subjected to the motion compensation process and the image signal subjected to the linear interpolation process at a predetermined rate to generate an interpolation frame, and the weighted addition rate can be varied at the time of the OSD display.

Figure 19:
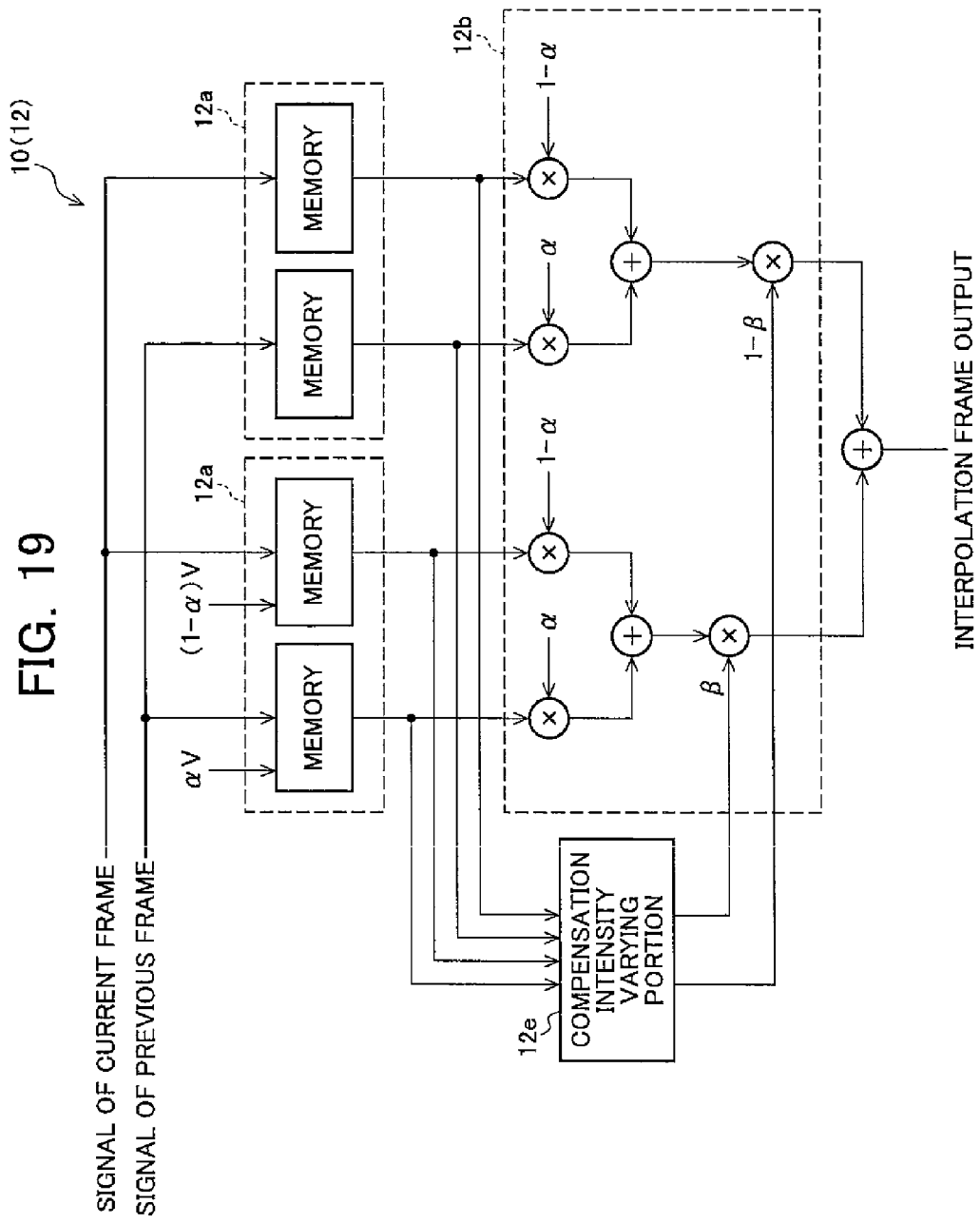
FIG. 19 is a block diagram of an exemplary main configuration of an FRC portion according to thirteenth and fourteenth embodiments of the present invention.

FIG. 19 is a block diagram of an exemplary main configuration of the FRC portion 10 according to the thirteenth embodiment of the present invention, and a frame generating portion 12 of the FRC portion 10 includes an interpolation frame memory 12a, an interpolation frame generating portion 12b, and a compensation intensity varying portion 12e that can vary the compensation intensity of the motion compensation process in the FRC portion 10. Turning on/off of the OSD display is controlled in accordance with instruction operations performed by a user with the use of the remote controller, etc. In FIG. 19, V denotes an interpolation vector; α denotes a frame interpolation rate; and β denotes interpolation intensity (weighted addition rate).

Generally, known methods of the frame interpolation process include the frame interpolation through the linear interpolation between two frames and the frame interpolation using motion vectors (motion compensated interpolation). In the former case, an interpolation frame is acquired by the linear interpolation from the signal of the previous frame and the signal of the current frame at a frame interpolation rate α. Therefore, using this linear interpolation can prevent the image quality deterioration in the OSD part, which occurs because the OSD part is pulled by the motion in the FRC process.

On the other hand, to acquire an interpolation frame from the previous frame and the current frame in the latter case, the interpolation vector V is detected from the motion vectors between the previous frame image and the current frame image, and the interpolation frame is acquired from the weighted addition of a signal shifted the previous frame image by a degree of αV obtained by dividing the value (interpolation vector V) by the frame interpolation rate α and a signal shifted the current frame image by (α−1) V. Although good image quality can be acquired without deteriorating the resolution since a moving image itself is captured and compensated by using this motion-compensated interpolation, the image quality may be deteriorated in the OSD part because the OSD part is pulled due to this process.

Therefore, in this embodiment, the compensation intensity varying portion 12e is provided in the frame generating portion 12. If the OSD processing portion 14 overlaps the OSD signal with the television image signal, the compensation intensity varying portion 12e varies the weighted addition rate β. The weighted addition rate β is a rate for performing the weighted addition of the image signal subjected to the motion compensation process and the image signal subjected to the linear interpolation process. The interpolation frame generating portion 12b of this embodiment performs the weighted addition of the linear interpolation and the motion-compensated interpolation in accordance with the weighted addition rate β to generate the interpolation frame.

For example, if the OSD signal is overlapped with the television image signal, the compensation intensity varying portion 12e sets the weighted addition rate β=0 and defines the image signal subjected to the linear interpolation process as the interpolation frame to prevent the image quality deterioration in the OSD part. On the other hand, if the OSD signal is not overlapped with the television image signal, the weighted addition rate β=1 is set to define the image signal subjected to the motion compensation process as the interpolation frame to achieve better image quality for the moving image.

Since the weighted addition rate β can arbitrarily and variably be set, the rate may be set to a substantially intermediate value between zero and one. This enables control to be performed such that the image quality of the OSD part is not deteriorated while performing the motion compensation in the interpolation frame image, and this can appropriately improve both the image quality deterioration due to the motion blur and the image quality deterioration in the OSD display.

Since the compensation intensity can be varied (weakened) in the motion compensation process in the FRC when the image signal overlapped with the OSD signal is input, the image quality deterioration in the OSD part occurring due to the motion-compensated FRC process can effectively be constrained by reducing the effects of the detection errors, the motion compensation errors, etc., of the motion vector occurring because the moving image and the still image (OSD) are mixed.

Fourteenth Embodiment

In a fourteenth embodiment of the present invention, it is assumed that the first image signal is, for example, the television image signal acquired by receiving broadcast and that the second image signal is, for example, the sub-screen image signal such as PinP, and when both image signals are combined (overlapped) and displayed, the compensation intensity of the motion compensation process can be varied in the interpolation frame generating portion. Specifically, the interpolation frame generating portion is included that performs weighted addition of the image signal subjected to the motion compensation process and the image signal subjected to the linear interpolation process at a predetermined rate to generate an interpolation frame, and the weighted addition rate can be varied at the time of the sub-screen display.

A main configuration of the FRC portion 10 according to the fourteenth embodiment of the present invention is the same as the above configuration shown in FIG. 19. That is, the frame generating portion 12 of the FRC portion 10 includes the interpolation frame memory 12a, the interpolation frame generating portion 12b, and the compensation intensity varying portion 12e that can vary the compensation intensity of the motion compensation process in the FRC portion 10. Turning on/off of the sub-screen (PinP) display is controlled in accordance with instruction operations performed by a user with the use of the remote controller, etc.

Generally, known methods of the frame interpolation process include, for example, the frame interpolation through the linear interpolation between two frames and the frame interpolation using motion vectors (motion compensated interpolation). In the former case, an interpolation frame is acquired by the linear interpolation from the signal of the previous frame and the signal of the current frame at a frame interpolation rate α. Therefore, using this linear interpolation can prevent the image quality deterioration in the sub-screen part, which occurs because the sub-screen part is pulled by the motion in the FRC process.

On the other hand, to acquire an interpolation frame from the previous frame and the current frame in the latter case, the interpolation vector V is detected from the motion vectors between the previous frame image and the current frame image, and the interpolation frame is acquired from the weighted addition of a signal shifted the previous frame image by a degree of αV obtained by dividing the value (interpolation vector V) by the frame interpolation rate α and a signal shifted the current frame image by (α−1)V. Although good image quality can be acquired without deteriorating the resolution since a moving image itself is captured and compensated by using this motion-compensated interpolation, the image quality may be deteriorated in the sub-screen part because the sub-screen part is pulled due to this process.

Therefore, in this embodiment, the compensation intensity varying portion 12e is provided in the frame generating portion 12. If the sub-screen processing portion 20 overlaps the PinP display signal with the television image signal, the compensation intensity varying portion 12e varies the weighted addition rate β. The weighted addition rate β is a rate for performing the weighted addition of the image signal subjected to the motion compensation process and the image signal subjected to the linear interpolation process. The interpolation frame generating portion 12b of this embodiment performs the weighted addition of the linear interpolation and the motion-compensated interpolation in accordance with the weighted addition rate β to generate the interpolation frame.

For example, if the PinP display signal is overlapped with the television image signal, the compensation intensity varying portion 12e sets the weighted addition rate β=0 and defines the image signal subjected to the linear interpolation process as the interpolation frame to prevent the image quality deterioration in the sub-screen part. On the other hand, if the PinP display signal is not overlapped with the television image signal, the weighted addition rate β=1 is set to define the image signal subjected to the motion compensation process as the interpolation frame to achieve better image quality for the moving image.

Since the weighted addition rate β can arbitrarily and variably be set, the rate may be set to a substantially intermediate value between zero and one. This enables control to be performed such that the image quality of the sub-screen part is not deteriorated while performing the motion compensation in the interpolation frame image, and this can appropriately improve both the image quality deterioration due to the motion blur and the image quality deterioration in the sub-screen display.

Since the compensation intensity can be varied (weakened) in the motion compensation process in the FRC when the image signal overlapped with the PinP display signal is input, the image quality deterioration in the sub-screen part occurring due to the motion-compensated FRC process can effectively be constrained by reducing the effects of the detection errors, the motion compensation errors, etc., of the motion vector occurring because the moving images with different motion characteristics are mixed.

Figure 20:
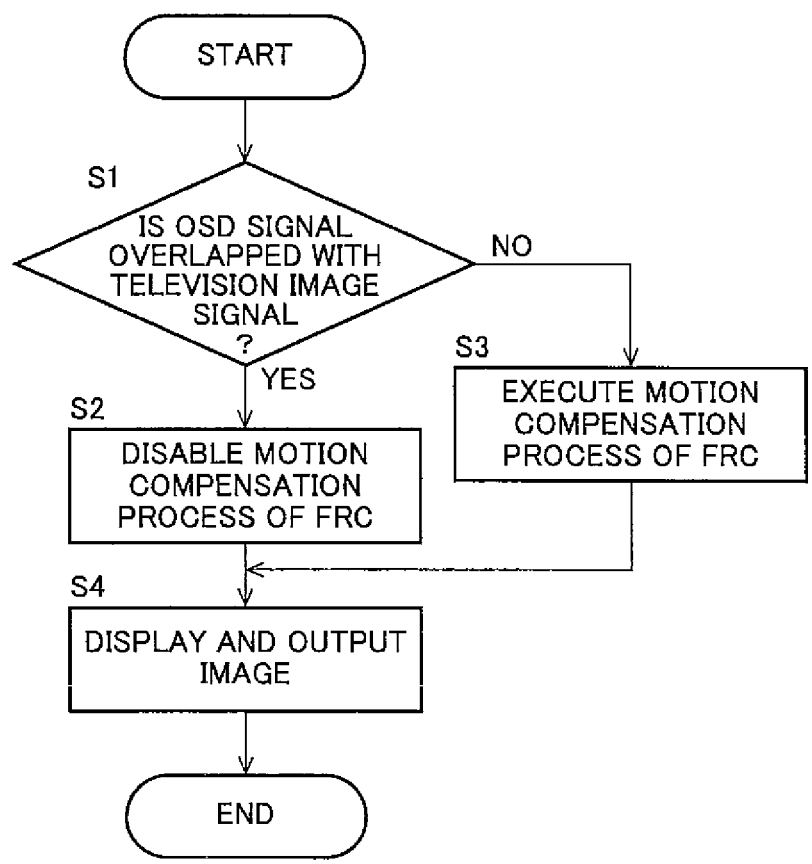
FIG. 20 is a flowchart for explaining an example of an image displaying method by the image display device of the present invention.

FIG. 20 is a flowchart for explaining an example of an image displaying method by the image display device of the present invention. An example of the image displaying method in the first and third embodiments will be described here. First, the image display device determines whether the OSD signal is overlapped with the television image signal (whether a predetermined user instruction is received) (step S1), and if it is determined that the OSD signal is overlapped (in the case of YES), the motion vector or the interpolation vector is set to zero-vector to disable the motion compensation process of the FRC portion 10 (step S2). If it is determined at step S1 that the OSD signal is not overlapped (in the case of NO), the motion compensation process of the FRC portion 10 is executed as usual (step S3). The image signal with the frame frequency converted in this way is displayed and output from the liquid crystal display panel 19 (step S4).

Figure 21:
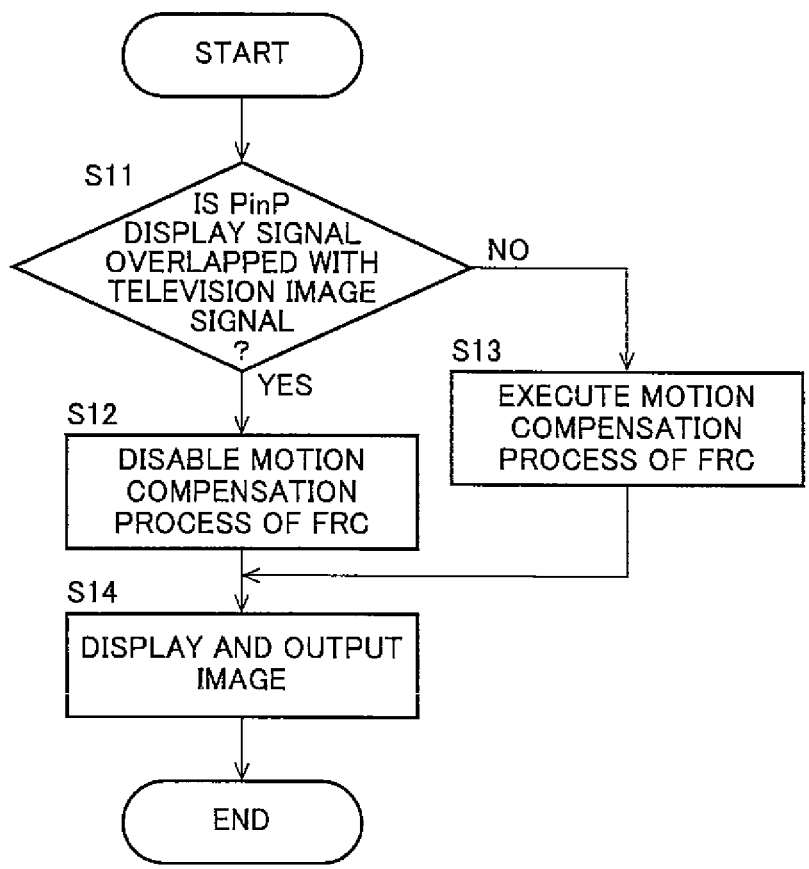
FIG. 21 is a flowchart for explaining another example of the image displaying method by the image display device of the present invention.

FIG. 21 is a flowchart for explaining another example of the image displaying method by the image display device of the present invention. An example of the image displaying method in the second and fourth embodiments will be described here. First, the image display device determines whether the PinP display signal is overlapped with the television image signal (whether a predetermined user instruction is received) (step S11), and if it is determined that the PinP display signal is overlapped (in the case of YES), the motion vector or the interpolation vector is set to zero-vector to disable the motion compensation process of the FRC portion 10 (step S12). If it is determined at step S11 that the PinP display signal is not overlapped (in the case of NO), the motion compensation process of the FRC portion 10 is executed as usual (step S13). The image signal with the frame frequency converted in this way is displayed and output from the liquid crystal display panel 19 (step S14).

Figure 22:
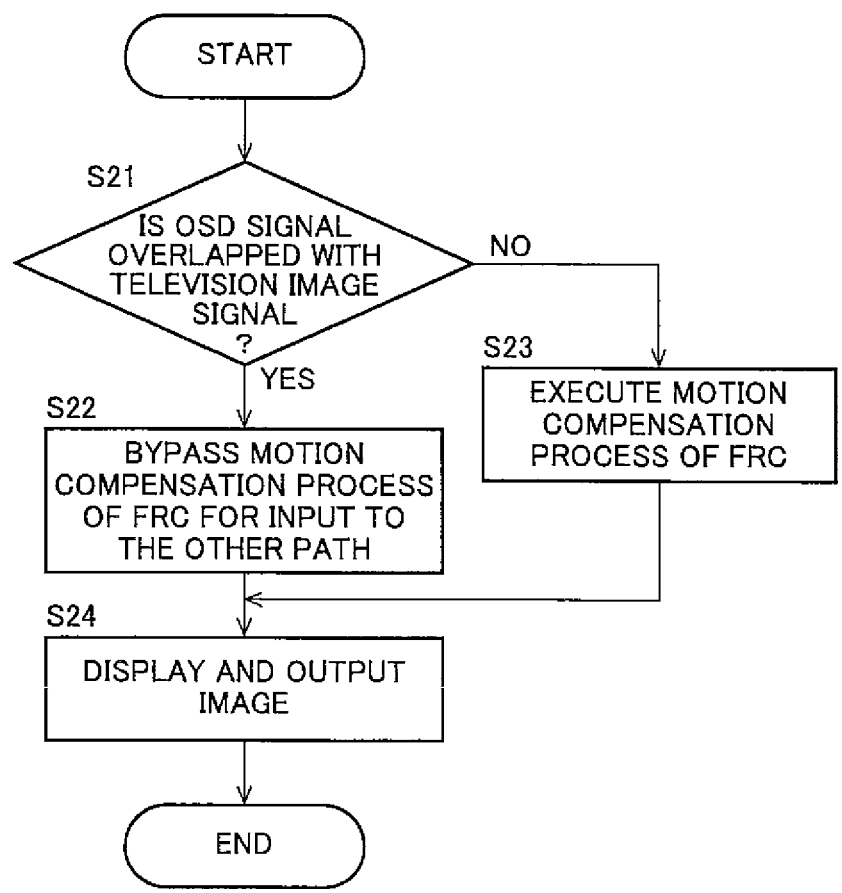
FIG. 22 is a flowchart for explaining another example of the image displaying method by the image display device of the present invention.

FIG. 22 is a flowchart for explaining another example of the image displaying method by the image display device of the present invention. An example of the image displaying method in the fifth, seventh, ninth, and eleventh embodiments will be described here. First, the image display device determines whether the OSD signal is overlapped with the television image signal (whether a predetermined user instruction is received) (step S21), and if it is determined that the OSD signal is overlapped (in the case of YES), the motion-compensated frame interpolation process of the FRC portion 10 is bypassed and the input image signal is input to another path 21 (step S22). At the bypassing path 21, the image signal is output after the frame rate is converted by executing any one of the inter-frame interpolation of the image signal subjected to the linear interpolation process, the inter-frame insertion of the image signal of the same frame, and the inter-frame insertion of the predetermined monochromatic image signal such as a black-level signal, or the input image signal is directly output to execute a process such as changing the drive frequency of the liquid crystal display panel 19.

If it is determined at step S21 that the OSD signal is not overlapped (in the case of NO), the image signal is output that is subjected to the motion-compensated interpolation process of the FRC portion 10 (step S23). Finally, the image is displayed and output from the liquid crystal display panel 19 (step S24).

Figure 23:
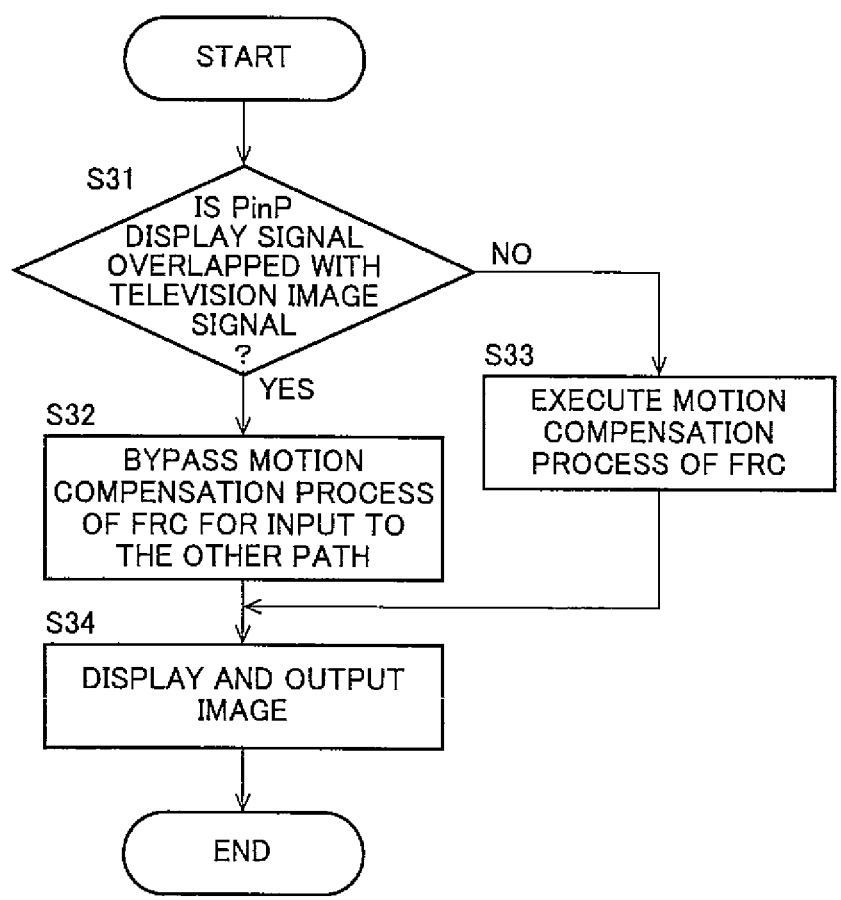
FIG. 23 is a flowchart for explaining another example of the image displaying method by the image display device of the present invention.

FIG. 23 is a flowchart for explaining another example of the image displaying method by the image display device of the present invention. An example of the image displaying method in the sixth, eighth, tenth, and twelfth embodiments will be described here. First, the image display device determines whether the PinP display signal is overlapped with the television image signal (whether a predetermined user instruction is received) (step S31), and if it is determined that the PinP display signal is overlapped (in the case of YES), the motion-compensated frame interpolation process of the FRC portion 10 is bypassed and the input image signal is input to another path 21 (step S32). At the bypassing path 21, the image signal is output after the frame rate is converted by executing any one of the inter-frame interpolation of the image signal subjected to the linear interpolation process, the inter-frame insertion of the image signal of the same frame, and the inter-frame insertion of the predetermined monochromatic image signal such as a black-level signal, or the input image signal is directly output to execute a process such as changing the drive frequency of the liquid crystal display panel 19.

If it is determined at step S31 that the PinP display signal is not overlapped (in the case of NO), the image signal is output that is subjected to the motion-compensated interpolation process of the FRC portion 10 (step S33). Finally, the image is displayed and output from the liquid crystal display panel 19 (step S34).

Figure 24:
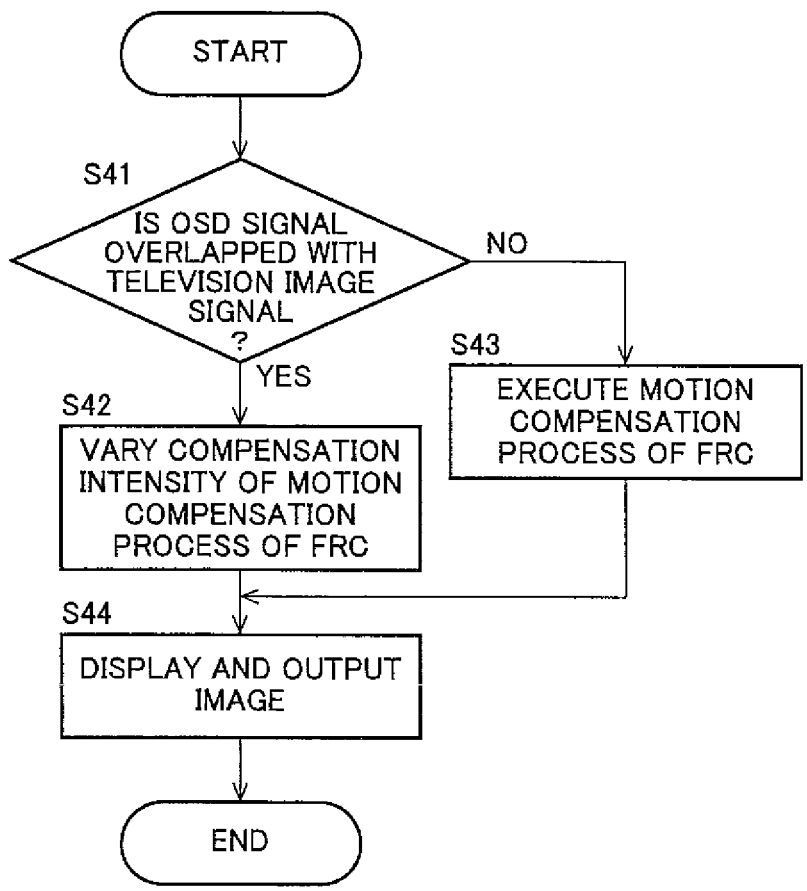
FIG. 24 is a flowchart for explaining another example of the image displaying method by the image display device of the present invention.

FIG. 24 is a flowchart for explaining another example of the image displaying method by the image display device of the present invention. An example of the image displaying method in the thirteenth embodiment will be described here. First, the image display device determines whether the OSD signal is overlapped with the television image signal (whether a predetermined user instruction is received) (step S41), and if it is determined that the OSD signal is overlapped (in the case of YES), the compensation intensity is varied (weakened) in the motion compensation process of the FRC portion 10 (step S42). If it is determined at step S41 that the OSD signal is not overlapped (in the case of NO) the compensation intensity is increased as usual in the motion compensation process of the FRC portion 10 (step S43). The image signal with the frame frequency converted in this way is displayed and output from the liquid crystal display panel 19 (step S44).

Figure 25:
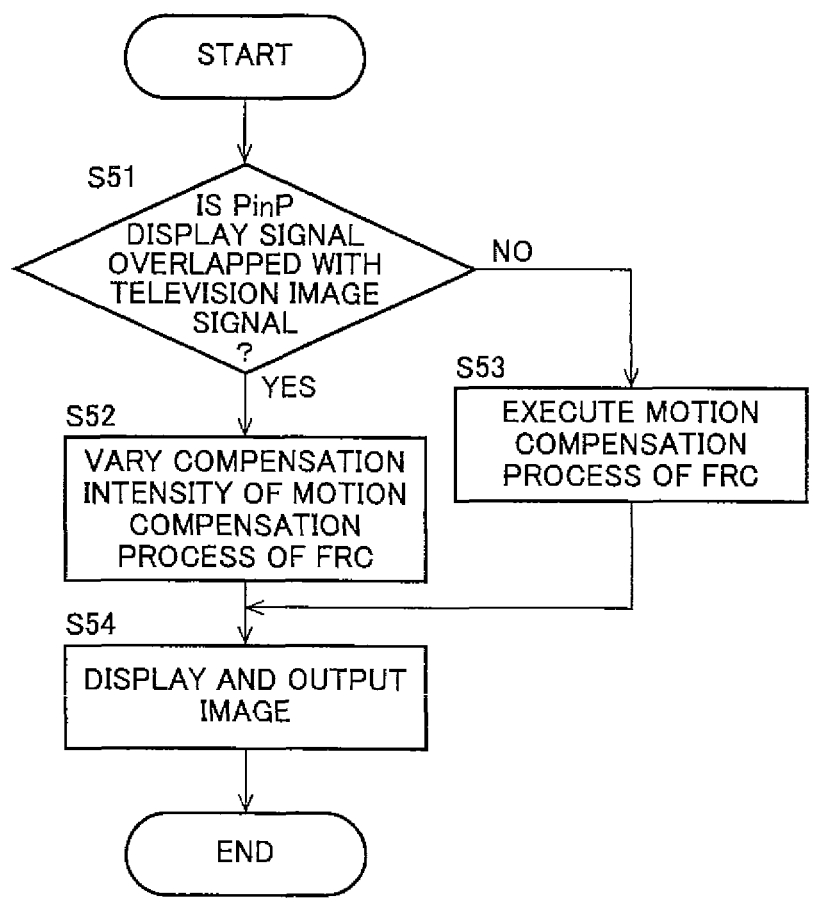
FIG. 25 is a flowchart for explaining another example of the image displaying method by the image display device of the present invention.

FIG. 25 is a flowchart for explaining another example of the image displaying method by the image display device of the present invention. An example of the image displaying method in the fourteenth embodiment will be described here. First, the image display device determines whether the PinP display signal is overlapped with the television image signal (whether a predetermined user instruction is received) (step S51), and if it is determined that the PinP display signal is overlapped (in the case of YES), the compensation intensity is varied (weakened) in the motion compensation process of the FRC portion 10 (step S52). If it is determined at step S51 that the PinP display signal is not overlapped (in the case of NO), the compensation intensity is increased as usual in the motion compensation process of the FRC portion 10 (step 353). The image signal with the frame frequency converted in this way is displayed and output from the liquid crystal display panel 19 (step S54).

According to the embodiments described above, when combining and displaying a first image signal and a second image signal having motion characteristics different from the first image signal, the motion compensation process in the frame rate converting (FRC) portion can be disabled for display and output and, therefore, the image quality can effectively be prevented from deteriorating in the display part of the first and second image signals due to the interpolation process through motion compensation.

Figure 26:
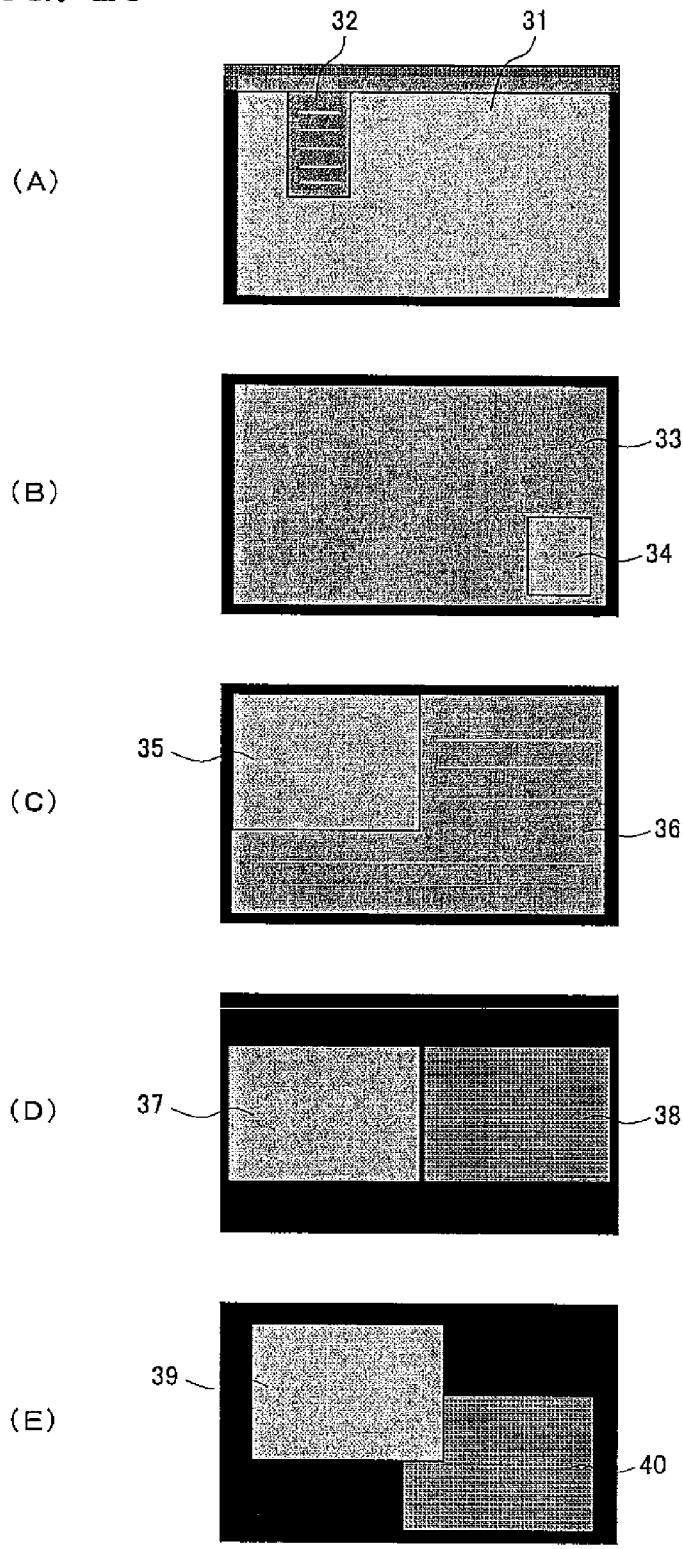
FIG. 26 is a view for explaining a plurality of image composite display examples.

FIG. 26 is a view for explaining a plurality of image composite display examples. Although the above embodiments are described by taking the examples of displaying a second image signal (character signal) 32 combined (overlapped) within a first image signal 31 (see FIG. 26(A)) and displaying a second image signal (sub-screen image signal) 34 combined (overlapped) within a first image signal 33 (see FIG. 26(B)), this is not a limitation and it is clear that the present invention is applicable to the case of combining and displaying at least two or more image signals having different motions.

For example, as shown in FIG. 26(C), the present invention is applicable to the case of combining and displaying a second image signal 36 on the outside of a first image signal 35. In this case, the first image signal 35 may be, for example, a television image signal acquired by receiving broadcast, and the second image signal 36 may be, for example, a data information display signal acquired by receiving data broadcast or a program information display signal generated within the display device based on program information multiplexed as additional information with the television image signal.

As shown in FIG. 26(D), the present invention is applicable to the case of combining and displaying a first image signal 37 and a second image signal 38 side by side on the right and left, etc. In this case, the first image signal 37 may be, for example, a television image signal acquired by receiving broadcast, and the second image signal 38 may be, for example, a PoutP (Picture out Picture) display signal. The PoutP display signal may be a character signal such as characters, numeric characters, symbols, and images or an image signal such as a still image and a moving image, is not limited to those generated within the display device, and may be input from the outside as is the case with the above PinP display signal.

As shown in FIG. 26(E), the present invention is applicable to the case of combining and displaying a first image signal 39 and a second image signal 40 in a partially overlapping manner. In this case, the first image signal 39 may be, for example, a television image signal acquired by receiving broadcast, and the second image signal 40 may be, for example, a PoutP display signal generated within the display device or a PoutP display signal input from the outside.

It is needless to say that the first image signal is not limited to the above television image signal and may be an image signal reproduced from an external medium.

Other embodiments of the image display device of the present invention will further be described. The image display device includes the above FRC portion 10 shown in FIG. 1 and the main object thereof is to disable the motion compensation process of the FRC portion 10 only for a pixel combined with the second image signal or a region including the pixel when combining and displaying a first image signal (e.g., a moving image signal) and a second image signal (e.g., a still character signal such as OSD) having motion characteristics different from the first image signal to prevent the image quality deterioration in a display part (e.g., a character display part) of the second image signal due to the FRC process. Although the present invention is applicable to general image display devices having the hold-type display characteristics such as liquid crystal displays, organic EL displays, and electrophoretic displays, a representative example described in the following embodiments will be the case of applying the present invention to a liquid crystal display device using a liquid crystal display panel for a display panel.

Fifteenth Embodiment

In a fifteenth embodiment of the present invention, it is assumed that the first image signal is, for example, the television image signal acquired by receiving broadcast and that the second image signal is, for example, the character signal such as OSD (On Screen Display) generated within the device, and when both image signals are combined and displayed, the interpolation vector of the interpolation block combined (overlapped) with the character signal is set to zero to disable the motion compensation process of the FRC portion 10 for a pixel combined (overlapped) with the character signal or a region including the pixel so that no interpolation occurs between pixels located at different positions only in that portion.

Figure 27:
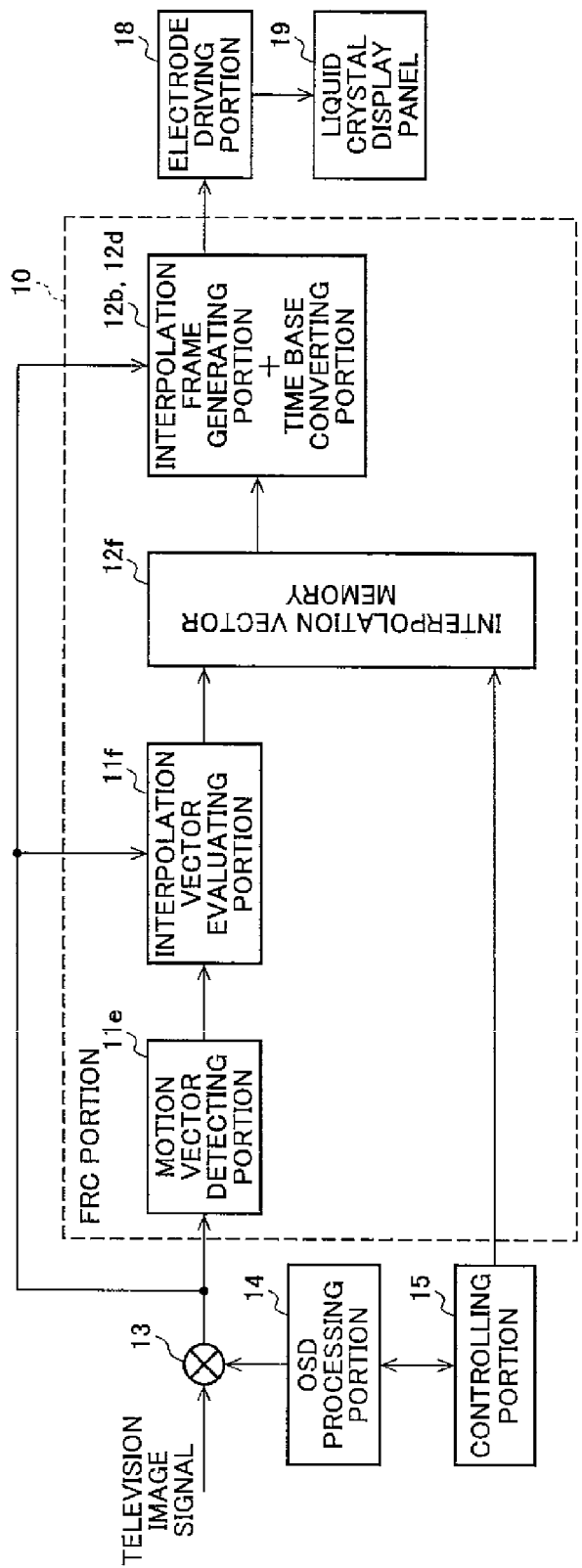
FIG. 27 is a block diagram of an exemplary main configuration of a liquid crystal display device according to a fifteenth embodiment of the present invention.

FIG. 27 is a block diagram of an exemplary main configuration of a liquid crystal display device according to the fifteenth embodiment of the present invention and the liquid crystal display device includes the FRC portion 10, the combining portion 13, the OSD processing portion 14, the controlling portion 15, the electrode driving portion 18, and the liquid crystal display panel 19. The FRC portion 10 includes the motion vector detecting portion 11e, the interpolation vector evaluating portion 11f, the interpolation frame generating portion 12b, and the time base converting portion 12d, and an interpolation vector memory 12f is also included to accumulate the interpolation vector allocated by the interpolation vector evaluating portion 11f for each interpolation vector.

The OSD processing portion 14 generates an on-screen display signal (OSD signal) for performing the on-screen display of predetermined characters, numeric characters, symbols, etc. Turning on/off of the OSD display is controlled in accordance with instruction operations performed by a user with the use of the remote controller, etc. The combining portion 13 combines (overlaps) the OSD signal from the OSD processing portion 14 with the television image signal.

As described above, the liquid crystal display panel 19 is an active-matrix liquid crystal display that has a liquid crystal layer and electrodes for applying scan signals and data signals to the liquid crystal layer. The electrode driving portion 18 is a display driver for driving the scan electrodes and the data electrodes of the liquid crystal display panel 19 based on the image signal subjected to the frame rate conversion by the FRC portion 10. The controlling portion 15 includes a CPU for controlling the above portions and performs control such that the motion compensation process of the FRC portion 10 is disabled for a pixel overlapped with the OSD signal or a region including the pixel when the OSD signal is overlapped with the television image signal by the OSD processing portion 14 in accordance with the user's instruction, etc.

The signal overlapped with the television image signal may be a character signal in a stationary state such as characters, numeric characters, symbols, and images, is not limited to the OSD signal generated within the device, and may be a character (caption) signal transmitted/received through text broadcasting/teletext broadcasting. Alternatively, the signal may be a character information signal such as a program logo and telop preliminarily combined with the television image signal on the transmission side such as a broadcast station. In this case, a position of the combined character information signal may be detected to disable the motion compensation process of the FRC portion 10 for a pixel combined with the character information signal or a region including the pixel. However, if characters are in motion such as scrolling, it is preferable to execute the motion compensation process of the FRC portion 10.

The drive frequency of the liquid crystal display panel 19 is a frame frequency converted by the FRC portion 10. Therefore, if an image signal input with a frame frequency of 60 Hz is converted by the FRC portion 10 into a frame frequency of 120 Hz, the drive frequency of the liquid crystal display panel 19 is 120 Hz.

In FIG. 27, the interpolation vector memory 12*f* accumulates the interpolation vector allocated by the interpolation vector evaluating portion 11*f* for each interpolation block. If the OSD processing portion 14 overlaps the OSD signal with the television image signal, the controlling portion 15 accesses the interpolation vector memory 12*f* to set the interpolation vector to zero-vector in the interpolation block overlapped with the OS signal. For the interpolation block not overlapped with the OSD signal in the television image signal, the interpolation vector of the interpolation vector memory 12*f* is input to the interpolation frame generating portion 12*b*.

Specifically, when the controlling portion 15 accesses the interpolation vector memory 12*f*, flag information is added to the interpolation block overlapped with the OSD signal. This flag information is a flag for not using the interpolation vector of the interpolation block, and the interpolation vector of the interpolation block with the flag information added is controlled such that the output thereof becomes zero. By setting the interpolation vector of the interpolation vector memory 12*f* to zero in this way, the execution of the motion compensation interpolation can be avoided.

The controlling portion 15 preliminarily retains information indicating which interpolation block (or which pixel) is overlapped with the OSD signal. This information is, for example, the coordinate position information of a pixel and the region information of an interpolation block and may be any information that reveals the pixel or region overlapped with the OSD signal. The interpolation vector of the interpolation block with no flag information added is output from the interpolation vector memory 12*f*, input to the interpolation frame generating portion 12*b*, and utilized for generating an interpolation frame in the interpolation frame generating portion 12*b*.

Therefore, the moving image quality can be improved by the motion-compensated FRC process at the time of the normal moving image display and, since the motion compensation process is disabled for a pixel overlapped with the OSD signal or a region including the pixel if the image signal overlapped with the OSD signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed.

Sixteenth Embodiment

In a sixteenth embodiment of the present invention, it is assumed that the first image signal is, for example, the television image signal (the main-screen image signal) acquired by receiving broadcast and that the second image signal is, for example, the sub-screen image signal such as PinP (Picture in Picture) generated within the device, and when both image signals are combined and displayed, the interpolation vector of the interpolation block combined (overlapped) with the sub-screen image signal is set to zero to disable the motion compensation process of the FRC portion 10 for a pixel combined (overlapped) with the sub-screen image signal or a region including the pixel so that no interpolation occurs between pixels located at different positions only in that portion.

Figure 28:
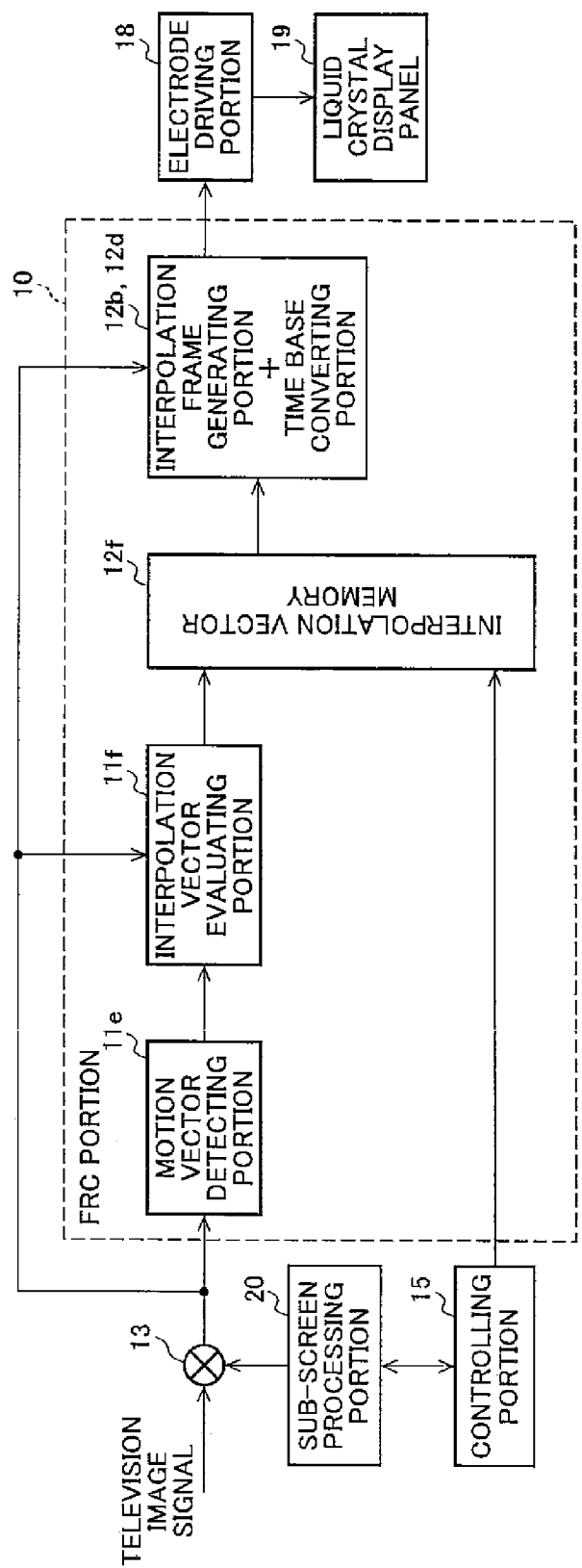
FIG. 28 is a block diagram of an exemplary main configuration of a liquid crystal display device according to a sixteenth embodiment of the present invention.

FIG. 28 is a block diagram of an exemplary main configuration of a liquid crystal display device according to the sixteenth embodiment of the present invention and the liquid crystal display device includes the FRC portion 10, the combining portion 13, the sub-screen processing portion 20, the controlling portion 15, the electrode driving portion 18, and the liquid crystal display panel 19. The FRC portion 10 includes the motion vector detecting portion 11*e*, the interpolation vector evaluating portion 11*f*, the interpolation frame generating portion 12*b*, and the time base converting portion 12*d*, and an interpolation vector memory 12*f* is also included to accumulate the interpolation vector allocated by the interpolation vector evaluating portion 11*f* for each interpolation vector.

The sub-screen processing portion 20 generates a PinP display signal for displaying a reduced-size television image (moving image) or a capture image (still image) on a sub-screen. Turning on/off of the sub-screen (PinP) display is controlled in accordance with instruction operations performed by a user with the use of the remote controller, etc. The combining portion 13 combines (overlaps) the PinP display signal from the sub-screen processing portion 20 with the television image signal.

The controlling portion 15 includes a CPU for controlling the above portions and performs control such that the motion compensation process of the FRC portion 10 is disabled for a pixel overlapped with the PinP display signal or a region including the pixel when the PinP display signal is overlapped with the television image signal by the sub-screen processing portion 20 in accordance with the user's instruction, etc.

The sub-screen image signal (sub-screen image signal) to be overlapped with the television image signal (main-screen image signal, main-screen image signal) may be a character signal such as characters, numeric characters, symbols, and images or an image signal such as a still image and a moving image, is not limited to the sub-screen image signal generated within the device, and may be input from the outside. Alternatively, the signal may be a sub-screen image signal preliminarily combined on the transmission side such as a broadcast station. In this case, a position of the combined sub-screen image signal may be detected to disable the motion compensation process of the FRC portion 10 for a pixel combined with the sub-screen image signal or a region including the pixel.

The drive frequency of the liquid crystal display panel 19 is a frame frequency converted by the FRC portion 10. Therefore, if an image signal input with a frame frequency of 60 Hz is converted by the FRC portion 10 into a frame frequency of 120 Hz, the drive frequency of the liquid crystal display panel 19 is 120 Hz.

In FIG. 28, the interpolation vector memory 12*f* accumulates the interpolation vector allocated by the interpolation vector evaluating portion 11*f* for each interpolation block. If the sub-screen processing portion 20 overlaps the PinP display signal with the television image signal, the controlling portion 15 accesses the interpolation vector memory 12*f* to set the interpolation vector to zero-vector in the interpolation block overlapped with the PinP display signal. For the interpolation block not overlapped with the PinP display signal in the television image signal, the interpolation vector of the interpolation vector memory 12f is input to the interpolation frame generating portion 12b.

Specifically, when the controlling portion 15 accesses the interpolation vector memory 12f, flag information is added to the interpolation block overlapped with the PinP display signal. This flag information is a flag for not using the interpolation vector of the interpolation block, and the interpolation vector of the interpolation block with the flag information added is controlled such that the output thereof becomes zero. By setting the interpolation vector of the interpolation vector memory 12f to zero in this way, the execution of the motion compensation interpolation can be avoided.

The controlling portion 15 preliminarily retains information indicating which interpolation block (or which pixel) is overlapped with the PinP display signal. This information is, for example, the coordinate position information of a pixel and the region information of an interpolation block and may be any information that reveals the pixel or region overlapped with the PinP display signal. The interpolation vector of the interpolation block with no flag information added is output from the interpolation vector memory 12f, input to the interpolation frame generating portion 12b, and utilized for generating an interpolation frame in the interpolation frame generating portion 12b.

Therefore, the moving image quality can be improved by the motion-compensated FRC process at the time of the normal moving image display and, since the motion compensation process is disabled for a pixel overlapped with the sub-screen image signal or a region including the pixel if the image signal overlapped with the sub-screen image signal is input, the image quality can effectively be prevented from deteriorating in the sub-screen display part due to the motion-compensated FRC process by eliminating the detection errors, the motion compensation errors, etc., of the motion vector occurring because the moving images with different motion characteristics are mixed.

Seventeenth Embodiment

In a seventeenth embodiment of the present invention, it is assumed that the first image signal is, for example, the television image signal acquired by receiving broadcast and that the second image signal is, for example, the character signal such as OSD, and when both image signals are combined and displayed, the interpolation vector of the interpolation block combined (overlapped) with the character signal in the interpolation frame generating portion 12b is set to zero to disable the motion compensation process of the FRC portion 10 for a pixel combined (overlapped) with the character signal or a region including the pixel so that no interpolation occurs between pixels located at different positions only in that portion.

Figure 29:
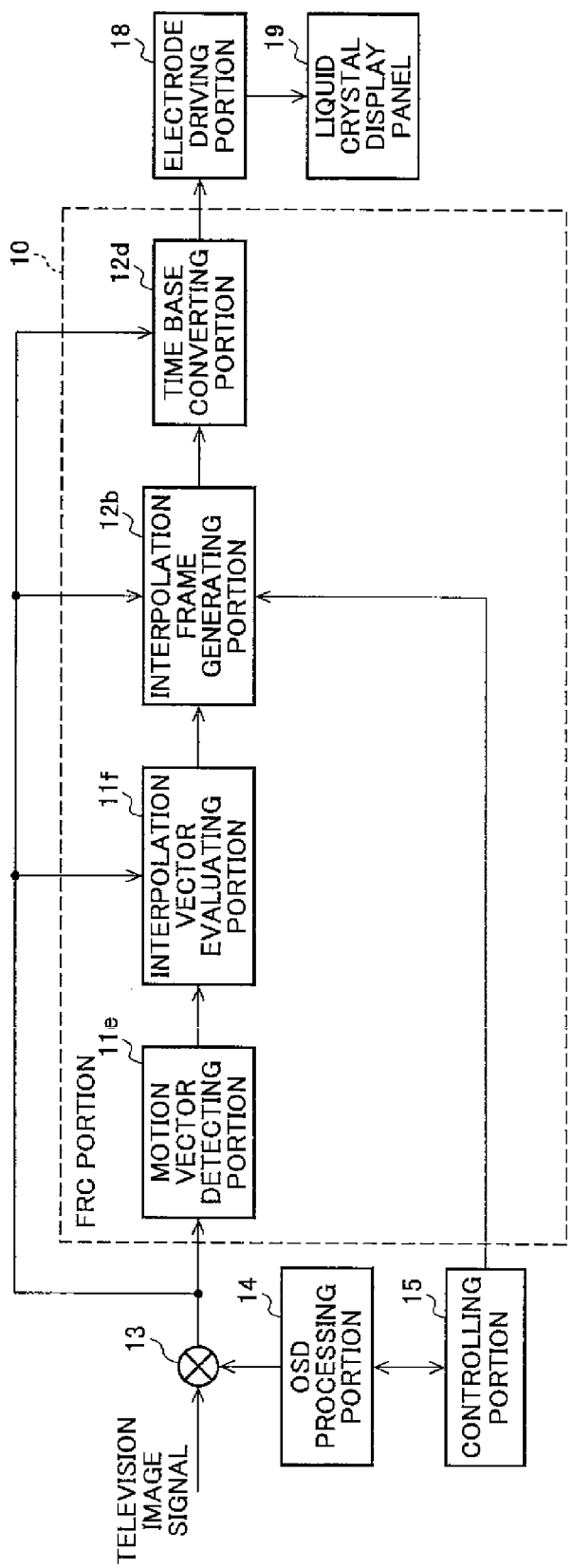
FIG. 29 is a block diagram of an exemplary main configuration of a liquid crystal display device according to a seventeenth embodiment of the present invention.

FIG. 29 is a block diagram of an exemplary main configuration of a liquid crystal display device according to the seventeenth embodiment of the present invention and the liquid crystal display device includes the FRC portion 10, the combining portion 13, the OSD processing portion 14, the controlling portion 15, the electrode driving portion 18, and the liquid crystal display panel 19. The FRC portion 10 includes the motion vector detecting portion 11e, the interpolation vector evaluating portion 11f, the interpolation frame generating portion 12b, and the time base converting portion 12d as shown in FIG. 1. Turning on/off of the OSD display is controlled in accordance with instruction operations performed by a user with the use of the remote controller, etc.

In FIG. 29, the interpolation frame generating portion 12b generates an interpolation frame from the interpolation vector allocated by the interpolation vector evaluating portion 11f. If the OSD processing portion 14 overlaps the OSD signal with the television image signal, the controlling portion 15 accesses the interpolation frame generating portion 12b to set the interpolation vector to zero-vector in the interpolation block overlapped with the OSD signal. For the interpolation block not overlapped with the OSD signal in the television image signal, the interpolation frame generating portion 12b generates the interpolation frame from the interpolation vector.

The controlling portion 15 passes to the interpolation frame generating portion 12b the information (such as coordinate position information and region information) indicating which interpolation block (or which pixel) is overlapped with the OSD signal, and the interpolation frame generating portion 12b sets the interpolation vector to zero-vector for a corresponding pixel or an interpolation block including the pixel in accordance with the instruction from the controlling portion 15.

Therefore, the moving image quality can be improved by the motion-compensated FRC process at the time of the normal moving image display and, since the motion compensation process is disabled for a pixel overlapped with the OSD signal or a region including the pixel if the image signal overlapped with the OSD signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed.

Eighteenth Embodiment

In an eighteenth embodiment of the present invention, it is assumed that the first image signal is, for example, the television image signal acquired by receiving broadcast and that the second image signal is, for example, the sub-screen image signal such as PinP (Picture in Picture), and when both image signals are combined and displayed, the interpolation vector of the interpolation block combined (overlapped) with the sub-screen image signal in the interpolation frame generating portion 12b is set to zero to disable the motion compensation process of the FRC portion 10 for a pixel combined (overlapped) with the sub-screen image signal or a region including the pixel so that no interpolation occurs between pixels located at different positions only in that portion.

Figure 30:
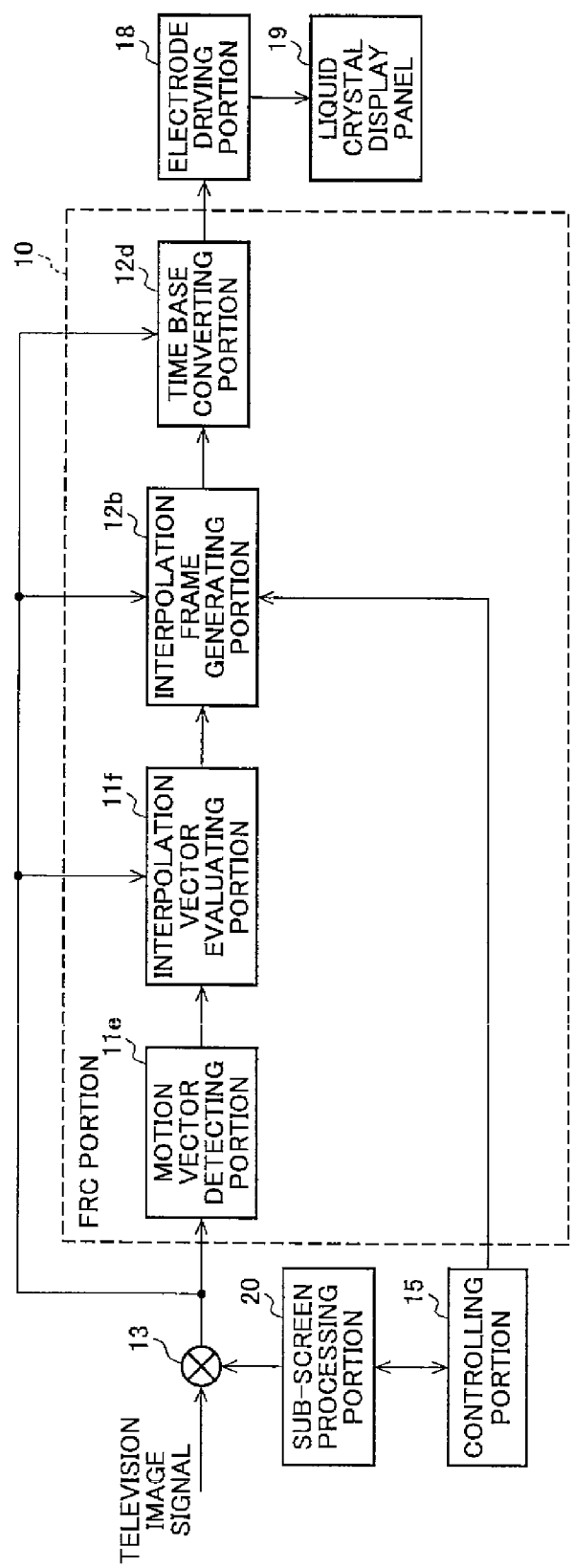
FIG. 30 is a block diagram of an exemplary main configuration of a liquid crystal display device according to an eighteenth embodiment of the present invention.

FIG. 30 is a block diagram of an exemplary main configuration of a liquid crystal display device according to the eighteenth embodiment of the present invention and the liquid crystal display device includes the FRC portion 10, the combining portion 13, the sub-screen processing portion 20, the controlling portion 15, the electrode driving portion 18, and the liquid crystal display panel 19. The FRC portion 10 includes the motion vector detecting portion 11e, the interpolation vector evaluating portion 11f, the interpolation frame generating portion 12b, and the time base converting portion 12d as shown in FIG. 1. Turning on/off of the sub-screen (PinP) display is controlled in accordance with instruction operations performed by a user with the use of the remote controller, etc.

In FIG. 30, the interpolation frame generating portion 12*b* generates an interpolation frame from the interpolation vector allocated by the interpolation vector evaluating portion 11*f*. If the sub-screen processing portion 20 overlaps the PinP display signal with the television image signal, the controlling portion 15 accesses the interpolation frame generating portion 12*b* to set the interpolation vector to zero-vector in the interpolation block overlapped with the PinP display signal. For the interpolation block not overlapped with the PinP display signal in the television image signal, the interpolation frame generating portion 12*b* generates the interpolation frame from the interpolation vector.

The controlling portion 15 passes to the interpolation frame generating portion 12*b* the information (such as coordinate position information and region information) indicating which interpolation block (or which pixel) is overlapped with the PinP display signal, and the interpolation frame generating portion 12*b* sets the interpolation vector to zero-vector for a corresponding pixel or an interpolation block including the pixel in accordance with the instruction from the controlling portion 15.

Therefore, the moving image quality can be improved by the motion-compensated FRC process at the time of the normal moving image display and, since the motion compensation process is disabled for a pixel overlapped with the sub-screen image signal or a region including the pixel if the image signal overlapped with the sub-screen image signal is input, the image quality can effectively be prevented from deteriorating in the sub-screen part due to the motion-compensated FRC process by eliminating the detection errors, the motion compensation errors, etc., of the motion vector occurring because the moving images with different motion characteristics are mixed.

Nineteenth Embodiment

In a nineteenth embodiment of the present invention, a linear interpolation processing portion is provided on a path other than the input path to the FRC portion 10; it is assumed that the first image signal is, for example, the television image signal acquired by receiving broadcast and that the second image signal is, for example, the character signal such as OSD; and when both image signals are combined and displayed, the switching to the linear interpolation processing portion is performed for a pixel combined (overlapped) with the character signal or a region including the pixel to interpolate the image signal subjected to the linear interpolation only in the OSD part. That is, for a pixel combined (overlapped) with the character signal or a region including the pixel in the input image signal, the switching is performed such that the frame rate is converted by performing the linear interpolation process rather than the interpolation process through motion compensation.

Figure 31:
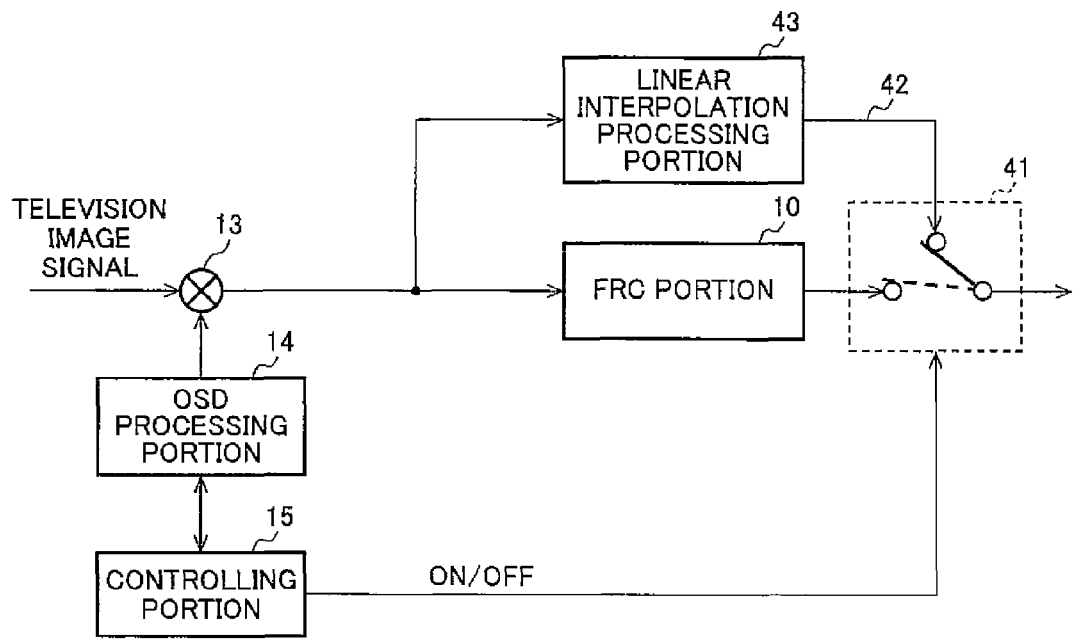
FIG. 31 is a block diagram of an exemplary main configuration of a liquid crystal display device according to a nineteenth embodiment of the present invention.

FIG. 31 is a block diagram of an exemplary main configuration of a liquid crystal display device according to the nineteenth embodiment of the present invention and the liquid crystal display device includes the FRC portion 10, the combining portion 13, the OSD processing portion 14, the controlling portion 15, a switching portion 41, a path 42 provided separately from the input path to the FRC portion 10, and a linear interpolation processing portion 43 on the path 42. The electrode driving portion 18 and the liquid crystal display panel 19 are not depicted. The switching portion 41 is disposed on the subsequent stage of the FRC portion 10 and switches whether the image signal (motion-compensated image) from the FRC portion 10 is output or the image signal (linear interpolation image) from the linear interpolation processing portion 43 is output in accordance with the instruction from the controlling portion 15. Turning on/off of the OSD display is controlled in accordance with instruction operations performed by a user with the use of the remote controller, etc.

If the OSD processing portion 14 overlaps the OSD signal with the television image signal, the controlling portion 15 switches the switching portion 41 to the path 42 (the linear interpolation processing portion 43) for a pixel overlapped with the OS signal or a region including the pixel to output to the display panel a display image signal generated by interpolating the image signal subjected to the linear interpolation process between frames of the input image signal. When the input image signal is input and the OSD signal is overlapped, the linear interpolation processing portion 43 inserts an interpolation frame subjected to the linear interpolation process between frames of the input image signal for a pixel overlapped with the OSD signal or a region including the pixel. For a pixel not overlapped with the OSD signal or a region including the pixel, the switching portion 41 is switched to the FRC portion 10 to output to the display panel a display image signal subjected to the FRC process (motion-compensated frame interpolation process) between frames of the input image signal.

In the linear interpolation process, as described in above non-patent document 2, an interpolation frame is acquired through linear interpolation using a frame interpolation rate $\alpha$ from the signal of the previous frame and the signal of the current frame.

Since the interpolation process through motion compensation is not performed for a pixel overlapped with the OSD signal or a region including the pixel when the image signal overlapped with the OSD signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed.

Twentieth Embodiment

In a twentieth embodiment of the present invention, a linear interpolation processing portion is provided on a path other than the input path to the FRC portion 10; it is assumed that the first image signal is, for example, the television image signal acquired by receiving broadcast and that the second image signal is, for example, the sub-screen image signal such as PinP; and when both image signals are combined and displayed, the switching to the linear interpolation processing portion is performed for a pixel combined (overlapped) with the sub-screen image signal or a region including the pixel to interpolate the image signal subjected to the linear interpolation only in the sub-screen part. That is, for a pixel combined (overlapped) with the sub-screen image signal or a region including the pixel in the input image signal, the switching is performed such that the frame rate is converted by performing the linear interpolation process rather than the interpolation process through motion compensation.

Figure 32:
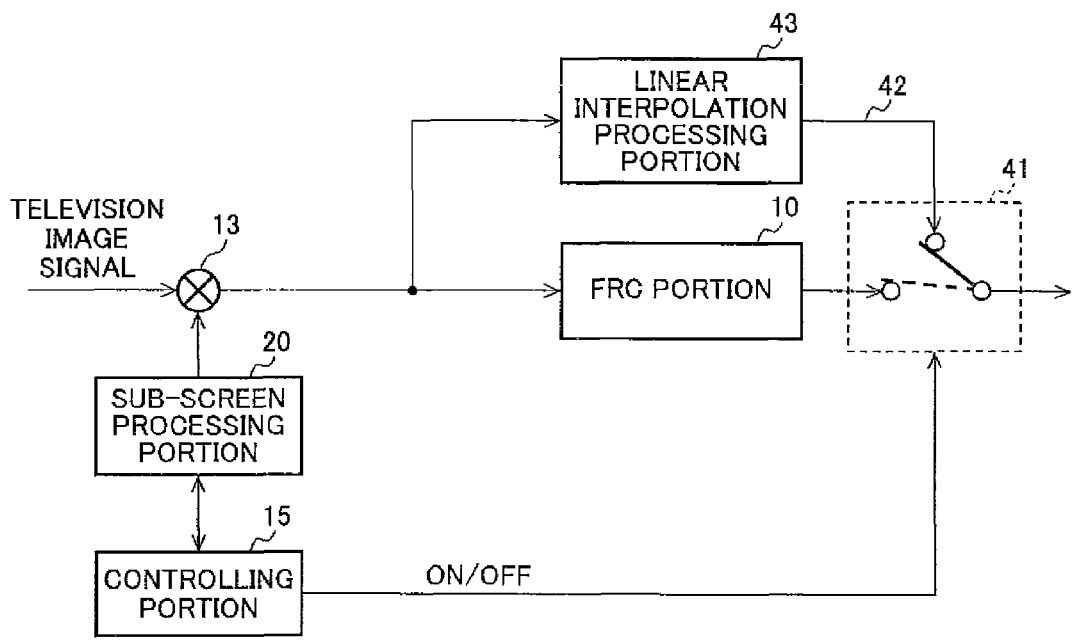
FIG. 32 is a block diagram of an exemplary main configuration of a liquid crystal display device according to a twentieth embodiment of the present invention.

FIG. 32 is a block diagram of an exemplary main configuration of a liquid crystal display device according to the twentieth embodiment of the present invention and the liquid crystal display device includes the FRC portion 10, the combining portion 13, the sub-screen processing portion 20, the controlling portion 15, the switching portion 41, the path 42 provided separately from the input path to the FRC portion 10, and the linear interpolation processing portion 43 on the path 42. The electrode driving portion 18 and the liquid crystal display panel 19 are not depicted. The switching portion 41 is disposed on the subsequent stage of the FRC portion 10 and switches whether the image signal (motion-compensated image) from the FRC portion 10 is output or the image signal (linear interpolation image) from the linear interpolation processing portion 43 is output. Turning on/off of the sub-screen (PinP) display is controlled in accordance with instruction operations performed by a user with the use of the remote controller, etc.

If the sub-screen processing portion 20 overlaps the PinP display signal with the television image signal (main-screen image signal), the controlling portion 15 switches the switching portion 41 to the path 42 (the linear interpolation processing portion 43) for a pixel overlapped with the PinP display signal or a region including the pixel to output to the display panel a display image signal generated by interpolating the image signal subjected to the linear interpolation process between frames of the input image signal. When the input image signal is input and the PinP display signal is overlapped, the linear interpolation processing portion 43 inserts an interpolation frame subjected to the linear interpolation process between frames of the input image signal for a pixel overlapped with the PinP display signal or a region including the pixel. For a pixel not overlapped with the PinP display signal or a region including the pixel, the switching portion 41 is switched to the FRC portion 10 to output to the display panel a display image signal subjected to the FRC process (motion-compensated frame interpolation process) between frames of the input image signal.

In the linear interpolation process, as described in above non-patent document 2, an interpolation frame is acquired through linear interpolation using a frame interpolation rate α from the signal of the previous frame and the signal of the current frame.

Since the interpolation process through motion compensation is not performed for a pixel overlapped with the sub-screen image signal or a region including the pixel when the image signal overlapped with the sub-screen image signal is input, the image quality can effectively be prevented from deteriorating in the sub-screen part due to the motion-compensated FRC process by eliminating the detection errors, the motion compensation errors, etc., of the motion vector occurring because the moving images with different motion characteristics are mixed.

Twenty-First Embodiment

In a twenty-first embodiment of the present invention, a memory is provided on a path other than the input path to the FRC portion 10; it is assumed that the first image signal is, for example, the television image signal acquired by receiving broadcast and that the second image signal is, for example, the character signal such as OSD; and when both image signals are combined and displayed, the switching to the memory is performed for a pixel combined (overlapped) with the character signal or a region including the pixel to convert the frame rate by rapidly and repeatedly reading the image signal of the same frame from the memory more than once only for the OSD part. That is, for a pixel combined (overlapped) with the character signal or a region including the pixel in the input image signal, the switching is performed such that the input image signal is rapidly and sequentially output to convert the frame rate and is displayed and output on the liquid crystal display panel 19 without performing the motion-compensated interpolation process.

Figure 33:
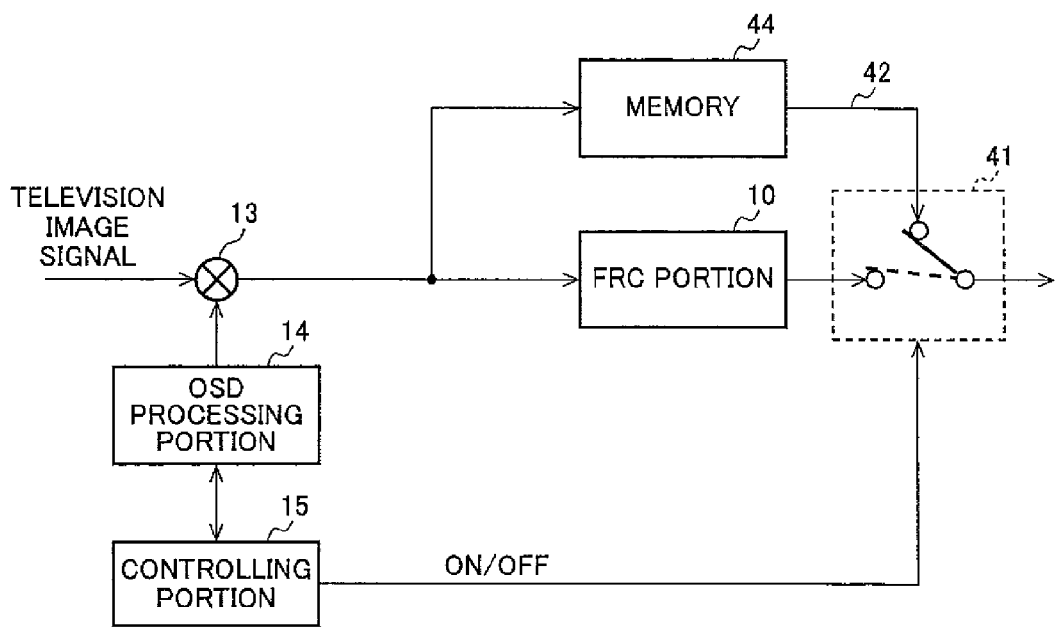
FIG. 33 is a block diagram of an exemplary main configuration of a liquid crystal display device according to a twenty-first embodiment of the present invention.

FIG. 33 is a block diagram of an exemplary main configuration of a liquid crystal display device according to the twenty-first embodiment of the present invention and the liquid crystal display device includes the FRC portion 10, the combining portion 13, the OSD processing portion 14, the controlling portion 15, the switching portion 41, the path 42 provided separately from the input path to the FRC portion 10, and a memory 44 on the path 42. The electrode driving portion 18 and the liquid crystal display panel 19 are not depicted. The switching portion 41 is disposed on the subsequent stage of the FRC portion 10 and switches whether the image signal (motion-compensated image) from the FRC portion 10 is output or the image signal of the previous frame or the subsequent frame from the memory 44 is output. Turning on/off of the OSD display is controlled in accordance with instruction operations performed by a user with the use of the remote controller, etc.

If the OSD processing portion 14 overlaps the OSD signal with the television image signal, the controlling portion 15 switches the switching portion 41 to the path 42 (the memory 44) for a pixel overlapped with the OSD signal or a region including the pixel to output to the display panel a display image signal generated by repeatedly reading and inserting the image signal of the previous or subsequent frame from the memory 44 between frames of the input image signal. The memory 44 has the input image signals accumulated thereon and, when the OSD signal is overlapped, the image signal of a pixel overlapped with the OSD signal or a region including the pixel is repeatedly read out. For a pixel not overlapped with the OSD signal or a region including the pixel, the switching portion 41 is switched to the FRC portion 10 to output to the display panel a display image signal subjected to the FRC process (motion-compensated frame interpolation process) between frames of the input image signal.

Since the interpolation process through motion compensation is not performed for a pixel overlapped with the OSD signal or a region including the pixel when the image signal overlapped with the OSD signal is input, the image quality can effectively be prevented from deteriorating in the OSD part due to the motion-compensated FRC process by eliminating the detection errors, the motion compensation errors, etc., of the motion vector occurring because the moving image and the still image (OSD) are mixed.

Twenty-Second Embodiment

In a twenty-second embodiment of the present invention, a memory is provided on a path other than the input path to the FRC portion 10; it is assumed that the first image signal is, for example, the television image signal acquired by receiving broadcast and that the second image signal is, for example, the sub-screen image signal such as PinP; and when both image signals are combined and displayed, the switching to the memory is performed for a pixel combined (overlapped) with the sub-screen image signal or a region including the pixel to convert the frame rate by rapidly and repeatedly reading the image signal of the same frame from the memory more than once only for the sub-screen part. That is, for a pixel combined (overlapped) with the sub-screen image signal or a region including the pixel in the input image signal, the switching is performed such that the input image signal is rapidly and sequentially output to convert the frame rate and is displayed and output on the liquid crystal display panel 19 without performing the motion-compensated interpolation process.

Figure 34:
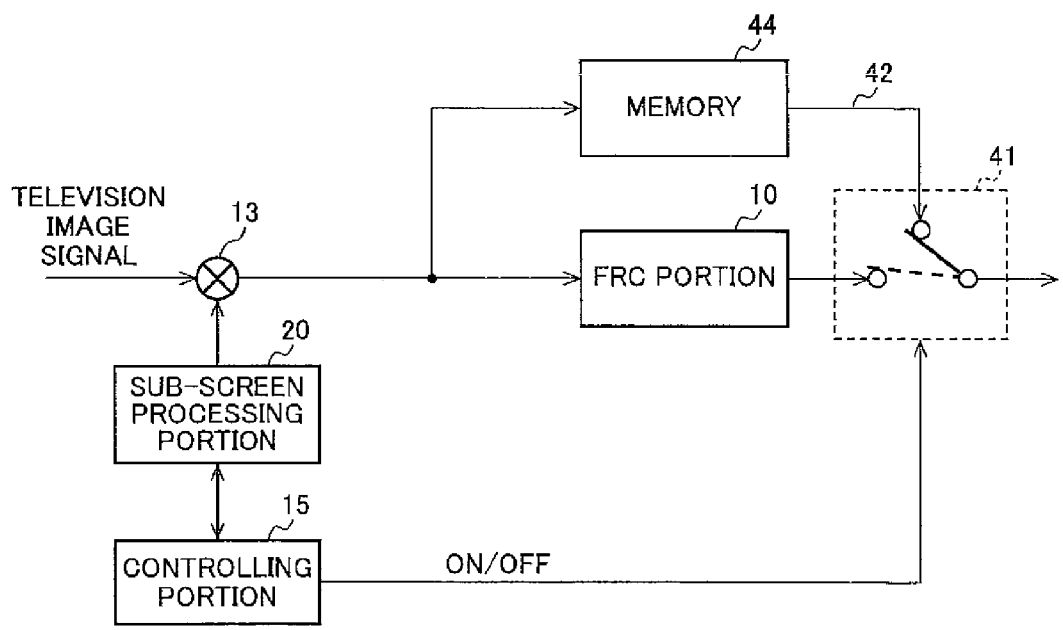
FIG. 34 is a block diagram of an exemplary main configuration of a liquid crystal display device according to a twenty-second embodiment of the present invention.

FIG. 34 is a block diagram of an exemplary main configuration of a liquid crystal display device according to the twenty-second embodiment of the present invention and the liquid crystal display device includes the FRC portion 10, the combining portion 13, the sub-screen processing portion 20, the controlling portion 15, the switching portion 41, the path 42 provided separately from the input path to the FRC portion 10, and the memory 44 on the path 42. The electrode driving portion 18 and the liquid crystal display panel 19 are not depicted. The switching portion 41 is disposed on the subsequent stage of the FRC portion 10 and switches whether the image signal (motion-compensated image) from the FRC portion 10 is output or the image signal of the previous frame or the subsequent frame from the memory 44 is output. Turning on/off of the sub-screen (PinP) display is controlled in accordance with instruction operations performed by a user with the use of the remote controller, etc.

If the sub-screen processing portion 20 overlaps the PinP display signal with the television image signal (main-screen image signal), the controlling portion 15 switches the switching portion 41 to the path 42 (the memory 44) for a pixel overlapped with the PinP display signal or a region including the pixel to output to the display panel a display image signal generated by repeatedly reading and inserting the image signal of the previous or subsequent frame from the memory 44 between frames of the input image signal. The memory 44 has the input image signals accumulated thereon and, when the PinP display signal is overlapped, the image signal of a pixel overlapped with the PinP display signal or a region including the pixel is repeatedly read out. For a pixel not overlapped with the PinP display signal or a region including the pixel, the switching portion 41 is switched to the FRC portion 10 to output to the display panel a display image signal subjected to the FRC process (motion-compensated frame interpolation process) between frames of the input image signal.

Since the interpolation process through motion compensation is not performed for a pixel overlapped with the sub-screen image signal or a region including the pixel when the image signal overlapped with the sub-screen image signal is input, the image quality can effectively be prevented from deteriorating in the sub-screen part due to the motion-compensated FRC process by eliminating the detection errors, the motion compensation errors, etc., of the motion vector occurring because the moving images with different motion characteristics are mixed.

Twenty-Third Embodiment

In a twenty-third embodiment of the present invention, it is assumed that the first image signal is, for example, the television image signal acquired by receiving broadcast and that the second image signal is, for example, the character signal such as OSD, and when both image signals are combined and displayed, the compensation intensity of the motion compensation process can be varied in the interpolation frame generating portion for a pixel combined (overlapped) with the character signal or a region including the pixel. Specifically, the interpolation frame generating portion is included that performs weighted addition of the image signal subjected to the motion compensation process and the image signal subjected to the linear interpolation process at a predetermined rate to generate an interpolation frame, and the weighted addition rate can be varied at the time of the OSD display for a pixel combined (overlapped) with the character signal or a region including the pixel in the input image signal.

Figure 35:
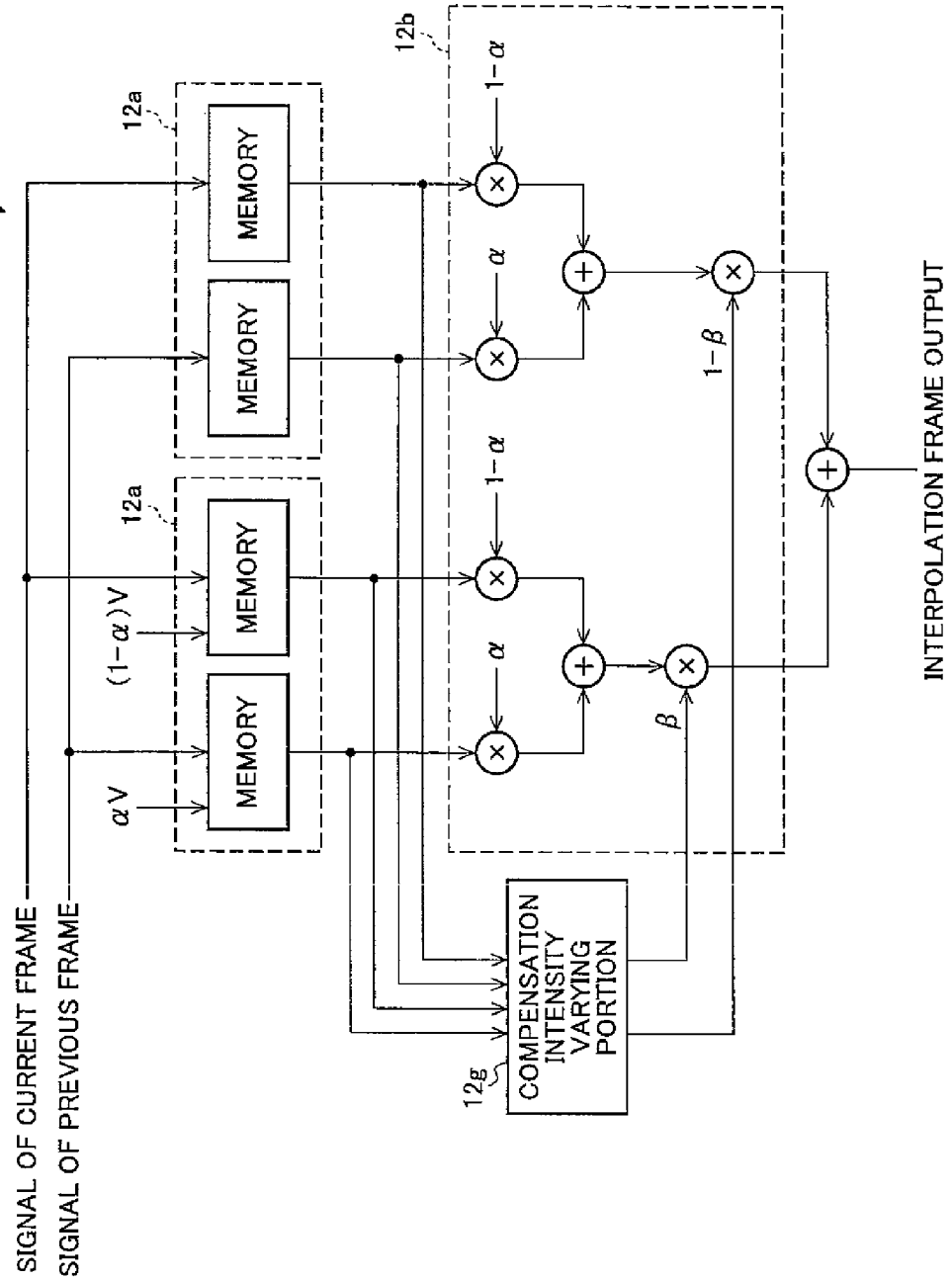
FIG. 35 is a block diagram of an exemplary main configuration of an FRC portion according to twenty-third and twenty-fourth embodiments of the present invention.

FIG. 35 is a block diagram of an exemplary main configuration of the FRC portion 10 according to the twenty-third embodiment of the present invention, and the frame generating portion 12 of the FRC portion 10 includes the interpolation frame memory 12a, the interpolation frame generating portion 12b, and a compensation intensity varying portion 12g that can vary the compensation intensity of the motion compensation process in the FRC portion 10. Turning on/off of the OSD display is controlled in accordance with instruction operations performed by a user with the use of the remote controller, etc. In FIG. 35, V denotes an interpolation vector; $\alpha$ denotes a frame interpolation rate; and $\beta$ denotes interpolation intensity (weighted addition rate).

Generally, known methods of the frame interpolation process include the frame interpolation through the linear interpolation between two frames and the frame interpolation using motion vectors (motion compensated interpolation). In the former case, an interpolation frame is acquired by the linear interpolation from the signal of the previous frame and the signal of the current frame at a frame interpolation rate $\alpha$. Therefore, using this linear interpolation can prevent the image quality deterioration in the OSD part, which occurs because the OSD part is pulled by the motion in the FRC process.

On the other hand, to acquire an interpolation frame from the previous frame and the current frame in the latter case, the interpolation vector V is detected from the motion vectors between the previous frame image and the current frame image, and the interpolation frame is acquired from the weighted addition of a signal shifted the previous frame image by a degree of $\alpha V$ obtained by dividing the value (interpolation vector V) by the frame interpolation rate $\alpha$ and a signal shifted the current frame image by $(\alpha-1)V$. Although good image quality can be acquired without deteriorating the resolution since a moving image itself is captured and compensated by using this motion-compensated interpolation, the image quality may be deteriorated in the OSD part because the OSD part is pulled due to this process.

Therefore, in this embodiment, the compensation intensity varying portion 12g is provided in the frame generating portion 12. If the OSD processing portion 14 overlaps the OSD signal with the television image signal, the compensation intensity varying portion 12g varies the weighted addition rate $\beta$ for a pixel overlapped with the OSD signal or a region including the pixel. The weighted addition rate $\beta$ is a rate for performing the weighted addition of the image signal subjected to the motion compensation process and the image signal subjected to the linear interpolation process. The interpolation frame generating portion 12b of this embodiment performs the weighted addition of the linear interpolation and the motion-compensated interpolation for a pixel overlapped with the OSD signal or a region including the pixel in accordance with the weighted addition rate $\beta$ to generate the interpolation frame.

For example, if the OSD signal is overlapped with the television image signal, the compensation intensity varying portion 12g sets the weighted addition rate $\beta=0$ for a pixel overlapped with the OSD signal or a region including the pixel and defines the image signal subjected to the linear interpolation process as the interpolation frame to prevent the image deterioration in the OSD part. The weighted addition rate $\beta=1$ is set for a pixel not overlapped with the OSD signal or a region including the pixel in the input image signal to define the image signal subjected to the motion compensation process as the interpolation frame to achieve good image quality for the moving image.

Since the weighted addition rate β can arbitrarily and variably be set, the rate may be set to a substantially intermediate value between zero and one. This enables control to be performed such that the image quality of the OSD part is not deteriorated while performing the motion compensation in the interpolation frame image, and this can appropriately improve both the image quality deterioration due to the motion blur and the image quality deterioration in the OSD display. The compensation intensity varying process in the FRC portion 10 may be performed with either the method for each pixel or the method for each block (region).

Since the compensation intensity can be varied (weakened) in the motion compensation process in the FRC for a pixel overlapped with the OSD signal or a region including the pixel when the image signal overlapped with the OSD signal is input, the image quality deterioration in the OSD part occurring due to the motion-compensated FRC process can effectively be constrained by reducing the effects of the detection errors, the motion compensation errors, etc., of the motion vector occurring because the moving image and the still image (OSD) are mixed.

Twenty-Fourth Embodiment

In a twenty-fourth embodiment of the present invention, it is assumed that the first image signal is, for example, the television image signal acquired by receiving broadcast and that the second image signal is, for example, the sub-screen image signal such as PinP, and when both image signals are combined and displayed, the compensation intensity of the motion compensation process can be varied in the interpolation frame generating portion for a pixel combined (overlapped) with the sub-screen image signal or a region including the pixel. Specifically, the interpolation frame generating portion is included that performs weighted addition of the image signal subjected to the motion compensation process and the image signal subjected to the linear interpolation process at a predetermined rate to generate an interpolation frame, and the weighted addition rate can be varied at the time of the sub-screen display for a pixel overlapped with the sub-screen image signal or a region including the pixel in the input image signal.

A main configuration of the FRC portion 10 according to the twenty-fourth embodiment of the present invention is the same as the above configuration shown in FIG. 35. That is, the frame generating portion 12 of the FRC portion 10 includes the interpolation frame memory 12*a*, the interpolation frame generating portion 12*b*, and the compensation intensity varying portion 12*g* that can vary the compensation intensity of the motion compensation process in the FRC portion 10. Turning on/off of the sub-screen (PinP) display is controlled in accordance with instruction operations performed by a user with the use of the remote controller, etc.

Generally, known methods of the frame interpolation process include the frame interpolation through the linear interpolation between two frames and the frame interpolation using motion vectors (motion compensated interpolation). In the former case, an interpolation frame is acquired by the linear interpolation from the signal of the previous frame and the signal of the current frame at a frame interpolation rate α. Therefore, using this linear interpolation can prevent the image quality deterioration in the sub-screen part, which occurs because the sub-screen part is pulled by the motion in the FRC process.

On the other hand, to acquire an interpolation frame from the previous frame and the current frame in the latter case, the interpolation vector V is detected from the motion vectors between the previous frame image and the current frame image, and the interpolation frame is acquired from the weighted addition of a signal shifted the previous frame image by a degree of αV obtained by dividing the value (interpolation vector V) by the frame interpolation rate α and a signal shifted the current frame image by (α−1)V. Although good image quality can be acquired without deteriorating the resolution since a moving image itself is captured and compensated by using this motion-compensated interpolation, the image quality may be deteriorated in the sub-screen part because the sub-screen part is pulled due to this process.

Therefore, in this embodiment, the compensation intensity varying portion 12*g* is provided in the frame generating portion 12. If the sub-screen processing portion 20 overlaps the PinP display signal with the television image signal, the compensation intensity varying portion 12*g* varies the weighted addition rate β for a pixel overlapped with the PinP display signal or a region including the pixel. The weighted addition rate β is a rate for performing the weighted addition of the image signal subjected to the motion compensation process and the image signal subjected to the linear interpolation process. The interpolation frame generating portion 12*b* of this embodiment performs the weighted addition of the linear interpolation and the motion-compensated interpolation for a pixel overlapped with the PinP display signal or a region including the pixel in accordance with the weighted addition rate β to generate the interpolation frame.

For example, if the PinP display signal is overlapped with the television image signal, the compensation intensity varying portion 12*g* sets the weighted addition rate β=0 for a pixel overlapped with the PinP display signal or a region including the pixel and defines the image signal subjected to the linear interpolation process as the interpolation frame to prevent the image quality deterioration in the sub-screen part. The weighted addition rate β=1 is set for a pixel not overlapped with the PinP display signal or a region including the pixel in the input image signal to define the image signal subjected to the motion compensation process as the interpolation frame to achieve good image quality for the moving image.

Since the weighted addition rate β can arbitrarily and variably be set, the rate may be set to a substantially intermediate value between zero and one. This enables control to be performed such that the image quality of the sub-screen part is not deteriorated while performing the motion compensation in the interpolation frame image, and this can appropriately improve both the image quality deterioration due to the motion blur and the image quality deterioration in the sub-screen display. The compensation intensity varying process in the FRC portion 10 may be performed with either the method for each pixel or the method for each block (region).

Since the compensation intensity can be varied (weakened) in the motion compensation process in the FRC for a pixel overlapped with the PinP display signal or a region including the pixel when the image signal overlapped with the PinP display signal is input, the image quality deterioration in the sub-screen part occurring due to the motion-compensated FRC process can effectively be constrained by reducing the effects of the detection errors, the motion compensation errors, etc., of the motion vector occurring because the moving images with different motion characteristics are mixed.

Figure 36:
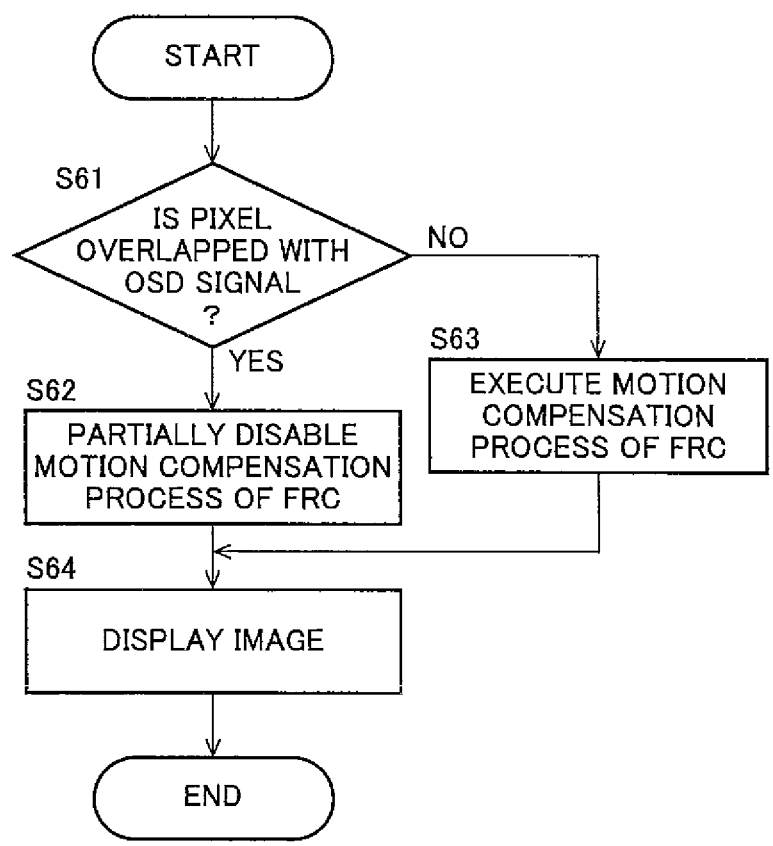
FIG. 36 is a flowchart for explaining an example of an image displaying method by the image display device of the present invention.

FIG. 36 is a flowchart for explaining an example of an image displaying method by the image display device of the present invention. An example of the image displaying method in the fifteenth and seventeenth embodiments will be described here. First, the image display device determines whether a pixel (or block) is overlapped with the OSD signal in the input image signal (step S61), and if it is determined that a pixel (or block) is overlapped with the OSD signal (in the case of YES), the interpolation vector of a pixel overlapped with the OSD signal or a region (interpolation block) including the pixel is set to zero-vector to partially disable the motion compensation process of the FRC portion 10 (step S62). If it is determined at step S61 that a pixel (or block) is not overlapped with the OSD signal (in the case of NO), the image signal is output that is subjected to the interpolation process through motion compensation in the FRC portion 10 (step S63). The image signal with the frame frequency converted in this way is displayed and output from the liquid crystal display panel 19 (step S64).

Figure 37:
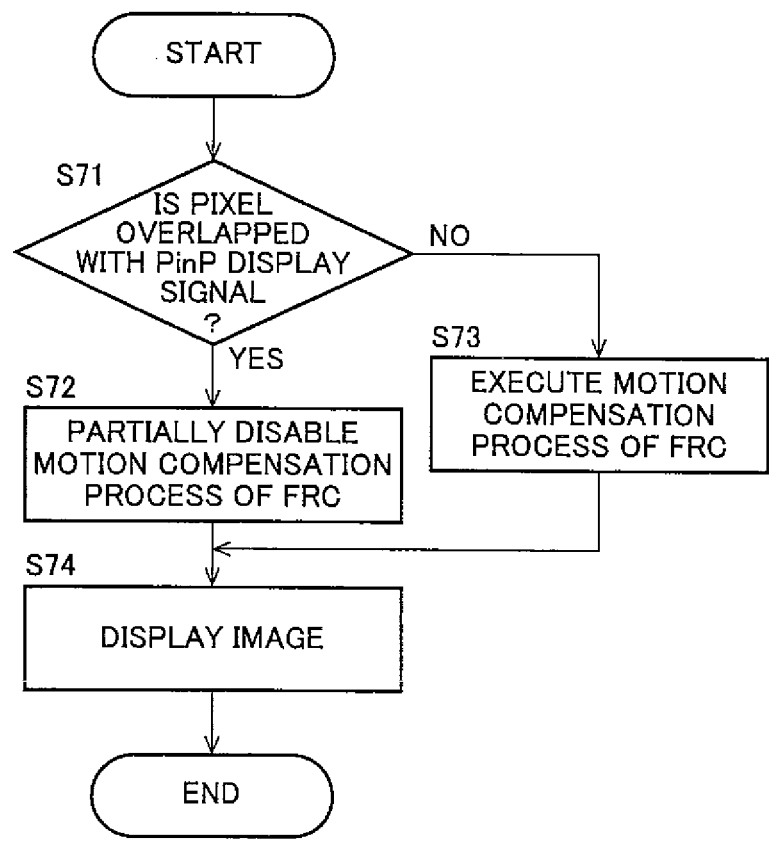
FIG. 37 is a flowchart for explaining another example of the image displaying method by the image display device of the present invention.

FIG. 37 is a flowchart for explaining another example of the image displaying method by the image display device of the present invention. An example of the image displaying method in the sixteenth and eighteenth embodiments will be described here. First, the image display device determines whether a pixel (or block) is overlapped with the PinP display signal in the input image signal (step S71), and if it is determined that a pixel (or block) is overlapped with the PinP display signal (in the case of YES), the interpolation vector of a pixel overlapped with the PinP display signal or a region (interpolation block) including the pixel is set to zero-vector to partially disable the motion compensation process of the FRC portion 10 (step S72). If it is determined at step S71 that a pixel (or block) is not overlapped with the PinP display signal (in the case of NO), the image signal is output that is subjected to the interpolation process through motion compensation in the FRC portion 10 (step S73). The image signal with the frame frequency converted in this way is displayed and output from the liquid crystal display panel 19 (step S74).

Figure 38:
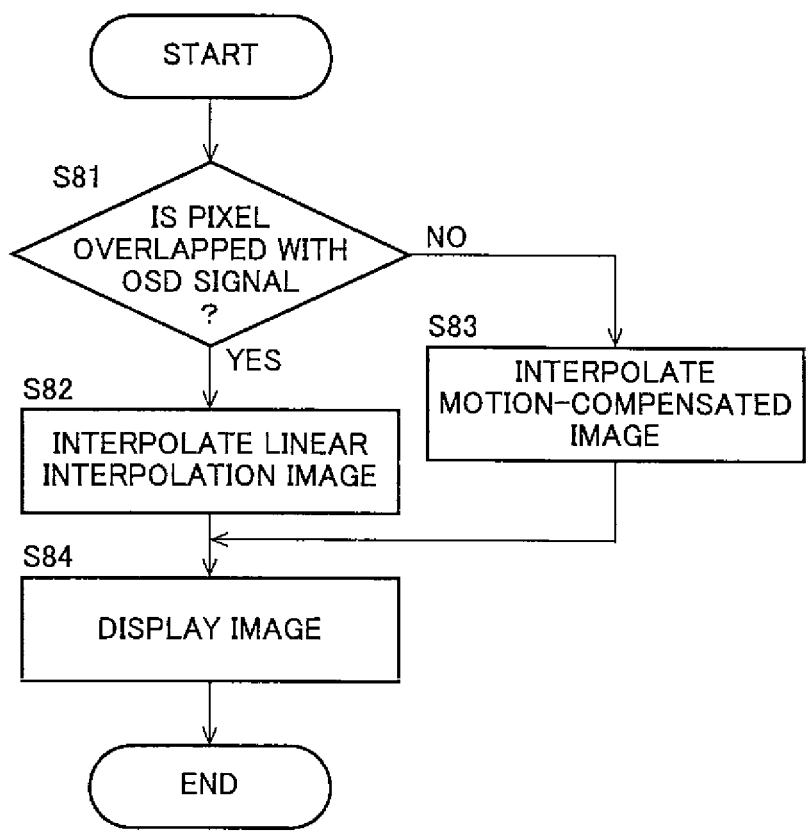
FIG. 38 is a flowchart for explaining another example of the image displaying method by the image display device of the present invention.

FIG. 38 is a flowchart for explaining another example of the image displaying method by the image display device of the present invention. An example of the image displaying method in the nineteenth embodiment will be described here. First, the image display device determines whether a pixel (or block) is overlapped with the OSD signal in the input image signal (step S81), and if it is determined that a pixel (or block) is overlapped with the OSD signal (in the case of YES), the image signal interpolated with the linear interpolation image is output for a pixel overlapped with the OS signal or a region (interpolation block) including the pixel to partially prevent the execution of the motion-compensated interpolation process of the FRC portion 10 (step S82). If it is determined at step S81 that a pixel (or block) is not overlapped with the OSD signal (in the case of NO), the image signal is output that is subjected to the interpolation process through motion compensation in the FRC portion 10 (step S83). The image signal with the frame frequency converted in this way is displayed and output from the liquid crystal display panel 19 (step S84).

Figure 39:
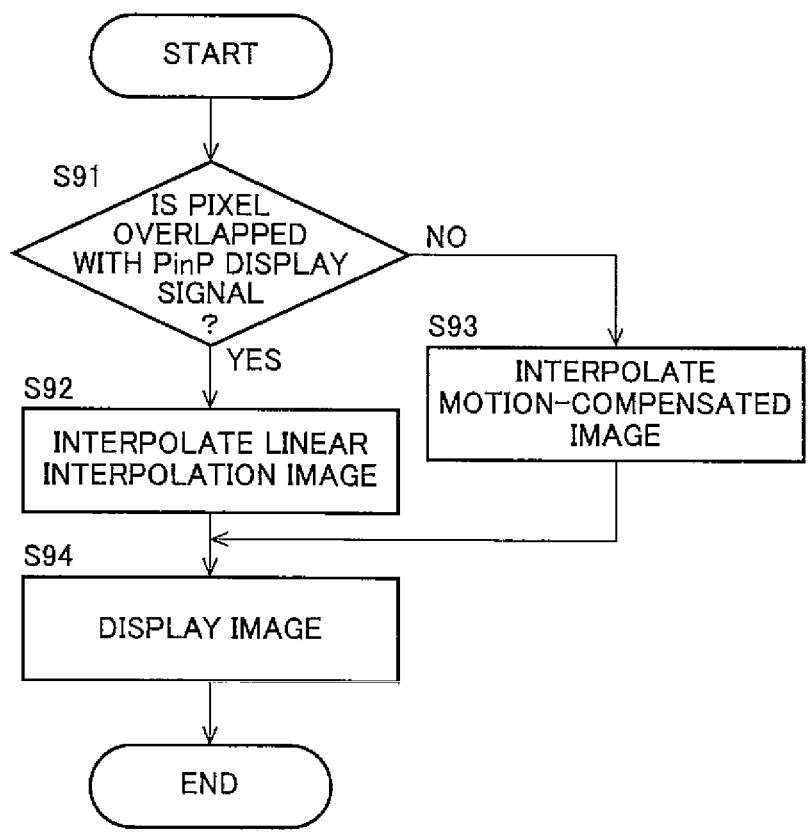
FIG. 39 is a flowchart for explaining another example of the image displaying method by the image display device of the present invention.

FIG. 39 is a flowchart for explaining another example of the image displaying method by the image display device of the present invention. An example of the image displaying method in the twentieth embodiment will be described here. First, the image display device determines whether a pixel (or block) is overlapped with the PinP display signal in the input image signal (step S91), and if it is determined that a pixel (or block) is overlapped with the PinP display signal (in the case of YES), the image signal interpolated with the linear interpolation image is output for a pixel overlapped with the PinP display signal or a region (interpolation block) including the pixel to partially prevent the execution of the motion-compensated interpolation process of the FRC portion 10 (step S92). If it is determined at step S91 that a pixel (or block) is not overlapped with the PinP display signal (in the case of NO), the image signal is output that is subjected to the interpolation process through motion compensation in the FRC portion 10 (step S93). The image signal with the frame frequency converted in this way is displayed and output from the liquid crystal display panel 19 (step S94).

Figure 40:
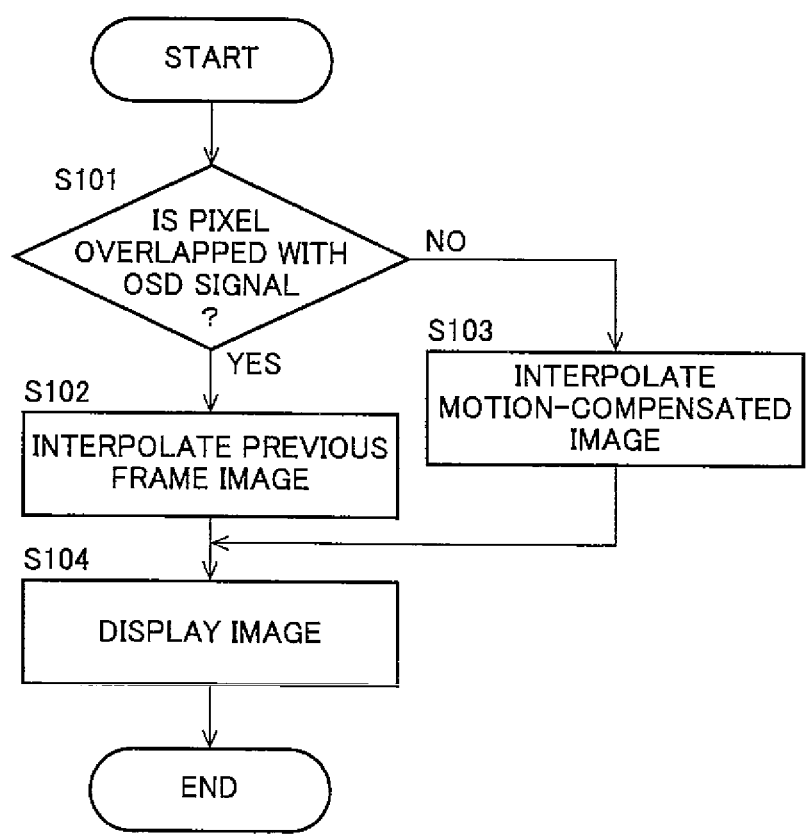
FIG. 40 is a flowchart for explaining another example of the image displaying method by the image display device of the present invention.

FIG. 40 is a flowchart for explaining another example of the image displaying method by the image display device of the present invention. An example of the image displaying method in the twenty-first embodiment will be described here. First, the image display device determines whether a pixel (or block) is overlapped with the OSD signal in the input image signal (step S101), and if it is determined that a pixel (or block) is overlapped with the OSD signal (in the case of YES), the image signal inserted with the previous or subsequent frame image is output for a pixel overlapped with the OSD signal or a region (interpolation block) including the pixel to partially prevent the execution of the motion-compensated interpolation process of the FRC portion 10 (step S102). If it is determined at step S101 that a pixel (or block) is not overlapped with the OS signal (in the case of NO), the image signal is output that is subjected to the interpolation process through motion compensation in the FRC portion 10 (step S103). The image signal with the frame frequency converted in this way is displayed and output from the liquid crystal display panel 19 (step S104).

Figure 41:
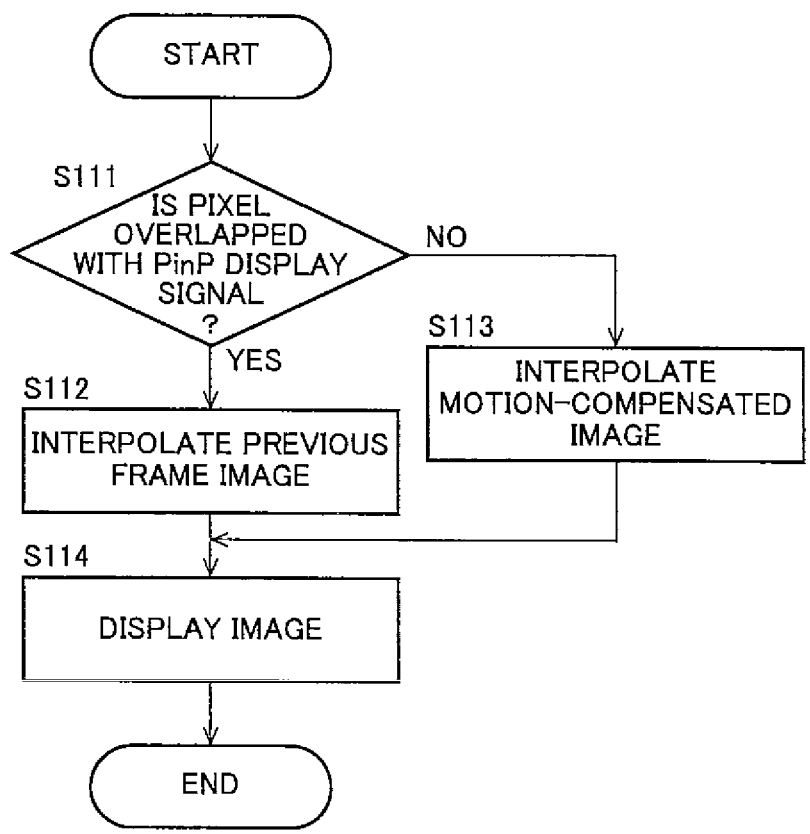
FIG. 41 is a flowchart for explaining another example of the image displaying method by the image display device of the present invention.

FIG. 41 is a flowchart for explaining another example of the image displaying method by the image display device of the present invention. An example of the image displaying method in the twenty-second embodiment will be described here. First, the image display device determines whether a pixel (or block) is overlapped with the PinP display signal in the input image signal (step S111), and if it is determined that a pixel (or block) is overlapped with the PinP display signal (in the case of YES), the image signal inserted with the previous or subsequent frame image is output for a pixel overlapped with the PinP display signal or a region (interpolation block) including the pixel to partially prevent the execution of the motion-compensated interpolation process of the FRC portion 10 (step S112). If it is determined at step S111 that a pixel (or block) is not overlapped with the PinP display signal (in the case of NO), the image signal is output that is subjected to the interpolation process through motion compensation in the FRC portion 10 (step S113). The image signal with the frame frequency converted in this way is displayed and output from the liquid crystal display panel 19 (step S114).

Figure 42:
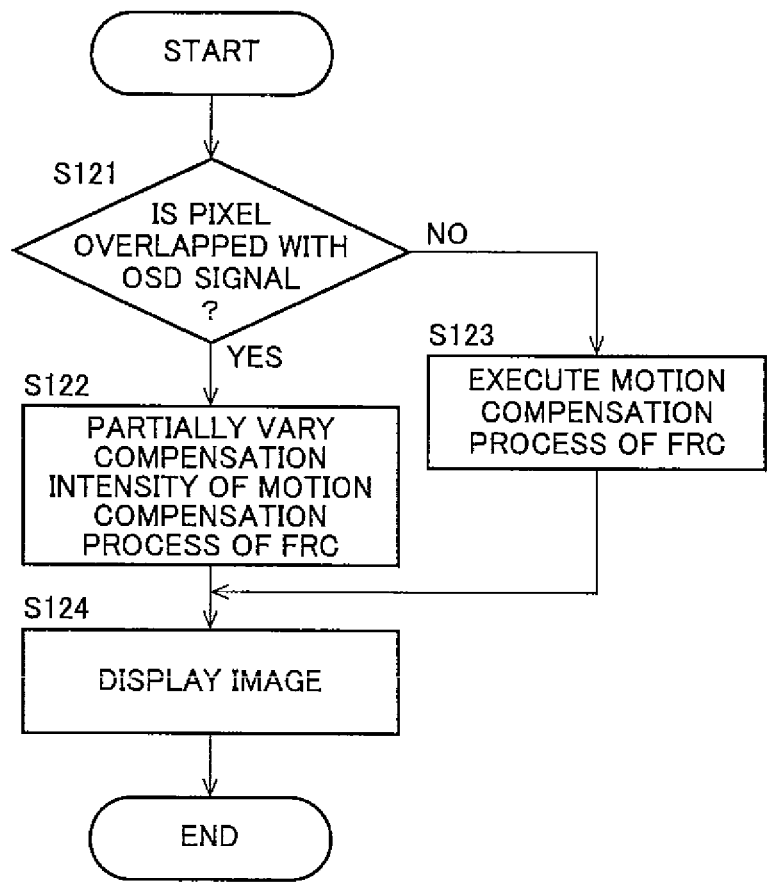
FIG. 42 is a flowchart for explaining another example of the image displaying method by the image display device of the present invention.

FIG. 42 is a flowchart for explaining another example of the image displaying method by the image display device of the present invention. An example of the image displaying method in the twenty-third embodiment will be described here. First, the image display device determines whether a pixel (or block) is overlapped with the OSD signal in the input image signal (step S121), and if it is determined that a pixel (or block) is overlapped with the OSD signal (in the case of YES), the compensation intensity is partially varied (weakened) in the motion compensation process of the FRC portion 10 for a pixel overlapped with the OSD signal or a region (interpolation block) including the pixel (step S122). If it is determined at step S121 that a pixel (or block) is not overlapped with the OSD signal (in the case of NO), the compensation intensity is increased as usual in the motion compensation process of the FRC portion 10 (step S123). The image signal with the frame frequency converted in this way is displayed and output from the liquid crystal display panel 19 (step S124).

Figure 43:
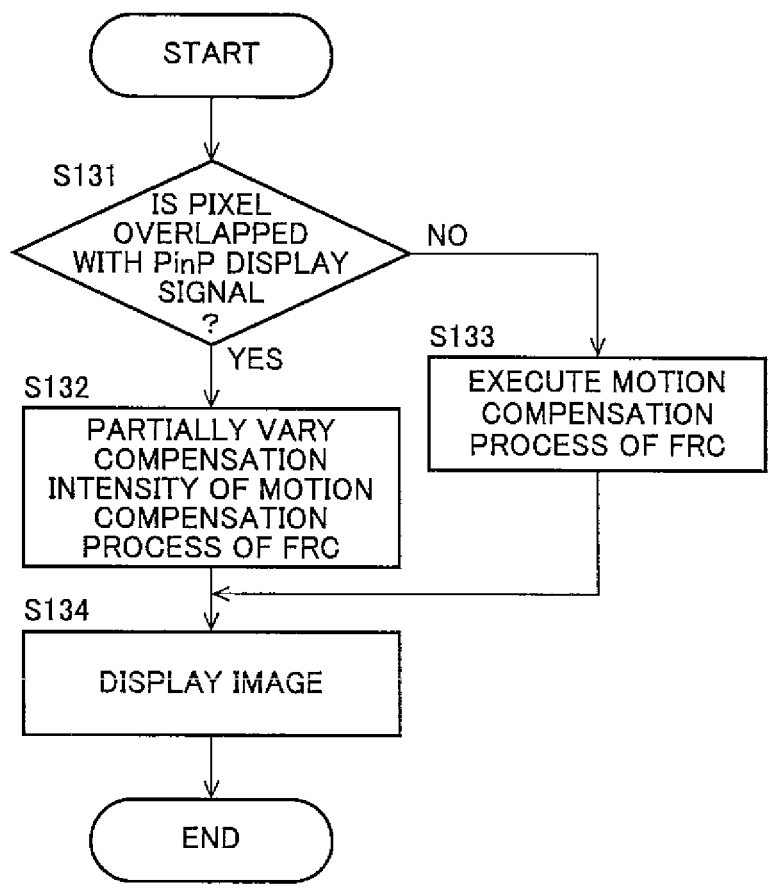
FIG. 43 is a flowchart for explaining another example of the image displaying method by the image display device of the present invention.
Figure 44:
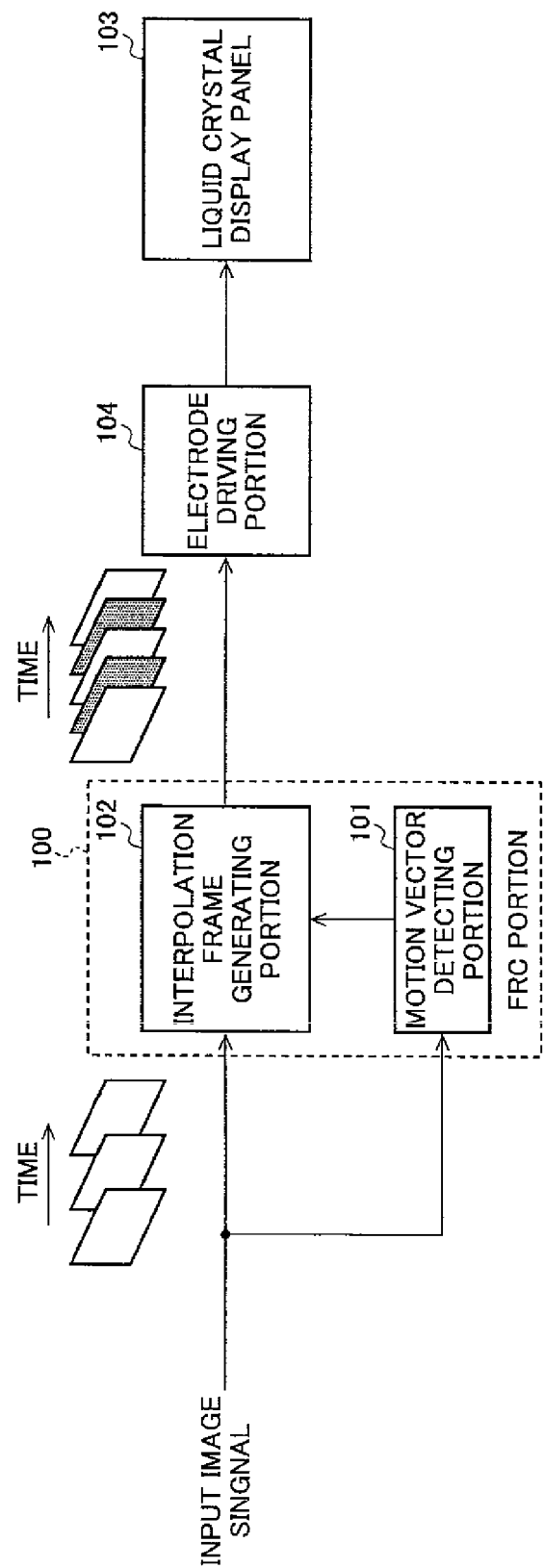
FIG. 44 is a block diagram of an outline configuration of an FRC drive display circuit in a conventional liquid crystal display device.
Figure 45:
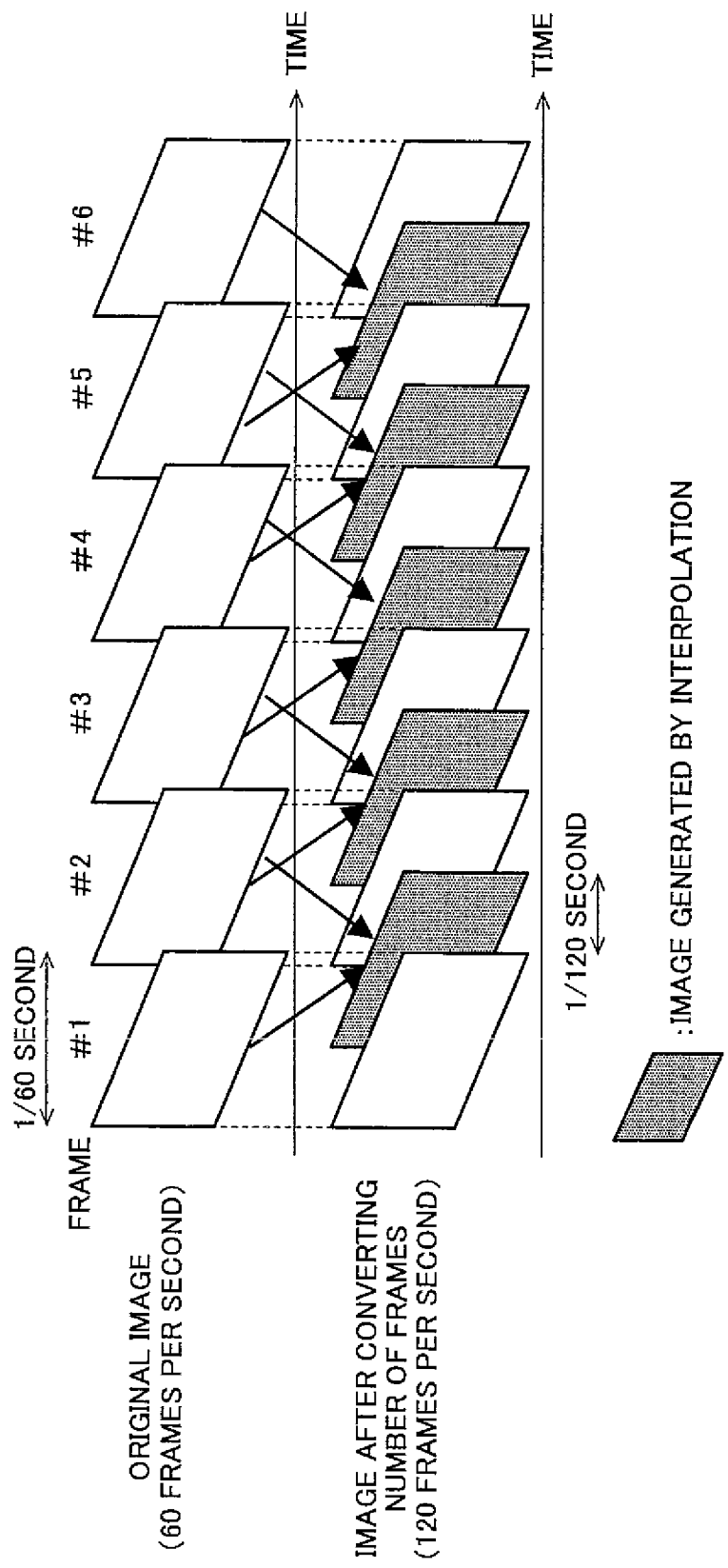
FIG. 45 is a view for explaining a frame rate conversion process by the conventional FRC drive display circuit shown in FIG. 44.
Figure 46:
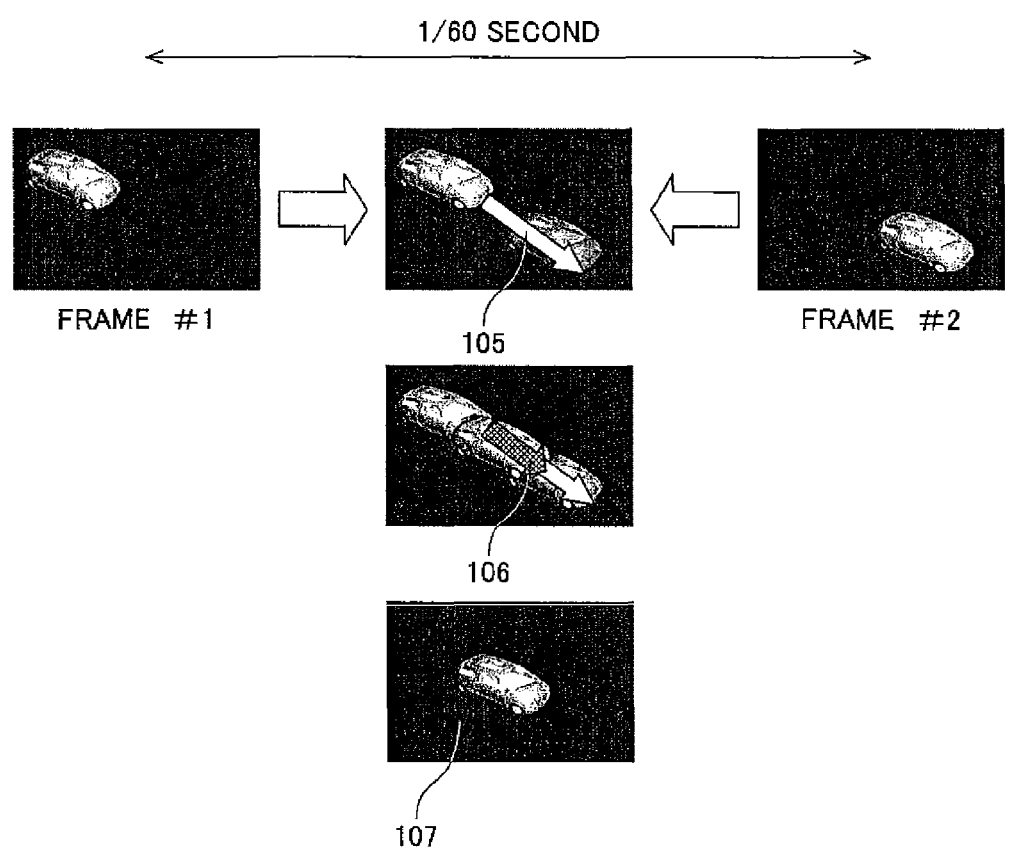
FIG. 46 is a view for explaining an interpolation frame generation process of a motion vector detecting portion and an interpolation frame generating portion.

FIG. 43 is a flowchart for explaining another example of the image displaying method by the image display device of the present invention. An example of the image displaying method in the twenty-fourth embodiment will be described here. First, the image display device determines whether a pixel (or block) is overlapped with the PinP display signal in the input image signal (step S131), and if it is determined that a pixel (or block) is overlapped with the PinP display signal (in the case of YES), the compensation intensity is partially varied (weakened) in the motion compensation process of the FRC portion 10 for a pixel overlapped with the PinP display signal or a region (interpolation block) including the pixel (step S132). If it is determined at step S131 that a pixel (or block) is not overlapped with the PinP display signal (in the case of NO), the compensation intensity is increased as usual in the motion compensation process of the FRC portion 10 (step S133). The image signal with the frame frequency converted in this way is displayed and output from the liquid crystal display panel 19 (step S134).

According to the embodiments described above, when combining and displaying a first image signal and a second image signal having motion characteristics different from the first image signal, the motion compensation process in the frame rate converting (FRC) portion can partially be disabled for the display and output of the input image signal formed by combining the first and second image signals and, therefore, the image quality can effectively be prevented from deteriorating in the display part of the first and second image signals due to the interpolation process through motion compensation.

Although the above embodiments are described by taking the examples of displaying the second image signal (character signal) 32 combined (overlapped) within the first image signal 31 (see FIG. 26(A)) and displaying the second image signal (sub-screen image signal) 34 combined (overlapped) within the first image signal 33 (see FIG. 26(B)) as shown in FIG. 26, this is not a limitation and it is clear that the present invention is applicable to the case of combining and displaying at least two or more image signals having different motions.

For example, as shown in FIG. 26(C), the present invention is applicable to the case of combining and displaying the second image signal 36 on the outside of the first image signal 35. In this case, the first image signal 35 may be, for example, a television image signal acquired by receiving broadcast, and the second image signal 36 may be, for example, a data information display signal acquired by receiving data broadcast or a program information display signal generated within the display device based on program information multiplexed as additional information with the television image signal.

As shown in FIG. 26(D), the present invention is applicable to the case of combining and displaying the first image signal 37 and the second image signal 38 side by side on the right and left, etc. In this case, the first image signal 37 may be, for example, a television image signal acquired by receiving broadcast, and the second image signal 38 may be, for example, a PoutP (Picture out Picture) display signal. The PoutP display signal may be a character signal such as characters, numeric characters, symbols, and images or an image signal such as a still image and a moving image, is not limited to those generated within the display device, and may be input from the outside as is the case with the above PinP display signal.

As shown in FIG. 26(E), the present invention is applicable to the case of combining and displaying the first image signal 39 and the second image signal 40 in a partially overlapping manner. In this case, the first image signal 39 may be, for example, a television image signal acquired by receiving broadcast, and the second image signal 40 may be, for example, a PoutP display signal generated within the display device or a PoutP display signal input from the outside.

It is needless to say that the first image signal is not limited to the above television image signal and may be an image signal reproduced from an external medium.

The invention claimed is:

1. An image display device comprising:
a rate converting module that interpolates an image signal after the image signal has been subjected to a motion compensation process between frames or fields of an input image signal to convert and output the number of frames or fields of the input image signal to a display panel,
responsive to the input image signal being a combination of a first image signal and a second image signal, the second image signal being different from the first image signal, and at least one of the first image signal and the second image signal is a moving image; the rate converting module disabling the motion compensation process for all pixel regions of the combination to be displayed in the display panel by making a motion vector zero for all pixel regions.

2. The image display device as defined in claim 1, wherein the rate converting module includes a motion vector detecting portion that detects motion vector information between consecutive frames or fields included in the input image signal,
an interpolation vector allocating portion that allocates an interpolation vector between the frames or the fields based on the detected motion vector information,
an interpolation image generating portion that generates an interpolation image signal from the allocated interpolation vector, and
an image interpolating portion that interpolates the generated interpolation image signal between the frames or the fields.

3. The image display device as defined in claim 2, wherein when the first image signal and the second image signal are combined and displayed, the motion vector detected by the motion vector detecting portion is set to zero-vector to disable the motion compensation process.

4. The image display device as defined in claim 2, wherein when the first image signal and the second image signal are combined and displayed, the interpolation vector allocated by the interpolation vector allocating portion is set to zero-vector to disable the motion compensation process.

5. The image display device as defined in claim 1, wherein the second image signal is a character signal combined within the first image signal.

6. The image display device as defined in claim 5, wherein the character signal is an on-screen display signal generated within the image display device.

7. The image display device as defined in claim 1, wherein the second image signal is a sub-screen image signal combined within the first image signal.

8. The image display device as defined in claim 7, wherein the sub-screen image signal is a picture-in-picture display signal generated in the image display device.

9. The image display device as defined in claim 1, wherein the second image signal is a background image signal combined on the outside of the first image signal.

10. The image display device as defined in claim 9, wherein the background image signal is a data information display signal.

11. The image display device as defined in claim 9, wherein the background image signal is a program information display signal.

12. The image display device as defined in claim 1, wherein the second image signal is an another-screen image signal combined on the outside of the first image signal.

13. The image display device as defined in claim 12, wherein the another-screen image signal is a picture-out-picture display signal generated in the image display device.

14. An image display device comprising a rate converting module that interpolates an image signal after the image signal has been subjected to a motion compensation process between frames or fields of an input image signal to convert and output the number of frames or fields of the input image signal to a display panel, wherein
responsive to the input image signal being a combination of a first image signal and a second image signal, the second image signal being different from the first image signal are combined and displayed, and at least one of the first image signal and the second image signal is a moving image; the motion compensation process in the rate converting module is disabled for a pixel combined with the second image signal or a region including the pixel,
the rate converting module includes a motion vector detecting portion that detects motion vector information between consecutive frames or fields included in the input image signal,
an interpolation vector allocating portion that allocates an interpolation vector between the frames or the fields based on the detected motion vector information,
an interpolation image generating portion that generates an interpolation image signal from the allocated interpolation vector,
an image interpolating portion that interpolates the generated interpolation image signal between the frames or the fields, and
responsive to the input image signal being a combination of the first image signal and the second image signal, the second image signal being different from the first image signal, and at least one of the first image signal and the second image signal is a moving image; an interpolation vector of an interpolation block combined with the second image signal is set to zero-vector for a region including a pixel or the pixel combined with the second image signal, to disable the motion compensation process for each of the pixels in the interpolation block to be displayed in the display panel.

15. The image display device as defined in claim 14, wherein
flag information is added to the interpolation block combined with the second image signal so that output for the interpolation vector of the interpolation block having the flag information added is a zero.

16. The image display device as defined in claim 14, wherein the second image signal is a character signal combined within the first image signal.

17. The image display device as defined in claim 16, wherein the character signal is an on-screen display signal generated within the image display device.

18. The image display device as defined in claim 14, wherein the second image signal is a sub-screen image signal combined within the first image signal.

19. The image display device as defined in claim 18, wherein the sub-screen image signal is a picture-in-picture display signal generated in the image display device.

20. The image display device as defined in claim 14, wherein the second image signal is a background image signal combined on the outside of the first image signal.

21. The image display device as defined in claim 20, wherein the background image signal is a data information display signal.

22. The image display device as defined in claim 20, wherein the background image signal is a program information display signal.

23. The image display device as defined in claim 14, wherein the second image signal is an another-screen image signal combined on the outside of the first image signal.

24. The image display device as defined in claim 23, wherein the another-screen image signal is a picture-out-picture display signal generated in the image display device.

25. An image displaying method having the step of interpolating an image signal after the image signal has been subjected to a motion compensation process between frames or fields of an input image signal to convert the number of frames or fields of the input image signal, the method comprising:
determining whether the input image signal is a combination of a first image signal and a second image signal, the second image signal being different from the first image signal and at least one of the first image signal and the second image signal is a moving image;
responsive to determining that the input image signal is a combination of the first image signal and the second image signal, disabling the motion compensation process for all pixel regions of a combination; and
displaying all pixel regions of the combination in the display panel by making a motion vector zero for all pixel regions.

26. An image displaying method having the step of interpolating an image signal after the image signal has been subjected to a motion compensation process between frames or fields of an input image signal to convert the number of frames or fields of the input image signal, the method comprising:
a motion vector detecting step that detects motion vector information between consecutive frames or fields included in the input image signal,
an interpolation vector allocating step that allocates an interpolation vector between the frames or the fields based on the detected motion vector information, an interpolation image generating step that generates an interpolation image signal from the allocated interpolation vector, an image interpolating step that interpolates the generated interpolation image signal between the frames or the fields and further, determining whether the input image signal is a combination of a first image signal and a second image signal, the second image signal being different from the first image signal and at least one of the first image signal and the second image signal is a moving image; and responsive to determining that the input image signal is a combination of the first image signal and the second image signal, disabling the motion compensation process for each pixel in an interpolation block, an interpolation vector of the interpolation block combined with the second image signal is set to zero vector for a pixel combined with the second image signal or a region including the pixel.

* * * * *